(12) United States Patent
Saito et al.

(10) Patent No.: US 6,421,504 B1
(45) Date of Patent: Jul. 16, 2002

(54) HYBRID CAMERA

(75) Inventors: Tatsuo Saito, Omiya; Yasuhiro Nishitani, Asaka, both of (JP)

(73) Assignees: Fuji Photo Film Co., Ltd., Kanagawa; Fuji Photo Optical Co., Ltd., Saitama, both of (JP)

( * ) Notice: Subject to any disclaimer, the term of this patent is extended or adjusted under 35 U.S.C. 154(b) by 87 days.

(21) Appl. No.: 09/583,923

(22) Filed: May 31, 2000

(30) Foreign Application Priority Data

May 31, 1999 (JP) ............................................ 11-151048

(51) Int. Cl.7 .......................... G03B 17/48; H04N 5/225
(52) U.S. Cl. ........................ 396/67; 396/159; 396/187; 396/374; 396/429; 348/64; 348/371
(58) Field of Search ............................ 396/429, 65, 67, 396/159, 187, 374, 155; 348/64, 333.01, 370, 371

(56) References Cited

U.S. PATENT DOCUMENTS 6,085,048 A * 7/2000 Mikoshiba et al. ......... 396/374
6,101,333 A * 8/2000 Bullitt et al. .............. 396/65 X

FOREIGN PATENT DOCUMENTS

| JP | 63274935 | 11/1988 | ........... G03B/15/05 |
| JP | 2590333 | 12/1996 | ........... G03B/15/05 |
| JP | 9269545 | 10/1997 | ........... G03B/17/48 |
| JP | 9311378 | 12/1997 | ........... G03B/17/48 |

* cited by examiner

*Primary Examiner*—W. B. Perkey
(74) *Attorney, Agent, or Firm*—Young & Thompson

(57) ABSTRACT

To record images by a film recording system and an electronic recording system with one light-emission of a flashing device, the flashing device is controlled according to set values of photo film recording conditions since the sensitivity of a silver halide film is different from that of an imaging device. Information about exposure control of the electronic recording system is transmitted from a CPU that is equivalent to a controlling device of the film recording system to a CPU of the electronic recording system, and the electronic recording system sets a CCD aperture, a CCD gain and so on according to the information.

18 Claims, 59 Drawing Sheets

FIG. 17

※ DSC BATTERY DISPLAYING PROCESSING IS PERFORMED ACCORDING TO COMMUNICATION DATA

※ OPERATION IS NOT POSSIBLE IN CASE OF COMMUNICATION ERROR

※ OPERATION IS NOT POSSIBLE IN CASE OF BCNG

※ OPERATION IS NOT POSSIBLE IN CASE OF COMMUNICATION ERROR

- (2)
- S842: DSC COMMUNICATION: BATTERY CHECKING
- S844: SET DSC COMMUNICATION ERROR?
- (2-2) on Y
- S846: REPLIED DATA = BCNG ? → (2-1) on Y
- S856: DSC COMMUNICATION: SM STATE = SHOOTING 1
- S858: CHP READING PROCESSING
- S860: DSC COMMUNICATION: CHP
- S862: DSC COMMUNICATION: YEAR DATA
- S864: DSC COMMUNICATION: MONTH AND DAY DATA
- S866: DSC COMMUNICATION: HOUR AND MINUTE DATA
- S868: DSC COMMUNICATION: DATE MODE
- S870: DSC COMMUNICATION: ANIMATION DISOLAY START
- S872: SET DSC COMMUNICATION ERROR? → N → (3); Y → (2-2)
- S848: DSC COMMUNICATION: TURN OFF POWER SUPPLY
- S850: WAIT 100ms
- S852: DSCVW = OFF
- S854: RET

HYBRID CAMERA

BACKGROUND OF THE INVENTION

1. Field of the Invention

The present invention relates generally to a hybrid camera, and more particularly to a hybrid camera in which a first optical system that forms a subject image on a photographic film and a second optical system that forms a subject image on a receiving surface of an imaging device are incorporated as one.

2. Description of Related Art

A camera for both silver halide and electronic still photographs has already been proposed (Japanese Patent Provisional Publication No. 9-269545, and Japanese Patent Provisional Publication No. 9-311378). The camera has a first optical system that forms a subject image on a silver halide film through a taking lens and a second optical system that images the subject with an imaging device such as a CCD and captures the optical image by converting it into electronic image data. The camera is able to display a still image, equal to the subject image formed on the film, on a liquid crystal display (LCD) by recording image signals, transmitted from the CCD at the shutter release, in a memory.

In such a hybrid camera, to record the same images in a silver halide film recording part and an electronic image (digital image) recording part with a flashing device, it is necessary to perform both recordings at one light-emission of the flashing device. Since the sensitivity of the photographic film is different from that of the CCD, it is necessary to determine the amount of the light of the flashing device while considering the characteristics of both recording devices.

Japanese Patent No. 2590333 discloses controlling technics of an electronic flash when an electronic still camera and a large format camera (master camera) are used at one time. A shooting controlling device controls the light-emission timing of the electronic flash, but the difference in sensitivity between a film and an imaging device is not referenced.

SUMMARY OF THE INVENTION

It is therefore an object of the present invention to provide a hybrid camera in which a film recording system and an electronic image recording system can easily record fine images.

To achieve the above-described object, the present invention is directed to a hybrid camera comprising: an optical image recording device that records an optical image on a photographic film; an imaging device that converts an optical image into electric signals; an electronic image recording device that records image data, obtained by processing said electric signals outputted from said imaging device, in a recording medium; a flashing device that radiate auxiliary light to a subject; a flash controlling device that controls said flashing device, said flash controlling device controlling at least one of the light-emission timing and an amount of said auxiliary light according to setting of said optical image recording device so that said photographic film of said optical image recording device obtains an appropriate exposure when said optical image recording device and said electronic image recording device record images at one time; a first controlling device that controls image-recording of said optical image recording device and outputs exposure controlling information needed for image-recording of said electronic image recording device; and a second controlling device that controls the image-recording of said electronic image recording device according to the exposure controlling information inputted from said first controlling device.

The hybrid camera may further comprise an electronic flash mode setting device that sets an operation mode of said flashing device, and the flash controlling device may control light-emission of said flashing device according to the setting of the electronic flash mode setting device.

To achieve the above-described object, the present invention is directed to a hybrid camera comprising: a first recording device that has an optical system that records a subject image on a photographic film; a second recording device that has an imaging device converting an optical image into electric signals and an optical system forming a subject image on a light-receiving surface of said imaging device, said second recording device recording image data, obtained by processing said electric signals outputted from said imaging device, in a recording medium; a flashing device that emits light to a subject; a flash controlling device that controls said flashing device, said flash controlling device controlling at least one of the light-emission timing and an amount of said auxiliary light according to setting of said first recording device so that said photographic film of said first recording device obtains an appropriate exposure when said first recording device and said second recording device record images at one time; a first controlling device that controls image-recording of said first recording device and outputs exposure controlling information needed for image-recording of said second recording device; and a second controlling device that controls the image-recording of said second recording device according to the exposure controlling information inputted from said first controlling device.

In the photo film recording, exposure conditions are the F-number of the taking lens, the shutter speed and the film speed. It is necessary to determine the amount of the light of the flashing device while considering the subject distance as well as the conditions. Meanwhile, in the electronic image recording, exposure conditions are the F-number of the lens of the imaging device, the shutter speed and the signal amplification. It is necessary to determine the amount of the light of the flashing device while considering the subject distance as well as the conditions.

The film speed is fixed for each film cartridge, whereas the amplification of the imaging signals can be adjusted. In the present invention, the light amount of the flashing device or the like is set so that the exposure of the photographic film is appropriate, and the F-number of the lens of the imaging device, the shutter speed and the signal amplification are set according to the setting to perform both shootings at one time. Thus, both recording devices can record fine images.

The subject is dark when it is far from the camera since the output of a flashing device is generally limited. The latitude of a silver halide film is wider than that of an imaging device with respect to an amount of light, and thus the silver halide film can make up the shortage of the light with its latitude, but it is difficult for the imaging device. Since the shortage of the light can be made up to some extent by adjusting the amplification of the signals in the case of digital image recording, the control of the imaging device may be corrected according to the distance information obtained from a focusing device when the flashing device is used. Thus, almost the same images can be recorded by the film recording device (first recording device) and the electronic image recording device (second recording device) at one time.

To achieve the above-described object, the present invention is directed to a hybrid camera comprising: a first recording device that has an optical system that records a subject image on a photographic film; a second recording device that has an imaging device converting an optical image into electric signals and an optical system forming a subject image on a light-receiving surface of said imaging device, said second recording device recording image data, obtained by processing said electric signals outputted from said imaging device, in a recording medium; a flashing device that emits light to a subject; a mode selecting device that selects an operation mode of said hybrid camera, said mode selecting device selectively setting one of a first mode for recording an image by only said first recording device, a second mode for recording images by said first recording device and said second recording device and a third mode for recording an image by only said second recording device; and a flash controlling device that controls at least one of the light-emission timing and an amount of the light according to setting of said first recording device so that said photographic film of said first recording device obtains an appropriate exposure when one of the first mode or the second mode is set by said mode selecting device, and controls at least one of the light-emission timing and an amount of the light according to setting of said second recording device so that said imaging device of said second recording device obtains an appropriate exposure when the third mode is set by said mode selecting device.

To achieve the above-described object, the present invention is directed to a hybrid camera comprising: a first recording device that has an optical system that records a subject image on a photographic film; a second recording device that has an imaging device converting an optical image into electric signals and an optical system forming a subject image on a light-receiving surface of said imaging device, said second recording device recording image data, obtained by processing said electric signals outputted from said imaging device, in a recording medium; a flashing device that emits light to a subject; a mode selecting device that selects an operation mode of said hybrid camera, said mode selecting device selectively setting one of a double recording mode for recording images by said first recording device and said second recording device and an electronic image recording mode for recording an image by only said second recording device; and a flash controlling device that controls at least one of the light-emission timing and an amount of the light according to setting of said first recording device so that said photographic film of said first recording device obtains an appropriate exposure when the double recording mode is set by said mode selecting device, and controls at least one of the light-emission timing and an amount of the light according to setting of said second recording device so that said imaging device of said second recording device obtains an appropriate exposure when the electronic image recording mode is set by said mode selecting device.

BRIEF DESCRIPTION OF THE DRAWINGS

The nature of this invention, as well as other objects and advantages thereof, will be explained in the following with reference to the accompanying drawings, in which like reference characters designate the same or similar parts throughout the figures and wherein:

FIG. 17 is a flow chart showing the SM opening 1 processing (OFF→SHOOTING 1) of the hybrid camera in FIG. 1;

DETAILED DESCRIPTION OF THE PREFERRED EMBODIMENT

This invention will be described in further detail by way of example with reference to the accompanying drawings.

Figure 1:
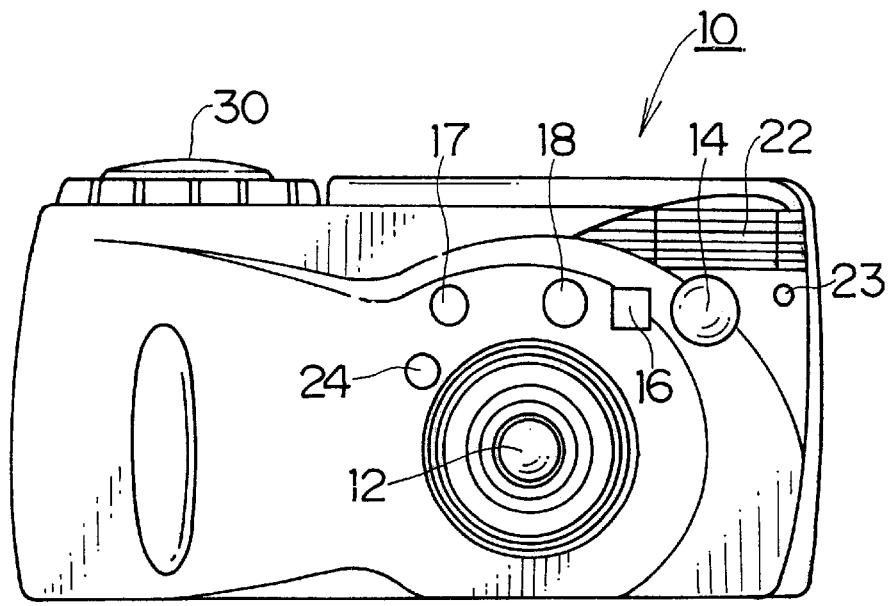
FIG. 1 is a front view of a hybrid camera according to an embodiment of the present invention.

FIG. 1 is a front view of a hybrid camera 10 according to the present invention. The camera 10 is compounded of a function as a silver halide camera that records an optical image with a silver halide film for 24 mm advanced photo system (APS) and a function as a digital still camera (DSC) that converts the optical image into electronic image data with a CCD solid imaging device (CCD) and records the electronic image data in a recording medium.

A taking lens (APS taking lens 12) for guiding the optical image to the surface of the silver halide photographic film is provided in the center of the front of the hybrid camera 10, and a DSC taking lens 14 that forms a subject image on a receiving surface of the CCD of the DSC is provided above the APS taking lens 12 off to the right. A finder window 16, an AF light-receiving part 17 and an AF light-emitting part 18 are arranged above the APS taking lens 12. Reference numeral 22 denotes an electronic flash window that is a light source for emitting light to a subject to supplement the light at the shooting, reference numeral 23 denotes an electronic flash light-adjusting sensor 23 and reference numeral 24 denotes a photometric window for measuring luminance of the subject.

A shutter release button (equivalent to a shooting start instructing member) 30 for starting opening and shutting a shutter at the shooting on the top of the hybrid camera 10. When the shutter release button 30 is half pressed, the luminance of the subject is measured through the photometric window 24 and the distance is determined by emitting infrared light from the AF light-emitting part 18 and receiving infrared light reflected by the subject with the AF light-receiving part 17 to automatically perform focusing according to the distance data.

Figure 2:
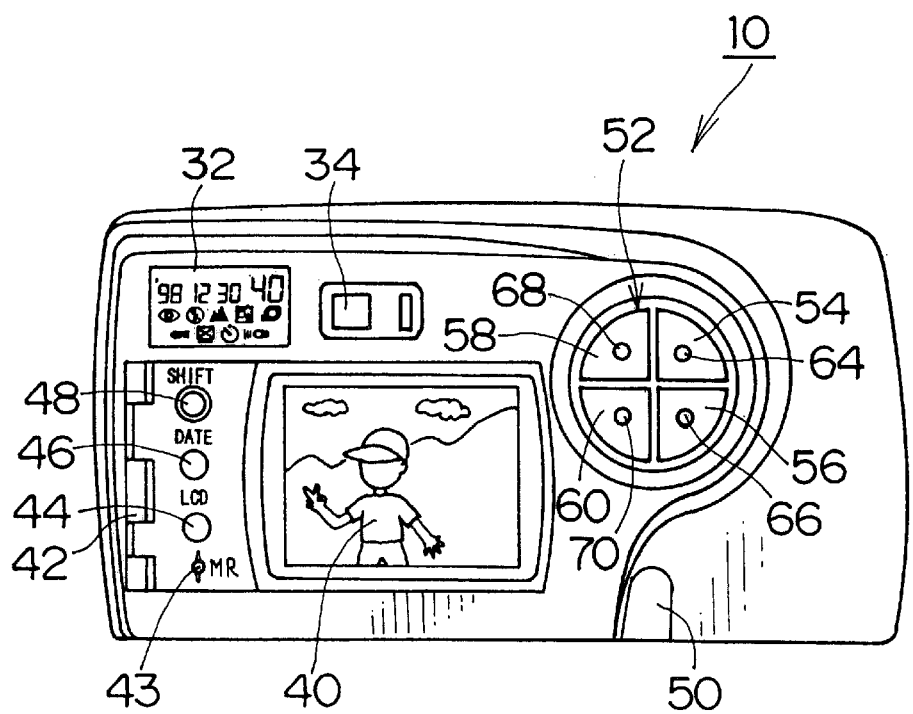
FIG. 2 is a back view of the hybrid camera in FIG. 1.

FIG. 2 is a back view of the hybrid camera 10. An APS displaying part 32 for displaying information mainly about a shooting mode and a state of the APS camera part, the time, residual amounts of batteries and a use state of the film, an eyepiece 34 of an optical finder and a liquid crystal monitor 40 (liquid crystal finder) that displays an image obtained by the DSC function and information are provided on the back of the hybrid camera 10. The liquid crystal monitor 40 is rotatably attached to the camera body through a hinge 42 with moderate friction, and the image displayed on the liquid crystal monitor 40 can be seen from the back and front of the hybrid camera 10 by adjusting the position of the liquid crystal monitor 40. The liquid crystal monitor 40, which will be explained in detail, displays an image equal to the subject image formed on the film and displays an image equal to a finder image observed through the optical finder.

A variety of operation keys is arranged on the back of the hybrid camera 10. Specifically, a rewinding (RW) switch 43 for forcibly rewinding the APS film, an LCD switch 44 for switching the display (mode) of the liquid crystal monitor 40, a DATE switch 46 for setting a time and date changing mode to change data of a time and date function provided to the camera, a SHIFT switch 48 for switching the function of later-described multi-function switches 52, a cartridge opening and shutting lever 50 for opening a lid (reference numeral 80 in FIG. 4) of a cartridge inserting part of the APS film, the multi-function switches 52, and so on are provided.

The multi-function switches 52 are composed of four separate switches, and whether or not a lamp that is a light-emitting member provided in each switch is ON or OFF can be seen.

An upper right lamp 64, a lower right lamp 66, an upper left lamp 68 and a lower left lamp 70 are provided in an upper right switch 54, a lower right switch 56, an upper left switch 58 and a lower left switch 60, respectively. The multi-function switches 52 are assigned different functions at each use mode. The lamps in the multi-function switches 52 can be ON, OFF and flickering.

Figure 3:
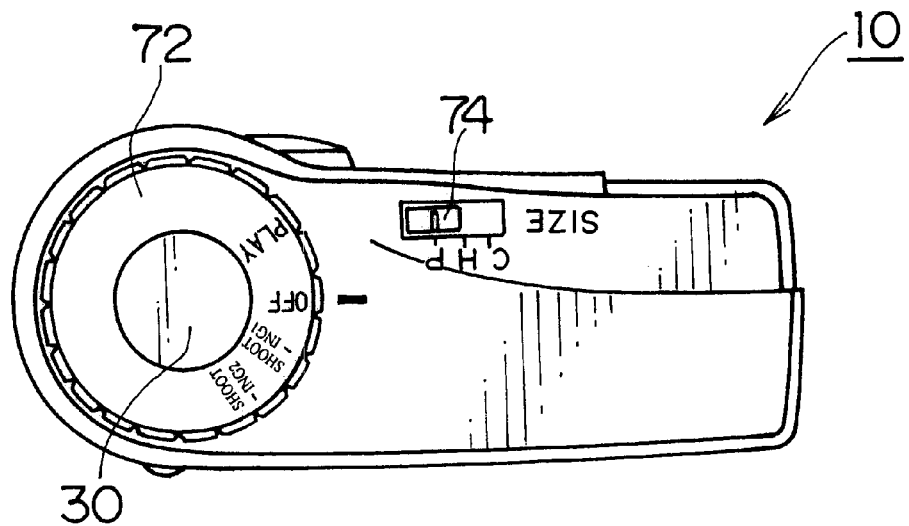
FIG. 3 is a plan view of the hybrid camera in FIG. 1.

FIG. 3 is a plan view of the hybrid camera 10. As shown in FIG. 3, a rotatable mode switching dial 72 and a CHP switch 74 for setting a print format at the shooting with the APS film are provided on the periphery of the shutter release button 30 on the top of the hybrid camera 10.

The mode switching dial 72 is an operation part for switching a mode, and the hybrid camera 10 has a mode "OFF" in which a shooting and a displaying are not performed, a mode "shooting 1" in which a shooting (APS shooting) with the APS film and a shooting (DSC shooting) with the DSC are performed at one time, a mode "shooting 2" in which only the APS shooting is performed and a mode "PLAY" in which the image obtained by the DSC shooting is displayed (regenerated and edited).

Figure 8:
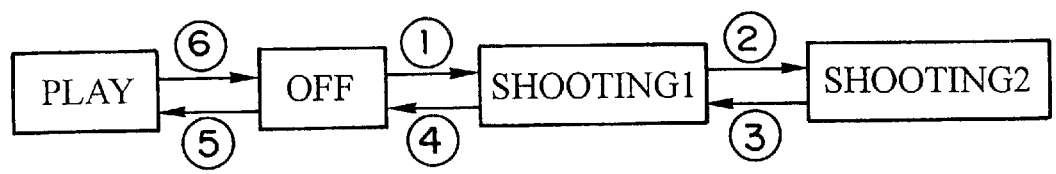
FIG. 8 is an explanation drawing showing mode switches by a mode switching dial provided in the hybrid camera in FIG. 1.

As shown in FIG. 8, by operating the mode switching dial 72, the mode is switched ① from "OFF" to "shooting 1", ② from "shooting 1" to "shooting 2", ③ from "shooting 2" to "shooting 1", ④ from "shooting 1" to "OFF", ⑤ from "OFF" to "PLAY" and ⑥ from "PLAY" to "OFF".

The CHP switch 74 is an operation member for switching the print format according to three types of print aspect ratios that are conventional (C), high-definition television (H) and panoramic (P). The CHP switch 74 is provided in such a way as to slide with respect to a member of the top of the hybrid camera 10, and is selectively put at one of three positions corresponding to the print formats of the C, H and P.

Figure 4:
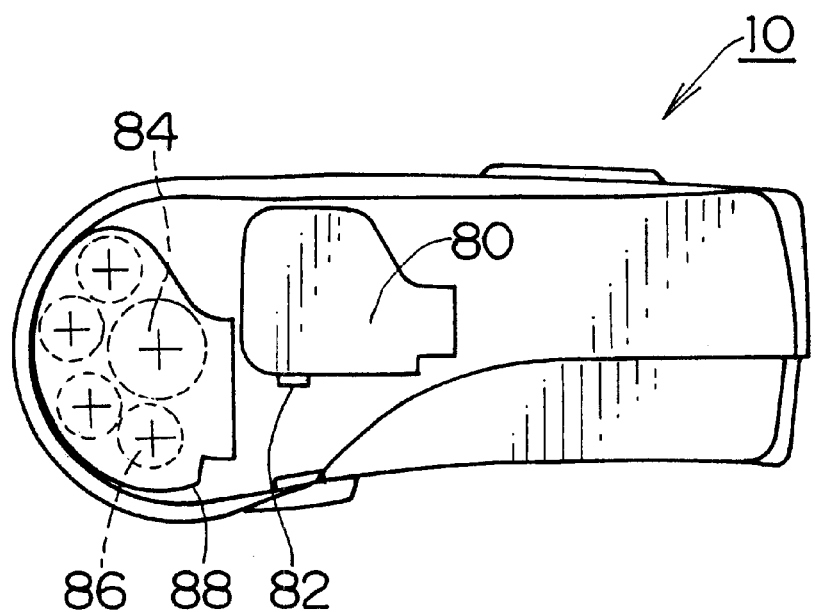
FIG. 4 is a bottom view of the hybrid camera in FIG. 1.

FIG. 4 is a bottom view of the hybrid camera 10. As shown in FIG. 4, the cartridge lid 80 that is a lid of an APS film cartridge chamber, a detecting switch 82 that detects whether the cartridge lid 80 is open or closed, a battery (APS battery) 84 for the APS shooting, a battery (DSC battery) 86 for the DSC shooting and a battery lid 88 that is a lid of a space (chamber) for the batteries 84 and 86 are arranged on the bottom of the hybrid camera 10.

A reading sensor (not shown) that detects whether the APS film is loaded and optically reads a rotary barcode of a data disc provided in the APS film cartridge is arranged in the cartridge chamber. Film information about the type of the film, the total number of frames, the ISO speed and so on is recorded in the data disc, and the information of the newly-loaded film is automatically read by the reading sensor and the results are sent to a central processing unit (APSCPU) of the APS that controls the camera.

Figure 5:
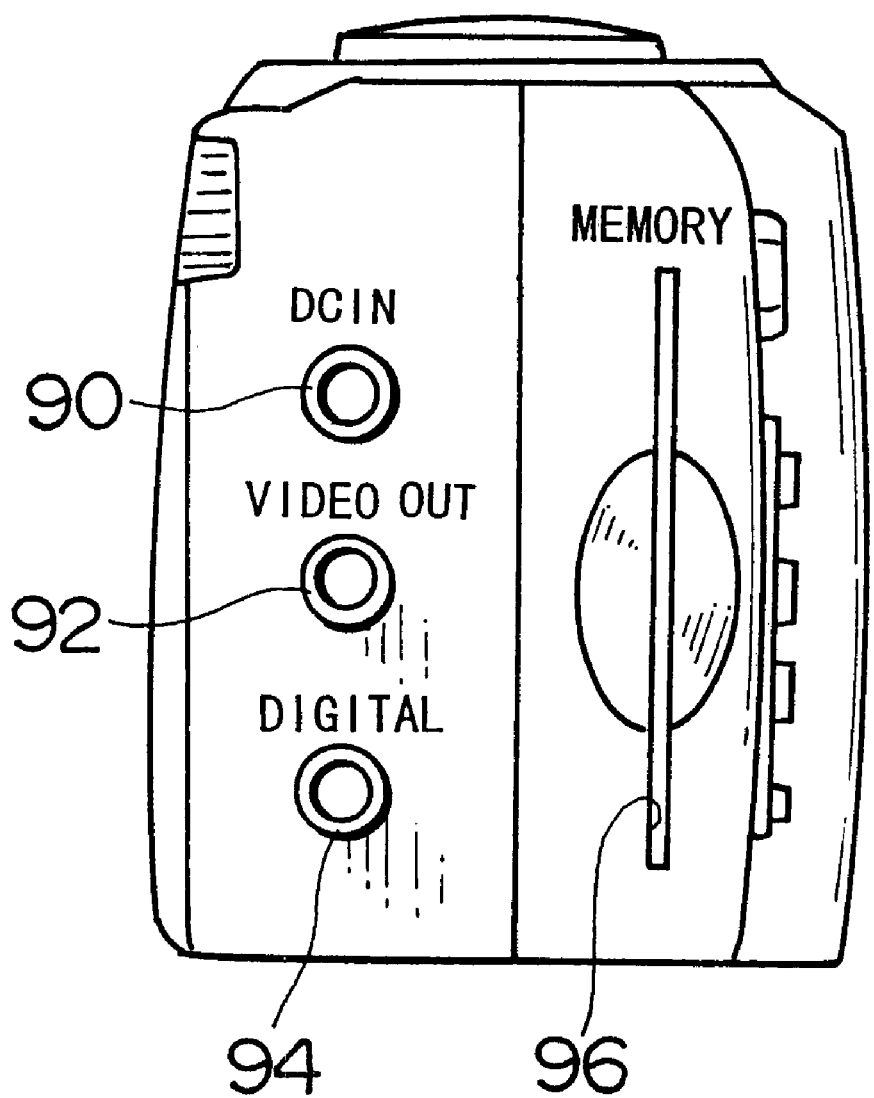
FIG. 5 is a right side view of the hybrid camera in FIG. 1.

FIG. 5 is a right side view of the hybrid camera 10. As shown in FIG. 5, an external power source connector (DC power source connector) 90 for supplying power to the hybrid camera 10 in stead of the APS battery 84 and the DSC battery 86, a video signal output part 92 that is an output part for outputting image data of the DSC as video signals, a digital signal input and output part 94 that is an input and output port for outputting image data of the DSC as digital signals and a card interface in and from which a recording medium 96 such as a memory card for recording the image data of the DSC is inserted and extracted are provided on the right side of the hybrid camera 10. The recording medium 96 is not limited, and it may be a smart media, a PC card, a flash memory card, an IC card, an optical-magnetic disc, a memory stick and so on. The recording medium 96 is not limited to a detachable external recording medium, and it may be an internal memory built in the camera body.

Figure 6:
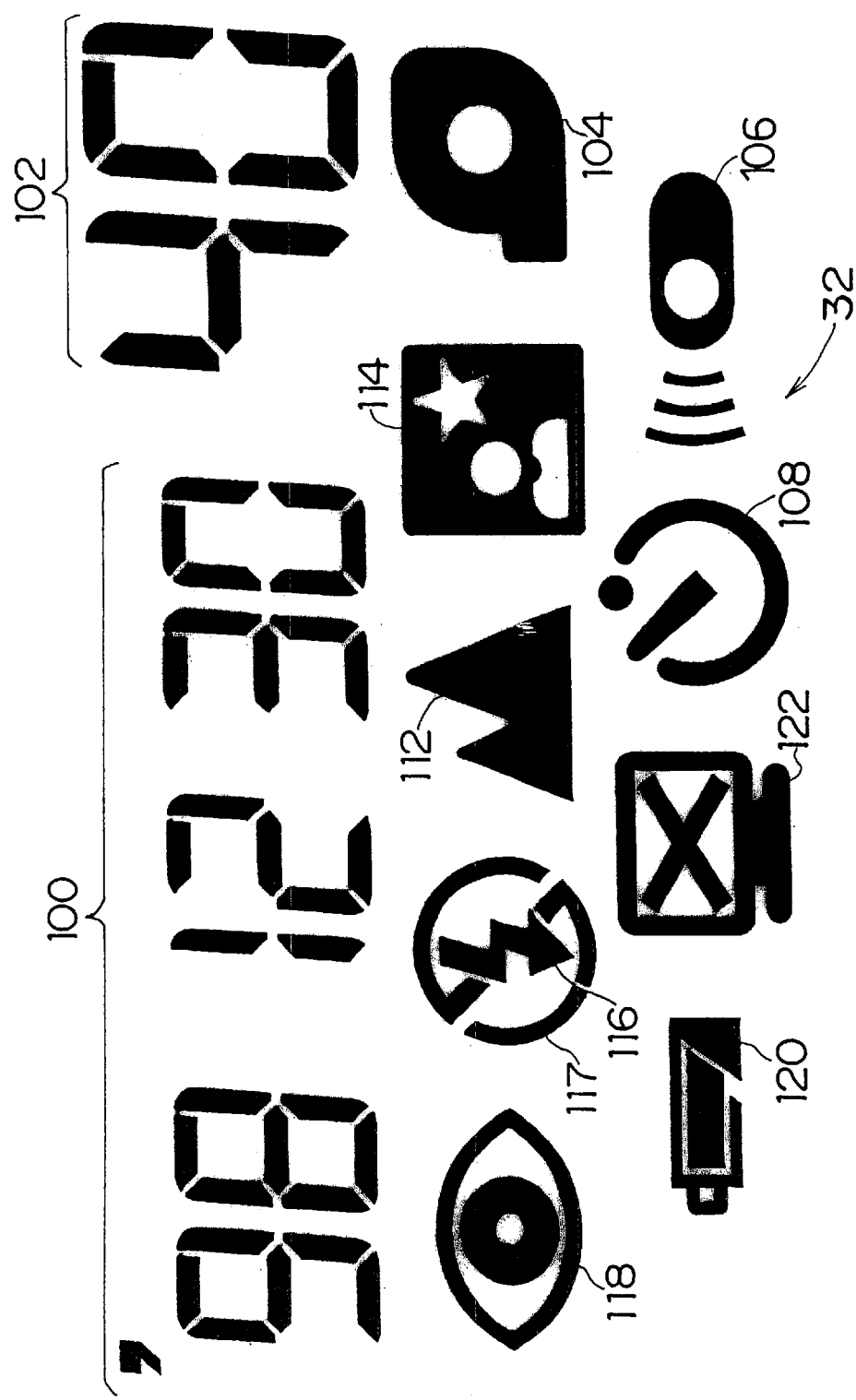
FIG. 6 is an explanation drawing showing the display of an APS displaying part provided on the back of the hybrid camera in FIG. 1.

FIG. 6 shows the display of the APS displaying part 32 provided on the back of the hybrid camera 10.

As shown in FIG. 6, a DATE displaying part 100 that displays the year, the month and the day is provided on the APS displaying part 32, and the display order of the DATE displaying part 100 can be changed to the order of the month, the day and the year and the order of the day, the month and the year. The DATE displaying part 100 is also used as a displaying part that displays information about the number of prints (PQ) and information about the selection of a title (ST).

A film residual frame number displaying part 102 displays the number of residual frames of the APS film, and it indicates that the APS film cartridge is loaded if a cartridge load displaying part 104 is displayed.

If a remote control mode displaying part 106 is displayed, it indicates that a mode in which a remote control can be used is set.

A self-timer displaying part 108 that displays whether a self-timer mode is set is provided. If the self-timer mode is displayed, the film residual frame number displaying part 102 displays the self-timer mode.

A distant view mode displaying part 112 that is displayed when a distant view mode is set, a night view mode displaying part 114 that is displayed when a night view mode is set, an electronic flash displaying part 116 that is displayed when the electronic flash emits light to supplement the light at the shooting, an electronic flash light-emission ban displaying part 117 that is displayed when a mode in which the electronic flash is prohibited from emitting the light is set and a red-eye reduction mode displaying part 118 that is displayed when a mode in which red-eye effect at the shooting is reduced by performing an emission of light a few times before the electronic flash emits the light to close pupils of eyes of the subject is set are provided.

In addition, an APS battery residual amount displaying part 120 that displays the residual amount of the APS battery 84 and a DSC battery residual amount displaying part 122 that displays the residual amount of the DSC battery 86 are provided.

Figure 7:
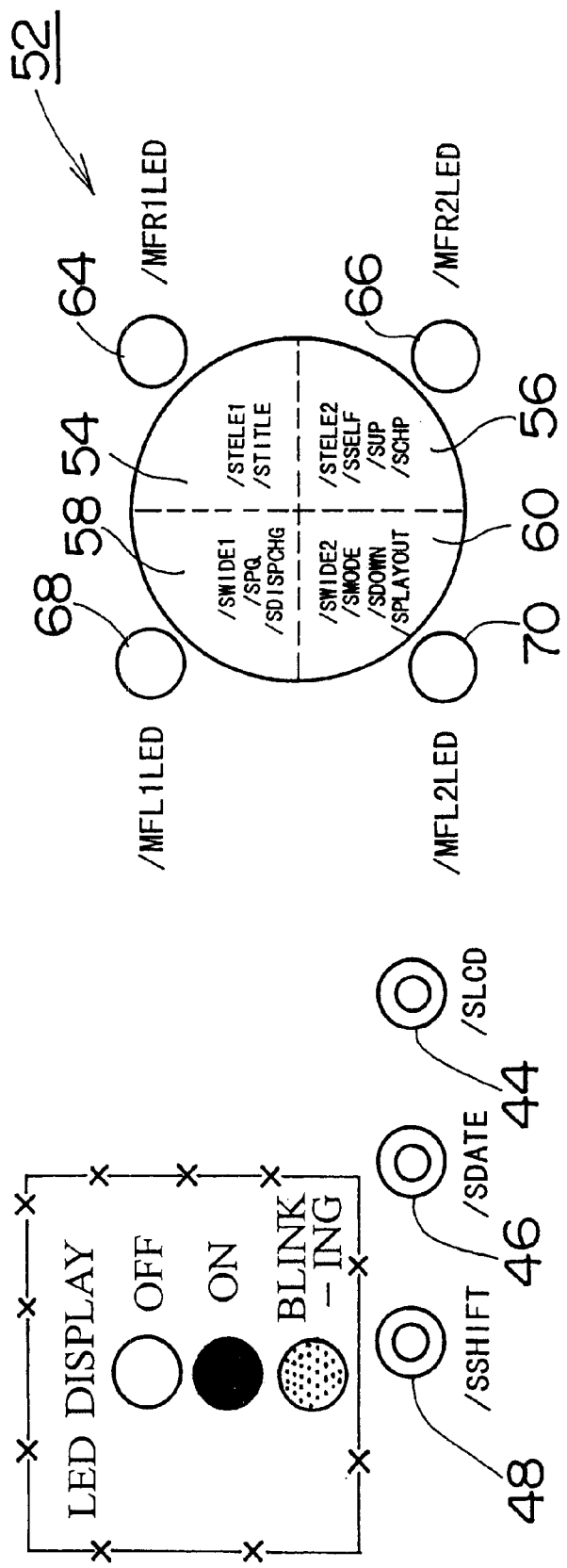
FIG. 7 is an explanation drawing showing functions assigned to the multi-function switches provided in the hybrid camera in FIG. 1.

FIG. 7 shows functions assigned to the multi-function switches 52. The upper right lamp 64 is referred to as /MFR1LED in programs, and whether the LED is ON is shown according to an LED display legend in FIG. 7. Likewise, the lower right lamp 66, the upper left lamp 68 and the lower left lamp 70 are referred to as /MFR2LED, /MFL1LED and /MFL2LED, respectively. All the LEDs in FIG. 7 are OFF.

In regular assignment, the upper right switch 54 and the lower right switch 56 are switches /STELE1 and /STELE2, respectively, for zooming toward the telephoto side.

In the regular assignment, the upper left switch 58 and the lower left switch 60 are switches /SWIDE1 and /SWIDE2, respectively, for zooming toward the wide side. While the shift switch 48 is being pressed, the upper right switch 54 is a mode setting switch /STITLE for setting a title of the exposed APS film and the upper left switch 58 is a mode setting switch /SPQ for setting the number of the prints.

If the shift switch 48 is pressed when the mode switching dial 72 is set at "shooting 1" or "shooting 2", the lower right switch 56 is a switch /SSELF for switching the modes of the self-timer and the remote control. Each time the switch /SSELF is pressed, the mode is switched to self-timer 1 shot, self-timer 2 shots, remote control mode, normal mode and cyclic mode, in rotation.

If the shift switch 48 is pressed when the mode switching dial 72 is set at "shooting 1" or "shooting 2", the lower left switch 60 is a switch /SMODE for setting a variety of modes of the electronic flash. The switch /SMODE is a switch for switching a digital program (DP) mode in which the light-emission amount of the electronic flash is determined according to the measured brightness and the distance to the subject, a PRE mode (red-eye effect reduction mode) for previously contracting the pupils at the light-emission of the electronic flash, an ON mode for forcibly making the electronic flash emit the light, an OFF mode for not making the electronic flash emit the light, an INF mode (distant view mode) for shooting a distant view and a night view portrait mode (NVP mode) for shooting a night view, in cyclic rotation.

In the title setting mode, the print number setting mode and so on, the lower right switch 56 and the lower left switch 60 are mode selecting switches /SUP and /SDOWN, respectively, for selecting a mode.

If the mode switching dial 72 is set at "PLAY", the APS shooting is not performed and thus the mode for setting the self-timer and the mode for switching a mode of the electronic flash are not necessary. Therefore, if the mode switching dial 72 is set at "PLAY" and the SHIFT switch 48 is being pressed, the lower left switch 60 is a switch /SPLAYOUT for digital-outputting an image shot by the DSC from the digital signal input and output part 94. The lower right switch 56 is a switch /SCHP for setting a mode used when print format magnetic information of the APS film is edited.

If the mode switching dial 72 is set at "PLAY" and the SHIFT switch 48 is not being pressed, the upper left switch 58 is a switch /SDISPCHG for switching the display of the liquid crystal monitor 40 between one-image display and multi-image display (four-image display) in which four images are displayed.

Figure 9:
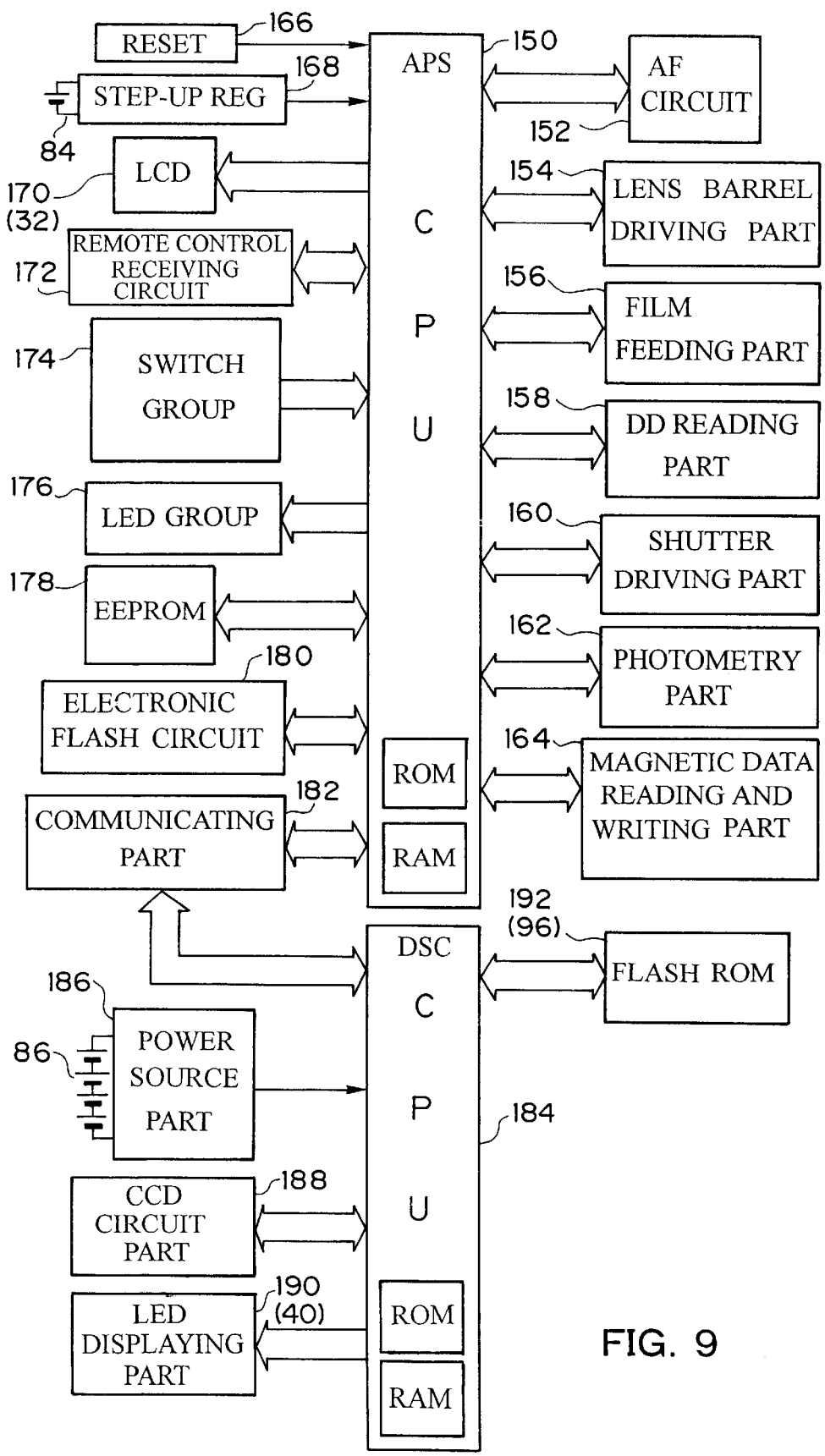
FIG. 9 is a block diagram showing the structure of the hybrid camera in FIG. 1.

FIG. 9 is a block diagram showing the structure of a control part of the hybrid camera 10. As shown in FIG. 9, the control part of the hybrid camera 10 mainly comprises an APS control part that controls the silver halide camera functions and a DSC control part that controls the electronic camera functions. The control parts communicate with each other to exchange information.

The APSCPU 150 performs main control of the APS control part and a CPU 184 (DSCCPU) performs main control of the DSC control part. The APSCPU 150 has the initiative in controlling the whole camera, and the DSCCPU 184 is subordinately controlled by the APSCPU 150.

An AF circuit 152 includes the AF light-emitting part and the light-receiving part explained in FIG. 1, and measures the distance to perform the zooming. A lens barrel driving part 154 sticks a lens barrel to a shooting position for the shooting and withdraws the lens barrel after the shooting. A film feeding part 156 controls the feeding of the APS film. A data disc (DD) reading part 158 reads the information of the data disc provided in the APS film cartridge. A shutter driving part 160 controls the opening and shutting of the shutter at the shooting. A photometry part 162 measures the amount of light at the subject. A magnetic data reading and writing part 164 writes and reads magnetic information in and from a magnetic recording layer of the film during the feeding of the film.

A reset instructing part (RESET) 166 monitors the voltage of the power source and resets the APSCPU 150. A step-up regulator (REG) 168 can determine the residual amount of the APS battery 84, and it raises and stabilizes the voltage of the APS battery 84. An LCD 170 is equivalent to a liquid crystal displaying panel of the APS displaying part 32 explained in FIG. 2, and the APSCPU 150 controls the display of the LCD 170. A remote control receiving circuit 172 receives a signal from the remote control (not shown), used when the user is the subject, or the like, and processes the signal to send the signal to the APSCPU 150.

A switch group 174 includes a variety of operation switches such as the shutter release button 30 and the multi-function switches 52, the state of each switch (whether the switch has been operated) is monitored and a signal according to the state is inputted to the APSCPU 150. An LED group 176 is equivalent to the LEDs provided in the multi-function switches 52, and the display of the LED group 176 is controlled by the APSCPU 150.

An electrically erasable programmable ROM (EEPROM) 178 stores a variety of parameters and data regarding the control of the camera. The information recorded in the EEPROM 178 does not volatize even if the APS battery 84 is exhausted or left outside the camera for a long time.

An electronic flash circuit 180 controls the light-emission of the electronic flash according to a shooting mode set with the shooting mode switch and external luminance measured by the photometry part 162. A communicating part 182 controls communication so that the APSCPU 150 and the DSCCPU 184 can exchange the information. The APSCPU 150 has a ROM and a RAM, and the ROM stores a program for controlling the camera, and so on, and the RAM is used as a work area of the APSCPU 150.

The DSCCPU 184 performs the main control of the DSC. A power source part 186 comprises a regulator that can determine the residual amount of the DSC battery 86, and it raises and stabilizes the voltage of the DSC battery 86 that is the power source of the DSC. A CCD circuit part 188 controls the drive of the CCD and transfers image data, obtained from the CCD, to the DSCCPU 184.

An LCD displaying part 190 is equivalent to the liquid crystal monitor 40 explained in FIG. 2, and it displays the image (shot image) obtained through the CCD and information. A flash ROM (FLASHROM) 192 is a controller that controls the recording medium 96 explained in FIG. 5.

The outline of the operation of the hybrid camera 10 in each mode will now be explained.

As described above, to perform the hybrid shooting in which both the APS shooting and the DSC shooting are performed, the mode switching dial 72 (see FIG. 3) is set at "SHOOTING 1". Then, an APS film count number is displayed on the APS displaying part 32 and the lens barrel of the APS taking lens for the APS film sticks and information about the CHP switch 74 is read to enable the APS shooting. The APSCPU 150 of the hybrid camera 10 turns on the power source part 186 of the DSC controlling part to activate the DSCCPU 184 and transmits date data and a DSC animation display command, for displaying images that are being imaged as an animation on the liquid crystal monitor 40, to the DSCCPU 184. Accordingly, the liquid crystal monitor 40 displays the images and data such as the date.

Then, the hybrid camera 10 is pointed at the subject and the shutter release button 30 is pressed with a desired camera angle. The photometry and the focusing are performed after a variety of errors in the camera is monitored, and the APS shooting and the DSC shooting are performed for the subject at one time while the electronic flash emits the light as need arises. The image data obtained by the DSC shooting is recorded in the recording medium 96.

After the shooting, the APS film is fed for one frame. At the same time, the CHP data, the print number data (PQ), the title selection data (ST), the date data, and so on are recorded in a magnetic recording layer of the film, that is corresponding to the frame. The image shot by the DSC is displayed on the liquid crystal monitor 40 for a predetermined time to be seen after the shooting.

To perform only the APS shooting, the mode switching dial 72 is set at "SHOOTING 2". The DSC shooting becomes not possible and only the APS shooting becomes possible.

To display the image recorded by the DSC shooting or edit the data at the shooting, the mode switching dial 72 is set at "PLAY". The liquid crystal monitor 40 of the hybrid camera 10 displays the latest shot image, and displays the latter or former image by the operation of the lower right switch 56 and the lower left switch 60 at the mode "PLAY".

There are modes "SHOOTING 1", "SHOOTING 2" and "PLAY", but the camera may further have a mode for performing only the DSC shooting.

A diaphragm (not shown) is arranged in front of the CCD, equivalent to an imaging part of the DSC. The diaphragm switches the aperture between full aperture (F2.8) and smaller aperture (F5.6). When a shooting is performed in the mode "SHOOTING 1" without the electronic flash, the AE of the DSC is performed independently from that of the APS. In the AE, the aperture of the diaphragm is chosen, and the gain of the CCD is adjusted, and the shutter speed is controlled. The image-capturing of the DSC is synchronized with the opening and shutting of the shutter of the APS.

In the case of fill-in flash, the AE of the DSC is performed independently from that of the APS even if the electronic flash is used in the mode "SHOOTING 1". In the AE, the aperture of the diaphragm is chosen, and the gain of the CCD is adjusted, and the shutter speed is controlled. There is a time lag for one frame (one vertical synchronizing signal) between the image-capturing of the DSC and the exposure of the APS. The time lag can help to prevent the following problem. When a shooting is performed with the electronic flash where there is more light than necessary, the film image is within a permissible range, whereas the CCD image becomes white since the latitude of the film is different from that of the CCD.

An explanation will now be given of the case where the image-capturing of the DSC is synchronized with the opening and shutting of the shutter of the APS with the electronic flash in the mode "SHOOTING 1". In this case, the electronic flash is controlled according to the setting of the APS so that the exposure of the photo film is appropriate. Then, in the DSC, the aperture of the diaphragm is chosen, and the gain of the CCD is adjusted, and the shutter speed is controlled according to information (CCD exposure controlling information) sent from the APS.

Specifically, data CCDAV indicating whether or not the CCD diaphragm is closed and data CCDR, CCDG and CCDB indicating are transmitted from the APS to the DSC (DSCCPU 184) as communication data. The DSC converts the received CCDR, CCDG and CCDB into the setting gain of the CCD (CCD gain) to use the data for controlling.

The CCDAV corresponds to data about the diaphragm, and CCDAV=0 means that the CCD diaphragm is open (full aperture: F2.8) and CCDAV=1 means that the CCD diaphragm is closed (smaller aperture: F5.6).

The CCDAV, CCDR, CCDG and CCDB are calculated by the following equations 1, 2, 3 and 4;

$$DSCGV = DSCAV + DSCDV - ZV2 + SV - 48 \quad \text{equation 1,}$$

$$CCDG = 16 \times (DSCGV - E\_CCDCEPT)/(E\_CCDTEND) \quad \text{equation 2,}$$

$$CCDR = CCDG + E\_WB\_R \quad \text{equation 3,}$$

and $$CCDB = CCDG + E\_WB\_B \quad \text{equation 4.}$$

In the equations 1–4, the DSCGV is the gain of the CCD in the APEXS notation, and it is determined with the gain of Green. If the Green CCD gain is defined in equation 5, $$CCD\ gain = 2^{CCDG/16} \quad \text{equation 5;}$$

$$DSCGV = E\_CCDTEND \times CCDG/16 + E\_CCDCEPT \quad \text{equation 6.}$$

E_CCDTEND, E_CCDCEPT, E_WB_R and E_WB_B are fixed numbers indicating design values, and the data of the design values is stored in the EEPROM. E_CCDTEND is within the range between 5 and 20, and E_CCDCEPT is within the range between −15 and +15. E_WB_R is an adjusting value of Red (R) for adjusting the white balance, and it is within the range between −32 and +32. E_WB_B is an adjusting value of Blue (B) for adjusting the white balance, and it is within the range between −32 and +32.

DSCAV indicates the aperture value of the CCD, and it is calculated from the CCD aperture (the switched aperture of the diaphragm) and the zoom position. If the CCD aperture is the full aperture, $$DSCAV = E\_DSCAVw + E\_DSCZV \quad \text{equation 7;}$$

and if the CCD aperture is the smaller aperture, $$DSCAV = E\_DSCAVt + E\_DSCZV \quad \text{equation 8.}$$

E_DSCAVw is a fixed number within the range between 18 and 30, and E_DSCAVt is a value that varies within the range between 0 and 15. The data of E_DSCAVw and E_DSCAVt is stored in the EEPROM 178.

ZV2 is the reduced light amount from the light amount in the case of the full aperture, and it varies within the range between 0 and 13 according to the zoom position. The closer the zoom position is to the Telephoto end, the larger the ZV2 is.

SV is a value corresponding to the ISO speed, and SV varies within the range between 32 and 62 according to the ISO speed within the range between 50 and 672.

DSCDV is the correction amount beyond association with the maximum arrival distance of the electronic flash light, and it is calculated by the equation 9, $$DSCDV = AV0 - (20 - DV) + (SV - 40) - ZV2 + GV \quad \text{equation 9.}$$

AV0 is a value that varies within the range between 40 and 36 according to the zoom position. DV is a value corresponding to the subject distance obtained from the focusing result; and the larger the subject distance is, the smaller the DV is. GV is a value corresponding to the guide number (GNo) of the electronic flash, and GV is 52 in this embodiment.

If DSCDV calculated by the equation 9 is 0 or less, it is set at 0; and if DSCDV is 12 or more, it is set at 12.

CCDAV, CCDG, CCDR and CCDB are calculated as follows.

(step 1) DSCDV is calculated from the distance information, the ISO speed, the zoom position and GNo by the equation 9.

(step 2)DSCAV is calculated by the equation 7 while the DSC aperture is assumed to be the full aperture, and CCDAV is set at 0 at this time.

(step 3)DSCGV is calculated by the equation 1.

(step 4)Whether or not DSCGV calculated by the equation 3 is smaller than the predetermined design value E_DSCGV0. If DSCGV is smaller than E_DSCGV0, DSCAV is recalculated. DSCAV is calculated by the equation 8 while the DSC aperture is assumed to be the smaller aperture, and CCDAV is set at 1 at this time. E_DSCGV0 is the CCD aperture switch determination value, and it is set within the range between 2 and 44 (for example, 22), and the data is stored in the EEPROM.

(step 5)The green gain (CCDG) of the CCD is calculated by the equation 2. If CCDG is 32 or less, it is set at 32; and if CCDG is 90 or more, it is set at 90.

(step 6)The red gain (CCDR) of the CCD is calculated by the equation 3. If CCDR is 32 or less, it is set at 32; and if CCDR is 90 or more, it is set at 90.

(step 7)The blue gain (CCDB) of the CCD is calculated by the equation 4. If CCDB is 32 or less, it is set at 32; and if CCDB is 90 or more, it is set at 90.

(step 8)CCDAV obtained at the step 4 or 5, CCDG, CCDR and CCDB obtained at steps 5, 6 and 7 are communicated from the APS to the DSCCPU 184. The shutter speed of the DSC when the electronic flash is used is fixed at a predetermined value (such as 1/30 second and 1/60 second).

The DSC captures an image according to the values communicated from the APS. Thus, the gain of the DSC is adjusted at an appropriate value according to the subject distance, and a fine image can be acquired at the light-emission of the electronic flash.

The processing of the hybrid camera 10 now will be explained with reference to flow charts shown in FIGS. 10–61.

FIGS. 10–13 are flow charts showing a branching processing.

Figure 10:
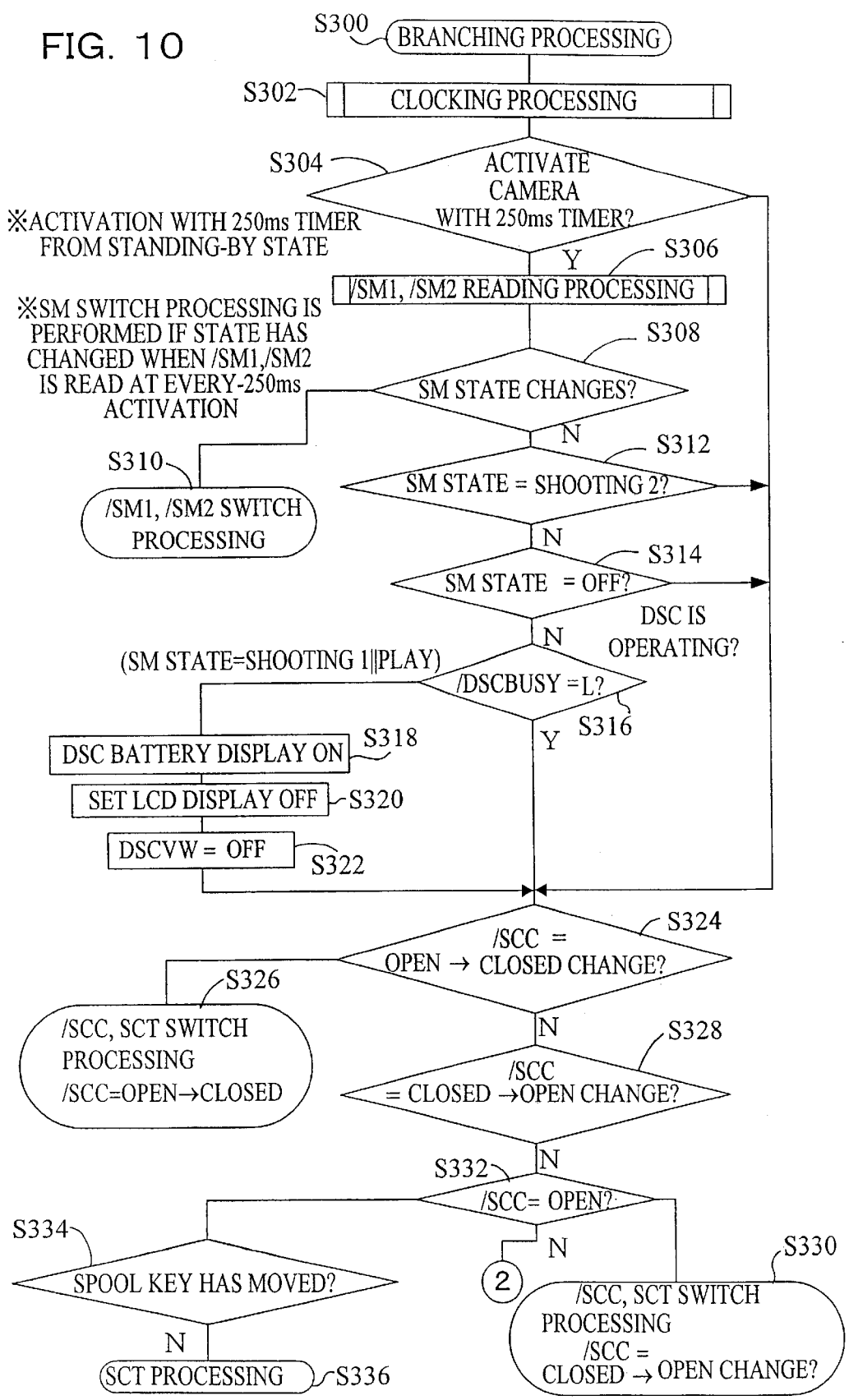
FIG. 10 is a flow chart showing a branching processing of the hybrid camera in FIG. 1.

Step 300 (S300) in FIG. 10 is a starting step of the branching processing. The "BRANCHING PROCESSING" of S300 is the main routine of a branching processing program flow that will be described below, and routines of the function switches, a clocking processing and a timer processing branch off from the routine of the "BRANCHING PROCESSING".

The "CLOCKING PROCESSING" of S302 is a clocking processing such as an integrating processing of the time displayed on the displaying part of the camera.

In "ACTIVATE CAMERA WITH 250 ms TIMER?" of S304, a timer with a time interval of a key scanning for monitoring changes of states of input switches is set. In the embodiment, the time interval is 250 ms.

"/SM1, /SM2 READING PROCESSING" of S306 is a subroutine for reading the setting of the mode switching dial 72. The processing of S306 will be explained in detail.

In "SM STATE CHANGES?" of S308, whether the setting of the mode switching dial 72 has changed from that is read at the last program scanning is determined. The process goes to "/SM1, /SM2 SWITCH PROCESSING" of S310 if the setting of the mode switching dial 72 has changed, and the process goes to "SM STATE=SHOOTING 2?" of S312 if the setting of the mode switching dial 72 has not changed.

S310 is a subroutine from which set processings branch off according to the setting of the mode switching dial 72. The processing of S310 will be explained in detail.

In "SM STATE=SHOOTING 2?" of S312, if the setting of the mode switching dial 72 is "SHOOTING 2", the process goes to "/SCC=OPEN CLOSED→CHANGE?" of S324 in stead of a routine for monitoring the state of the DSC that will be described later. If the setting of the mode switching dial 72 is not "SHOOTING 2", the process goes to "SM STATE=OFF?" of S314.

At S314, if the setting of the mode switching dial 72 is "OFF", the process goes to S324 in stead of the routine for monitoring the state of the DSC that will be described later. If the setting of the mode switching dial 72 is not "OFF", the process goes to "/DSCBUSY=L?" of S316.

At S316, the APSCPU 150 determines whether the DSC battery 86 is exhausted or not through the communicating part 182. The DSC battery 86 is fine if the port state of /DSCBUSY is L (Low), the voltage of the DSC battery 86 is low and the DSC battery 86 is not suitable for continuous use if the port state of /DSCBUSY is H (High). If the port state of /DSCBUSY is not L at S316, "DSC BATTERY DISPLAY ON" of S318 branches off.

At S318, the APSCPU 150 instructs the APS displaying part 32 to display a warning that the DSC battery 86 is exhausted to inform the operator that the voltage of the DSC battery 86 is low.

"SET LCD DISPLAY OFF" of S320, the function of the liquid crystal monitor 40 is stopped to stop the function of the DSC since the DSC battery 86 is exhausted. In "DSCVW=OFF" of S322, the APSCPU 150 instructs the DSCCPU 184 to cut off the power supply for the DSC through the communicating part 182. Therefore, even if the mode "SHOOTING 1" for performing the APS shooting and the DSC shooting at one time is set, only the APS shooting is performed while the DSC is shut down when the DSC battery 86 is exhausted and it is difficult to continue the DSC shooting.

At S324, switch cartridge chamber (SCC) information of the detecting switch 82 that detects whether the APS cartridge lid 80 is open or closed is read, and the information is compared with SCC information that is read at the last software scanning (poring) to determine which step to go. If the SCC information read at the last software scanning is "OPEN" and the latest SCC information is "CLOSED", the process goes to "/SCC, SCT SWITCH PROCESSING/SCC=OPEN→CLOSED CHANGE" of S326. In the other cases, the process goes to "/SCC=CLOSED→OPEN CHANGE?" of S328.

At S326, whether the film cartridge is loaded is determined, and then a preference is given to the loading processing of the film cartridge or the processing without the film cartridge.

In "/SCC=CLOSED→OPEN CHANGE?" of S328, if the SCC information read at the last software scanning is "CLOSED" and the latest SCC information is "OPEN", the process goes to "/SCC, SCT SWITCH PROCESSING/SCC=CLOSED→OPEN CHANGE?" of S330. In the other cases, the process goes to "/SCC=OPEN?" of S332.

At S332, whether the cartridge lid 80 of the APS film is open is determined. The process goes to "spool key has moved?" of S334 if the cartridge lid 80 is open, and the process goes to "/SMR=ON?" of S342 in FIG. 11 if the cartridge lid 80 is not open. In S334, whether the spool of the APS film cartridge is stopped at a position that is "X" in VEI display (a position that indicates the exposed film cartridge). The process goes to "/SMR=ON?" of S342 in FIG. 11 if the spool is stopped at the position that is "X" in VEI display, the process goes to "SCT PROCESSING" of S336 if the spool is not stopped at the position that is "X". In S336, the spool key is moved to rotate the spool of the film cartridge so that the spool is stopped at the position that is "X" in VEI display.

Figure 11:
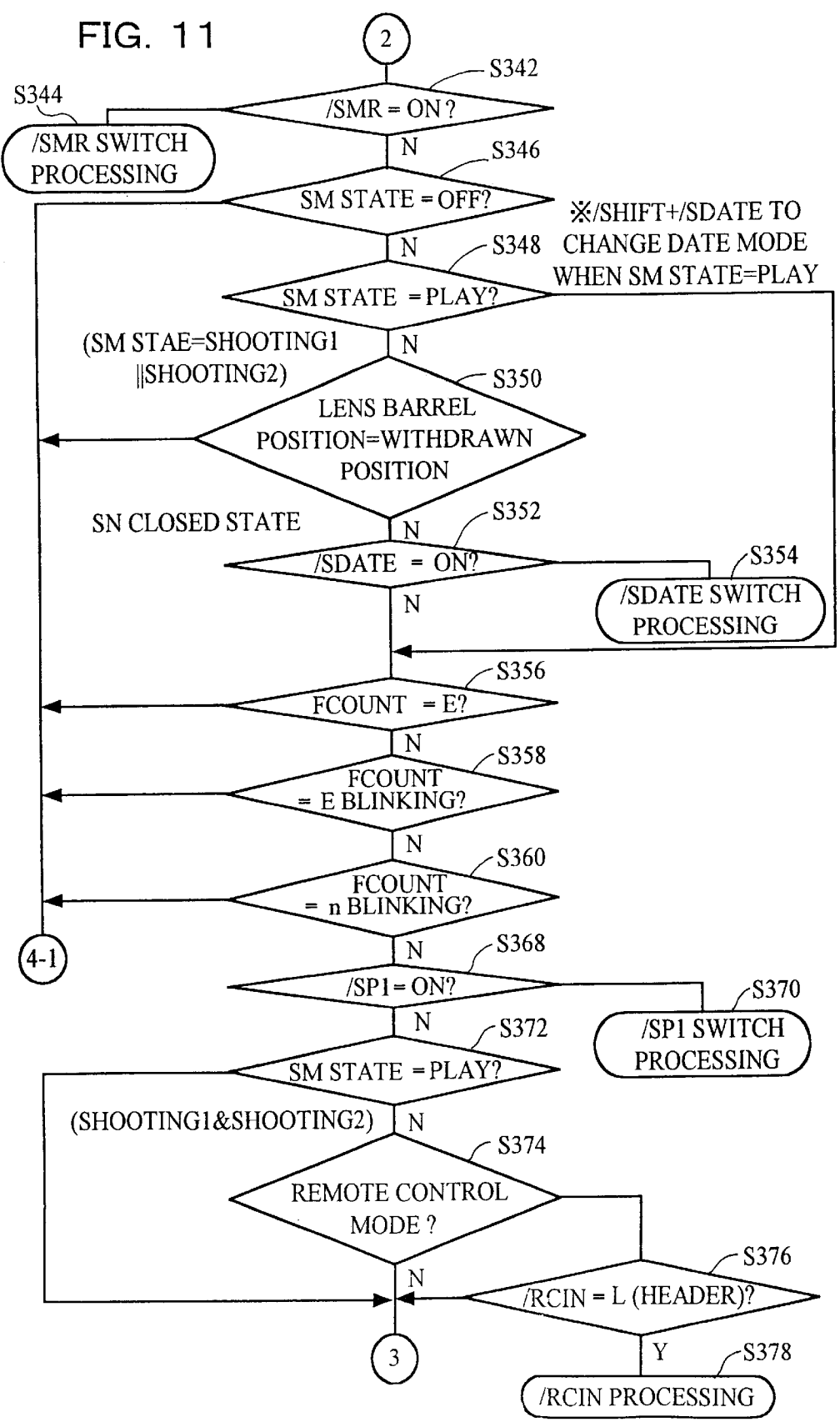
FIG. 11 is a flow chart showing the branching processing of the hybrid camera in FIG. 1.

At S342 in FIG. 11, the state of the RW switch 43 (APS film forcible rewinding) is determined. If the RW switch 43 is being pressed (ON), the process goes to "/SMR SWITCH PROCESSING" of S344 to perform the APS film forcible rewinding. If the RW switch 43 is not being pressed, the process goes to "SM STATE=OFF?" of S346.

At S346, whether the setting of the mode switching dial 72 is "OFF" is determined. If the setting of the mode switching dial 72 is "OFF", the process goes to "standing-by processing" of S440 in FIG. 13. If the setting of the mode switching dial 72 is "OFF", the process goes to "SM STATE=PLAY?" of S348.

At S348, whether the setting of the mode switching dial 72 is "PLAY" is determined. If the setting of the mode switching dial 72 is "PLAY", the process goes to "FCOUNT=E?" of S356. If the setting of the mode switching dial 72 is not "PLAY", the setting of the mode switching dial 72 is either "SHOOTING 1" or "SHOOTING 2" and thus the process goes to "LENS BARREL POSITION= WITHDRAWN POSITION?" of S350.

At S350, the lens barrel position of the lens for the APS shooting is determined and whether the lens barrel is at the withdrawn position is determined. When the setting of the mode switching dial 72 is "SHOOTING 1" or "SHOOTING 2", the lens barrel is supposed to be out for the APS shooing at "/SM1, /SM2 SWITCH PROCESSING?" of S310. If the lens barrel is at the withdrawn position in this case, and the shooting is canceled since something has malfunctioned and the process goes to "STANDING-BY PROCESSING" of S440 to stop "BRANCHING PROCESSING" of S300. If the lens barrel is not at the withdrawn position, it is determined that the shooting is possible and the process goes to "/SDATE=ON?" of S352.

At S352, whether the DATE switch 46 for displaying the DATE mode on the APS displaying part 32 in rotation is being pressed is determined. If the DATE switch 46 is being pressed, the process goes to "/SDATE SWITCH PROCESSING" of S354 for displaying the DATE mode or changing the date. If the DATE switch 46 is not being pressed, the process goes to "FCOUNT=E?" of S356.

At S356, the number of the residual frames of the APS film is checked. If the number of the residual frame of the APS film is 0 (FCOUNT=E), the shooting is canceled since the APS shooting is not possible and the process goes to "STANDING-BY PROCESSING" of S440 to stop "BRANCHING PROCESSING" of S300. If the number of the residual frames of the APS film is not 0, the process goes to "FCOUNT=E BLINKING?" of S358. "FCOUNT=E BLINKING" indicates the state where the film is not rewound normally or the VEI display of the APS film cartridge is "X", that is the film has been exposed. To indicate this state, "E" is blinked on the film residual frame number displaying part 102 in stead of the number of the residual frames.

In "FCOUNT=E BLINKING?" of S358, whether "E" is blinking on the film residual frame number displaying part 102 is determined. If "E" is blinking, the shooting is canceled and the process goes to "STANDING-BY PROCESSING" of S440 to stop "BRANCHING PROCESSING" of S300. If "E" is not blinking on the film residual frame number displaying part 102, the process goes to "FCOUNT=n BLINKING?" of S360. "FCOUNT=n BLINKING" indicates the state where something wrong has happened during the film feeding and the film has not been normally fed. To indicate this state, the present number of the residual frames "n" is blinking on the film residual frame number displaying part 102.

In "FCOUNT=n BLINKING?" of S360, whether the film feeding is normal is determined. If the film feeding is normal, the process goes to "/SP1=ON?" of S368. If the film feeding is not normal, the shooting is canceled and the process goes to "STANDING-BY PROCESSING" of S440 to stop "BRANCHING PROCESSING" of S300.

In "/SP1=ON?" of S368, whether the shutter release button 30 is being "HALF PRESSED" is determined. If the shutter release button 30 is being "HALF PRESSED", the process goes to "/SP1 SWITCH PROCESSING" of S370. In S370, the AF processing, the electronic flash light-emitting processing, the self-timer processing, the shooting processing, film feeding processing, the magnetic information writing processing, the communication with the DSC-CPU 184 and so on are performed after errors regarding to the shooting of the hybrid camera 10 is checked. If the shutter release button 30 is not being "HALF PRESSED", the process goes to "SM STATE=PLAY?" of S372.

In "SM STATE=PLAY?" of S372, whether the setting of the setting of the mode switching dial 72 is "PLAY" is determined. If the setting of the mode switching dial 72 is "PLAY", the process goes to "/SSHIFT=ON?" of S380 in FIG. 12. If the setting of the mode switching dial 72 is not "PLAY", the process goes to "REMOTE CONTROL MODE?" of S374.

In "REMOTE CONTROL MODE?" of S374, whether the setting of the /SSELF switch that is the lower right switch 56 is "REMOTE CONTROL MODE" is determined. If the setting is "REMOTE CONTROL MODE", the process goes to "/RCIN=L (HEADER)?" of S376. If the setting is not "REMOTE CONTROL MODE", the process goes to "/SSHIFT=ON?" of S380 in FIG. 12. "/RCIN" of "/RCIN=L (HEADER)?" of S376 is the name of an I/O port of the APSCPU 150, and the I/O indicates whether there is any received signal from the remote control. When /RCIN=L, it is indicated that a signal has been received from the remote control.

In "/RCIN=L (HEADER)?" of S376, whether an input signal from the remote control has been acquired is determined by reading I/O port information of the /RCIN. If the signal has been received from the remote control (/RCIN= L), the process goes to "/RCIN PROCESSING" of S378 and the APSCPU 150 performs a processing in accordance with the information from the remote control. If the signal has not been received from the remote control (/RCIN=H), the process goes to "/SSHIFT=ON?" of S380 in FIG. 12.

Figure 12:
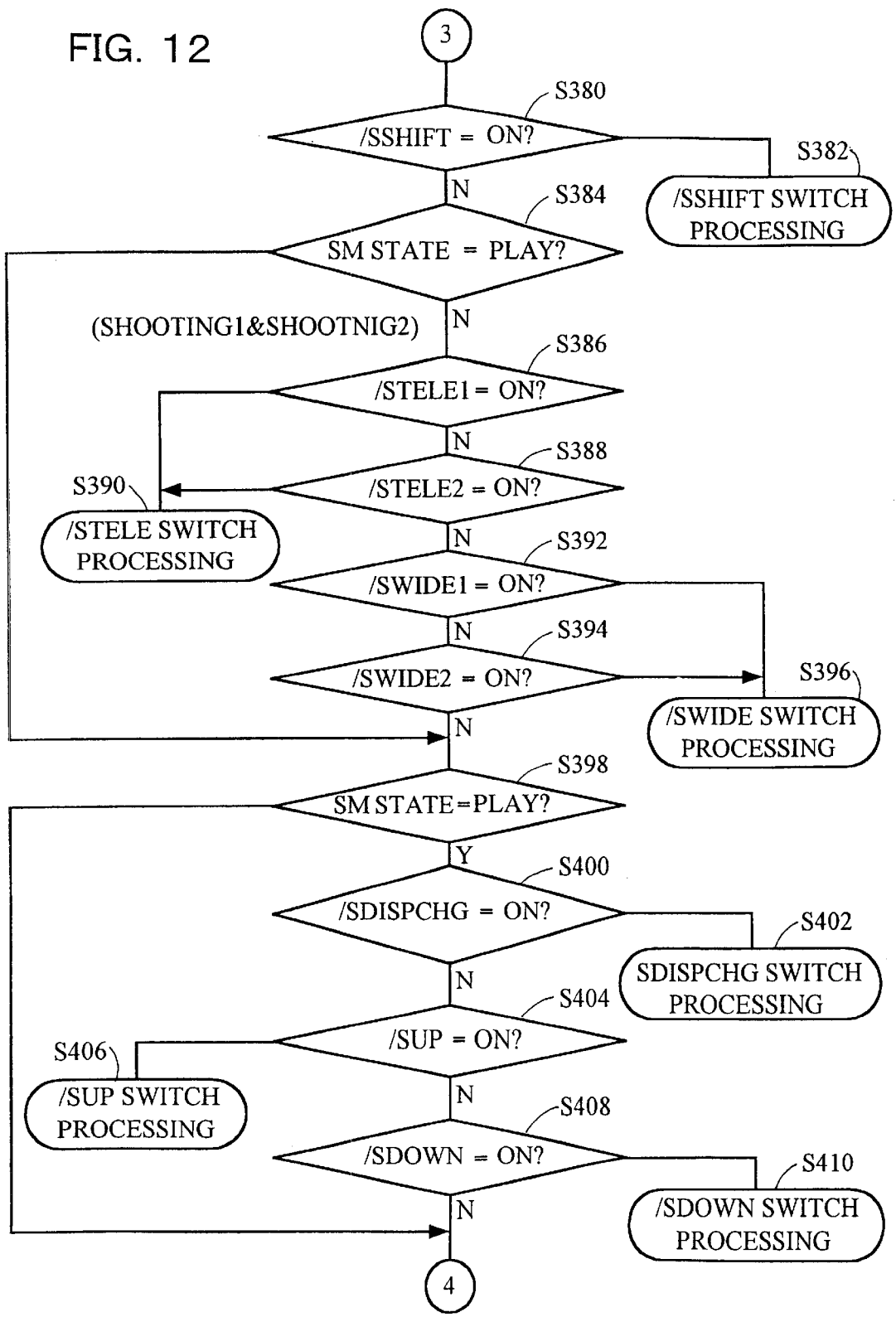
FIG. 12 is a flow chart showing the branching processing of the hybrid camera in FIG. 1.
Figure 13:
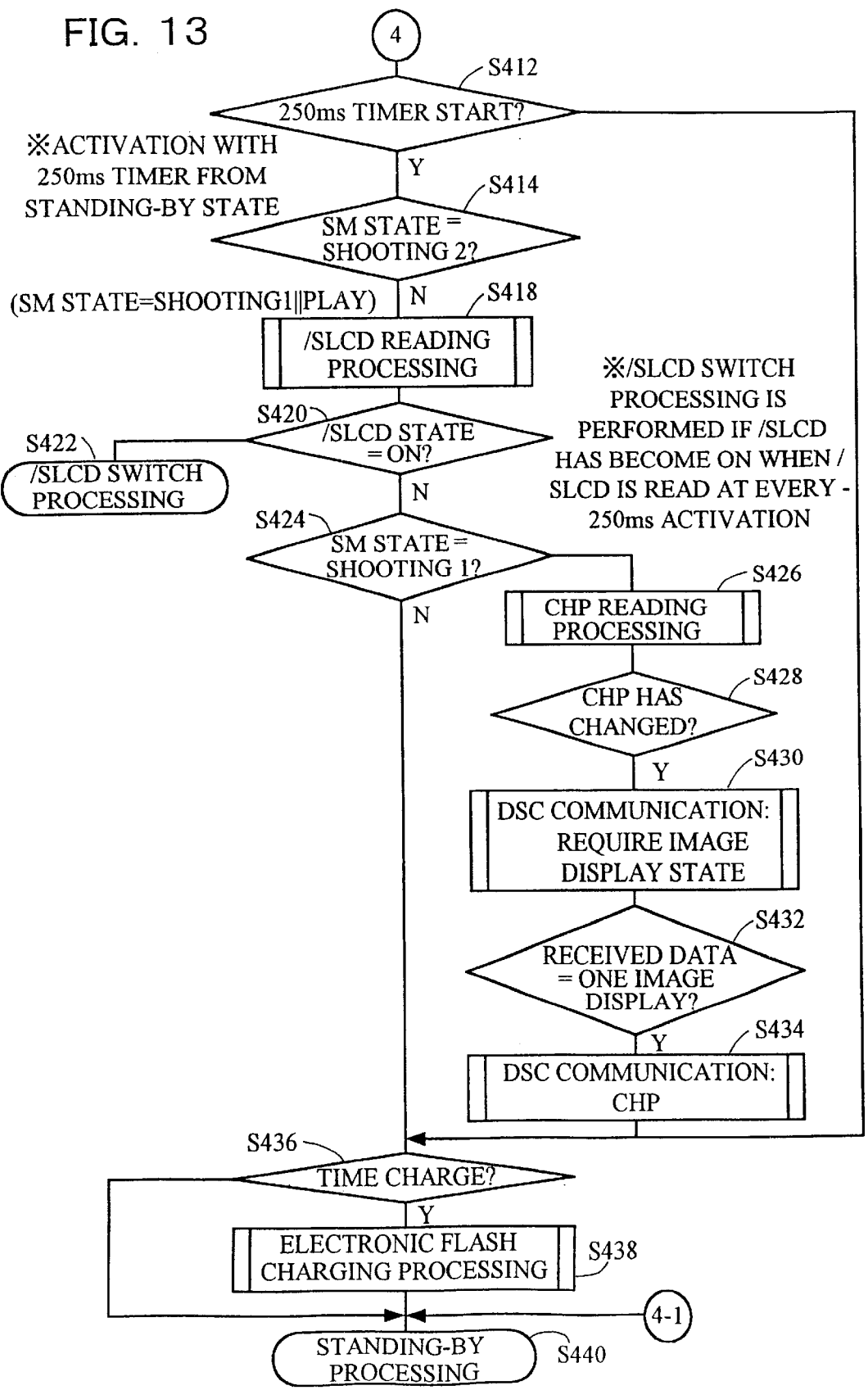
FIG. 13 is a flow chart showing the branching processing of the hybrid camera in FIG. 1.

At S380 in FIG. 12, whether the SHIFT switch 48 is being pressed is determined by reading information about the SHIFT switch 48. If the SHIFT switch 48 is being pressed, the process goes to "/SSHIFT SWITCH PROCESSING" of S382 and the turning-ON of the lamps of the multi-function switches 52 and switch processing of /SHIFI+/SSELF, /SHIFT+/SMODE, /SHIFT+/STITLE, /SHIFT+/SPQ, /SHIFT+/SPLAYOUT, /SHIFT+/SCHP and /SHIFT+/ SDATE branch off. If the SHIFT switch 48 is not being pressed, the process goes to "SM STATE=PLAY?" of S384.

At S384, whether the setting of the setting of the mode switching dial 72 is "PLAY" is determined. If the setting of the mode switching dial 72 is "PLAY", the process goes to "SM STATE=PLAY?" of S398. If the setting of the mode switching dial 72 is not "PLAY", the process goes to "/STELE1=ON?" of S386.

In "/STELE1=ON?" of S386 and "/STELE2=ON?" of S388, whether either the upper right switch 54 (/STELE1)

and the lower right switch 56 (/STELE2) of the multi-function switches 52 are being pressed is determined. If either of them is being pressed, the process goes to "/STELE SWITCH PROCESSING" of S390 to perform zooming toward the telephoto end.

Likewise, in "/SWIDE1=ON?" of S392 and "/SWIDE2=ON?" of S394, whether either the upper left switch 58 (/SWIDE1) and the lower left switch 60 (/SWIDE2) of the multi-function switches 52 are being pressed is determined. If either of them is being pressed, the process goes to "/SWIDE SWITCH PROCESSING" of S396 to perform zooming toward the wide end.

In "SM STATE=PLAY?" of S398, whether the setting of the setting of the mode switching dial 72 is "PLAY" is determined. If the setting of the mode switching dial 72 is not "PLAY", the process goes to "250 ms TIMER START?" of S412 in FIG. 14. If the setting of the mode switching dial 72 is "PLAY", the process goes to "/SDISPCHG=ON?" of S400.

At S400, whether the /SDISPCHG switch that is the upper left switch 58 of the multi-function switches 52 is being pressed is determined. If the /SDISPCHG switch is being pressed, the process goes to "/SDISPCHG SWITCH PROCESSING" of S402. If the /SDISPCHG switch is not being pressed, the process goes to "/SUP=ON?" of S404.

At S404, whether the /SUP switch that is the lower right switch 56 of the multi-function switches 52 is being pressed is determined. If the /SUP switch is being pressed, the process goes to "/SUP SWITCH PROCESSING" of S406. If the /SUP switch is not being pressed, the process goes to "/SDOWN=ON?" of S408.

At S408, whether the /SDOWN switch that is the lower left switch 60 of the multi-function switches 52 is being pressed is determined. If the /SDOWN switch is being pressed, the process goes to "/SDOWN SWITCH PROCESSING" of S410. If the /SDOWN switch is not being pressed, the process goes to "250 ms TIMER START?" of S412 in FIG. 13.

If the (250 ms) timer is not up and the state of the switch can not be read at S412, or the setting of the mode switching dial 72 is "SHOOTING 2" at "SM STATE=SHOOTING 2?" of S414, the process goes to "TIME CHARGE?" of S436 without the processing regarding to updating the image display.

If the (250 ms) timer is up at S412 and the setting of the mode switching dial 72 is not "SHOOTING 2" ("SHOOTING 1" or "PLAY") at S414, the process goes to "/SLCD READING PROCESSING" of S418 for the processing regarding to updating the image display to read whether the LCD switch 44 (/SLCD) is being pressed.

In "/SLCD STATE=ON?" of S420, whether the /SLCD switch is being pressed is determined. If the /SLCD switch is being pressed, the process goes to "/SLCD SWITCH PROCESSING" of S422. If the /SLCD switch is not being pressed, the process goes to "SM STATE=SHOOTING 1?" of S424.

At S424, whether the setting of the mode switching dial 72 is "SHOOTING 1" is determined. If the setting of the mode switching dial 72 is "SHOOTING 1", the process goes to the subroutine of "CHP READING PROCESSING" of S426. If the setting of the mode switching dial 72 is not "SHOOTING 1", the process goes to "TIME CHARGE?" of S436. The switch information of the CHP read at S426 is information of the CHP switch 74 provided on the top of the hybrid camera 10, and whether the setting of the CHP has changed is determined in "CHP HAS CHANGED?" of S428. If the state of the CHP switch 74 has changed, the process goes to "DSC COMMUNICATION: REQUIRE IMAGE DISPLAY STATE" of S430. If the state of the CHP switch 74 has not changed, the process goes to S436.

At S430, the DSCCPU 184 of the digital still camera is asked for the image display state, and whether one image is displayed or two or four images are displayed is determined in "RECEIVED DATA=ONE IMAGE DISPLAY?" of S432. If multiple images are displayed, the CHP information is not displayed on the liquid crystal monitor 40 since it is hard to determine which image the subject of the setting of the CHP is. Accordingly, the CHP information is not transmitted to the DSCCPU 184. If one image is displayed at S432, the process goes to "DSC COMMUNICATION: CHP" of S434 and the information about the CHP switch 74 is transmitted from the APSCPU 150 to the DSCCPU 184 to display the information about the CHP on the liquid crystal monitor 40.

After the information about the CHP is transmitted to the DSCCPU 184, the process goes to "TIME CHARGE?" of S436. At S436, the time is monitored to charge a high-voltage capacitor of the electronic flash power source every thirty seconds. If it is time for the charging, the process goes to "ELECTRONIC FLASH CHARGING PROCESSING" of S438 to charge the capacitor of the electronic flash power source. If it is not time for the charging, or the charging of the capacitor has finished, or the shooting was canceled during the processing from S346 to S360, the routine of the branching processing is stopped and the process goes to "STANDING-BY PROCESSING" of S440.

Figure 14:
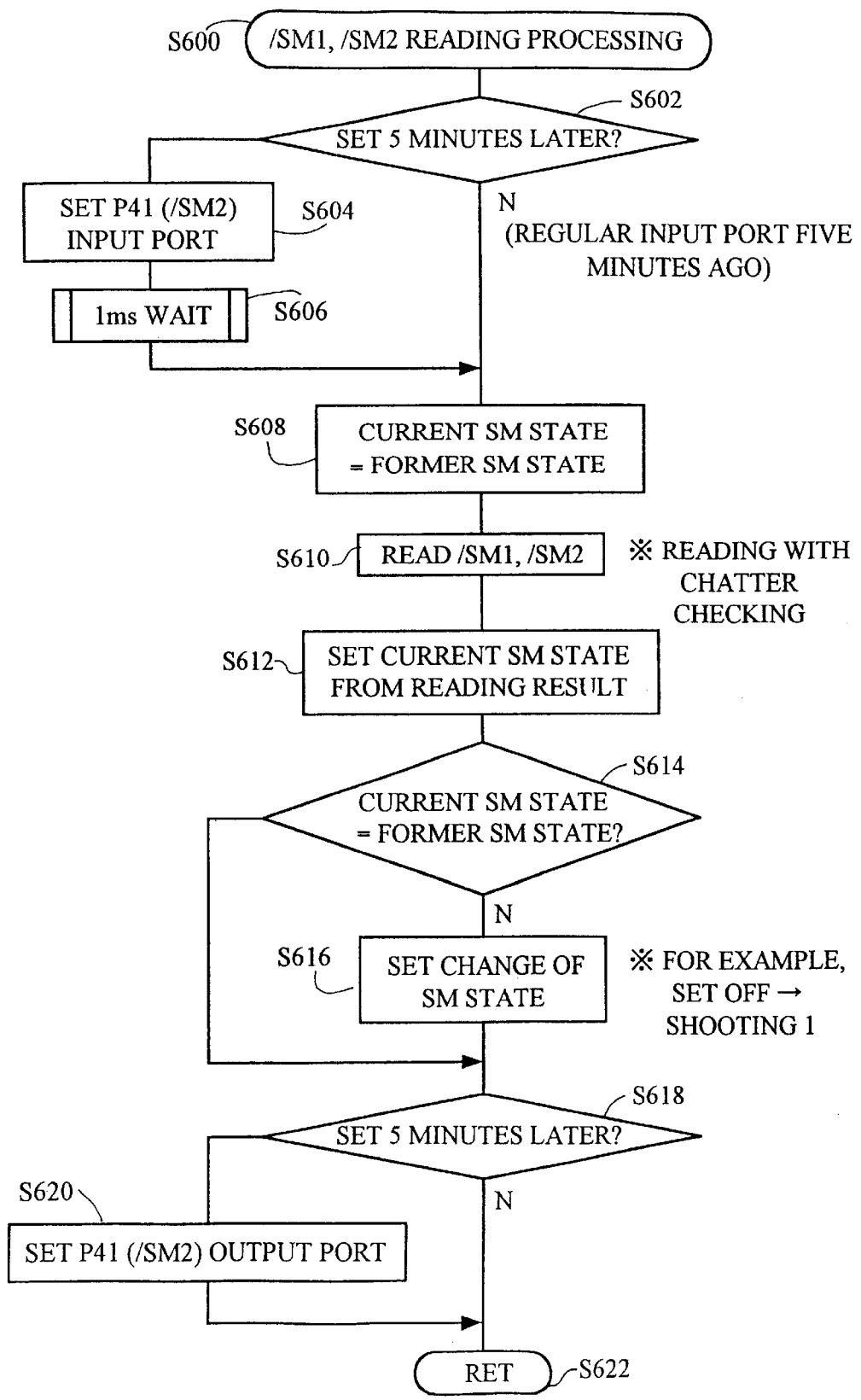
FIG. 14 is a flow chart showing a /SM1, /SM2 switch reading processing of the hybrid camera in FIG. 1.
Figure 15:
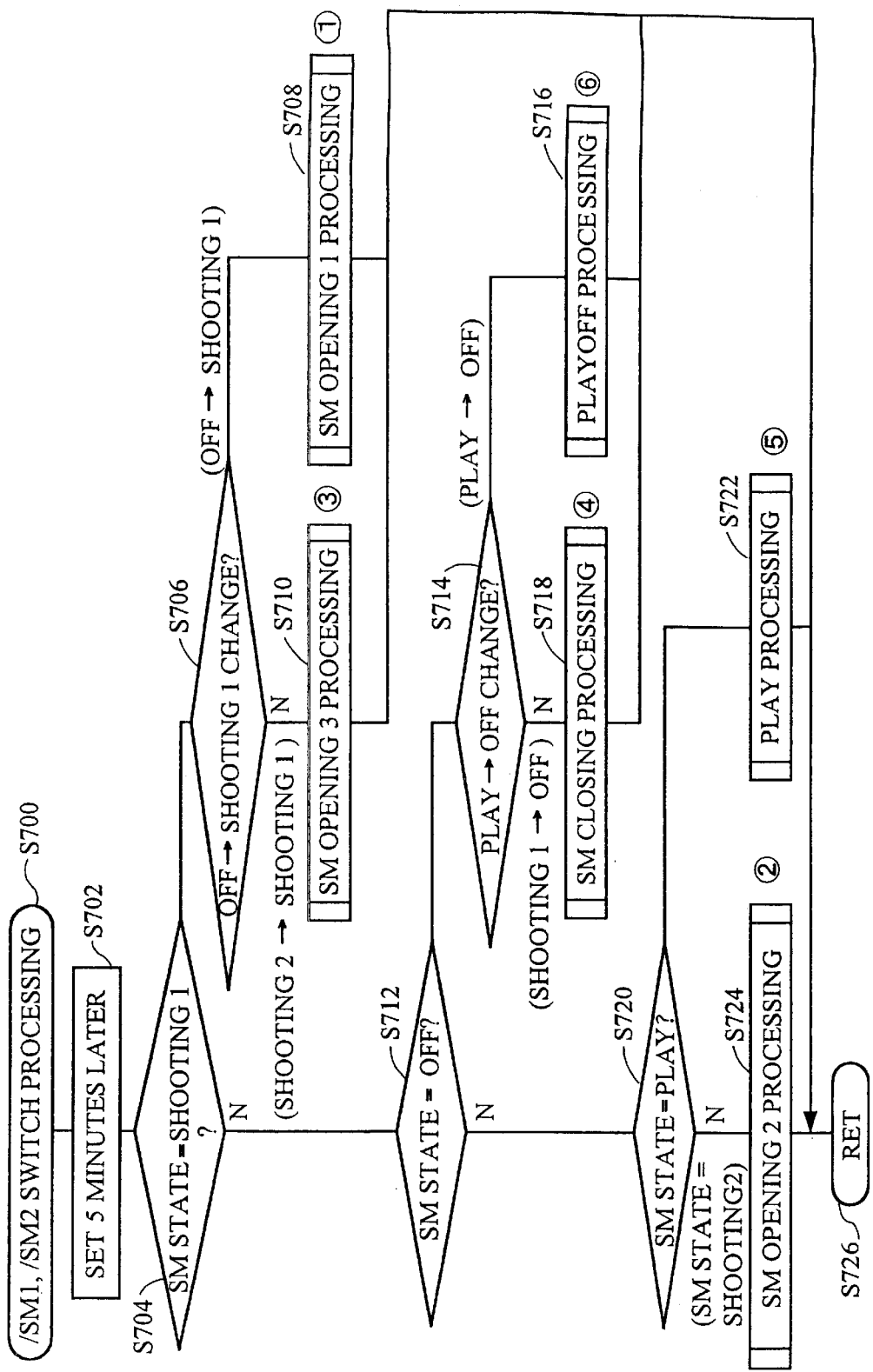
FIG. 15 is a flow chart showing a /SM1, /SM2 switch processing of the hybrid camera in FIG. 1.

FIG. 14 and FIG. 15 are flow charts showing /SM1, /SM2 switch processing.

In "/SM1, /SM2 READING PROCESSING" of S600 in FIG. 14, the setting state of the mode switching dial 72 is read.

In "SET 5 MINUTES LATER?" of S602, whether a timer for cutting off the power supply if nothing is inputted to the hybrid camera 10 for five minutes has been set is determined. If the timer has been set, an input port for the APSCPU 150 of the /SM2 included in the mode switching dial 72 in "SET P41 (/SM2) INPUT PORT" of S604.

In "1 ms WAIT" of S606, a wait timer is used after setting the port.

If the timer has not been set at S602 or the "1 ms WAIT" has finished at S606, "CURRENT SM STATE=FORMER SM STATE" is set at S608 and the information about the mode switching dial 72 is timing-shifted one scanning and the process goes to "READ /SM1, /SM2" of S610.

At S610, the information about the mode switching dial 72 is read, and the mode setting is recorded in the memory in "SET CURRENT SM STATE FROM READING RESULT" of S612.

In "CURRENT SM STATE=FORMER SM STATE?" of S614, the setting of the mode switching dial 72 shifted at S608 and read at the former software scanning is compared with the setting of the mode switching dial 72 read at the current software scanning. If the current SM state equals the former SM state, the process goes to "SET 5 MINUTES LATER" of S618. If the current SM state does not equal the former SM state, the process goes to "SET CHANGE OF SM STATE" of S616. At S616, a flag that indicates that the setting of the mode switching dial 72 has been changed is formed and the change of the SM state is set.

In "SET 5 MINUTES LATER?" of S618, and whether or not a timer for cutting off the power supply if nothing is inputted to the hybrid camera 10 for five minutes has been set is determined. If the timer has been set, an output port for the APSCPU 150 of the /SM2 included in the mode switching dial 72 in "SET P41 (/SM2) OUTPUT PORT" of S620 is set.

If the timer has not been set at S618 or the "SET P41 (/SM2) OUTPUT PORT" has finished at S620, the process goes to "RET" of S622 to stop the routine of "/SM1, /SM2 READING PROCESSING" of S600 and later.

The subroutine of "/SM1, /SM2 SWITCH PROCESSING" of S700 in FIG. 15 is a subroutine for going to a processing routine in accordance with the change of the state of the mode switching dial 72.

In "SET 5 MINUTES LATER" of S702, a timer for cutting off the power supply if nothing is inputted to the hybrid camera 10 for five minutes is set after the setting of the mode switching dial 72 has changed in "SM STATE CHANGE?" of S308 of "BRANCHING PROCESSING" routine of S300.

In "SM STATE=SHOOTING 1?" of S704, whether the setting of the mode switching dial 72 is "SHOOTING 1" is determined. If the setting of the mode switching dial 72 is "SHOOTING 1", "OFF→SHOOTING 1 CHANGE?" of S706 branches off. If the setting of the mode switching dial 72 is not "SHOOTING 1", the process goes to "SM STATE= OFF?" of S712.

In S706, whether the setting of the mode switching dial 72 has changed from "OFF" to "SHOOTING 1" is determined. If the setting of the mode switching dial 72 has changed from "OFF" to "SHOOTING 1", the process goes to "SM OPENING 1 PROCESSING" of S708 to perform "SHOOTING 1". If the setting of the mode switching dial 72 has not changed from "OFF" to "SHOOTING 1", the setting of the mode switching dial 72 has changed from "SHOOTING 2" to "SHOOTING 1" and the process goes to "SM OPENING 3 PROCESSING" of S710.

If "SM OPENING 1 PROCESSING" of S708 and "SM OPENING 3 PROCESSING" of S710 have finished, the process goes to "RET" processing of S726 to stop the routine of "/SM1, /SM2 SWITCH PROCESSING" of S700.

In "SM STATE=OFF?" of S712, whether the setting of the mode switching dial 72 is "OFF" is determined. If the setting of the mode switching dial 72 is "OFF", "PLAY→OFF CHANGE?" of S714 branches off. If the setting of the mode switching dial 72 is not "OFF", the process goes to "SM STATE=PLAY" of S720.

In "PLAY→OFF CHANGE?" of S714, whether the setting of the mode switching dial 72 has changed from "PLAY" to "OFF" is determined. If the setting of the mode switching dial 72 has changed from "PLAY" to "OFF", "PLAYOFF PROCESSING" of S716 branches off to stop the display as the digital still camera. If the setting of the mode switching dial 72 has not changed from "PLAY" to "OFF", the setting of the mode switching dial 72 has changed from "SHOOTING 1" to "OFF" and thus "SM CLOSING PROCESSING" of S718.

If "PLAYOFF PROCESSING" of S716 and "SM CLOSING PROCESSING" of S710 have finished, the process goes to "RET" processing of S726 to stop the routine of "/SM1, /SM2 SWITCH PROCESSING" of S700.

In "SM STATE=PLAY?" of S720, whether the setting of the mode switching dial 72 is "PLAY" is determined. If the setting of the mode switching dial 72 is "PLAY", "PLAY PROCESSING" of S722 branches off to display data shot by the digital still camera and edit information. If the setting of the mode switching dial 72 is not "PLAY", the setting of the mode switching dial 72 is "SHOOTING 2" and thus the process goes to "SM OPENING 2 PROCESSING" of S724.

If the processings of S722 and S724 have finished, the process goes to "RET" processing of S726 to stop the routine of "/SM1, /SM2 SWITCH PROCESSING" of S700.

Figure 16:
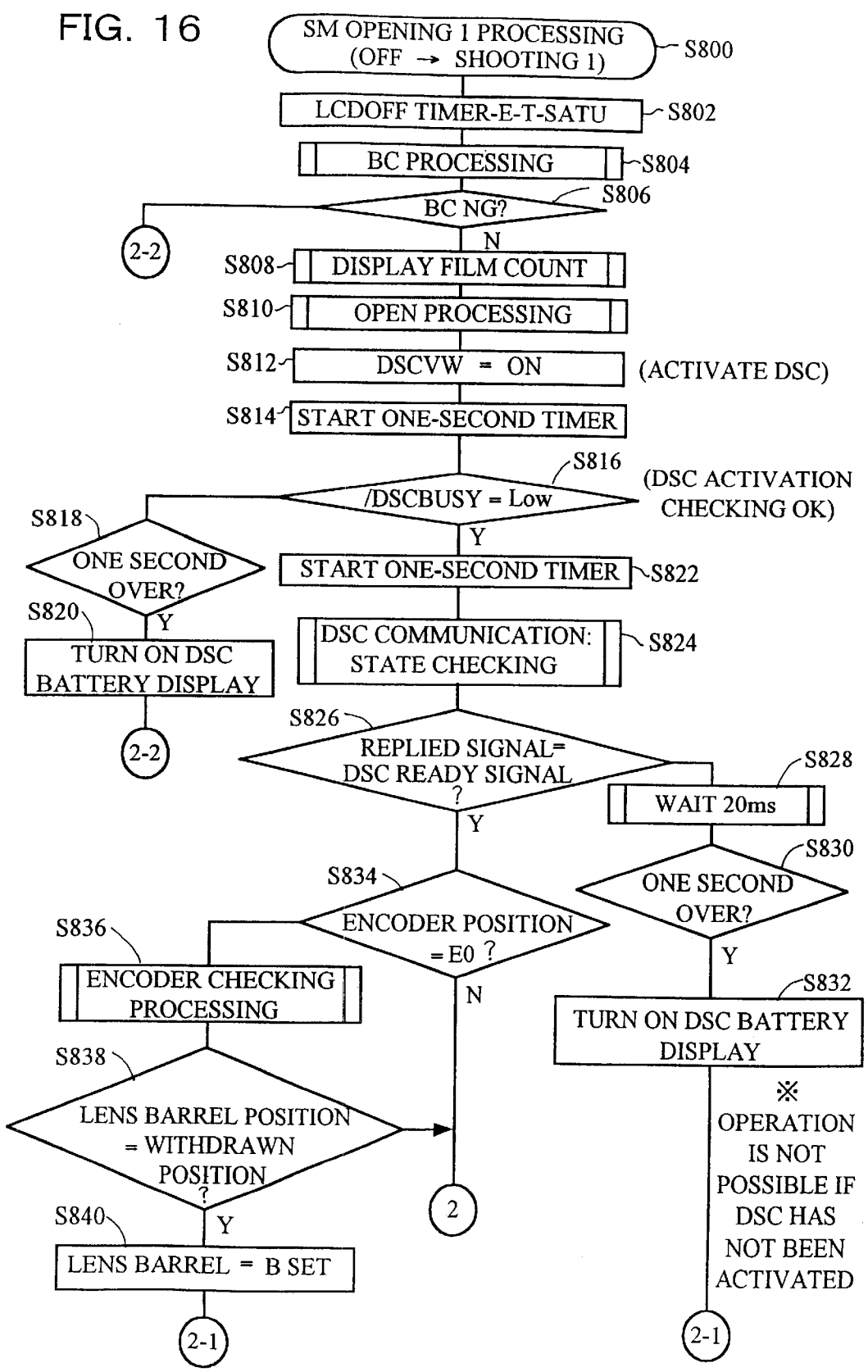
FIG. 16 is a flow chart showing an SM opening 1 processing (OFF→SHOOTING 1) of the hybrid camera in FIG. 1.
Figure 18:
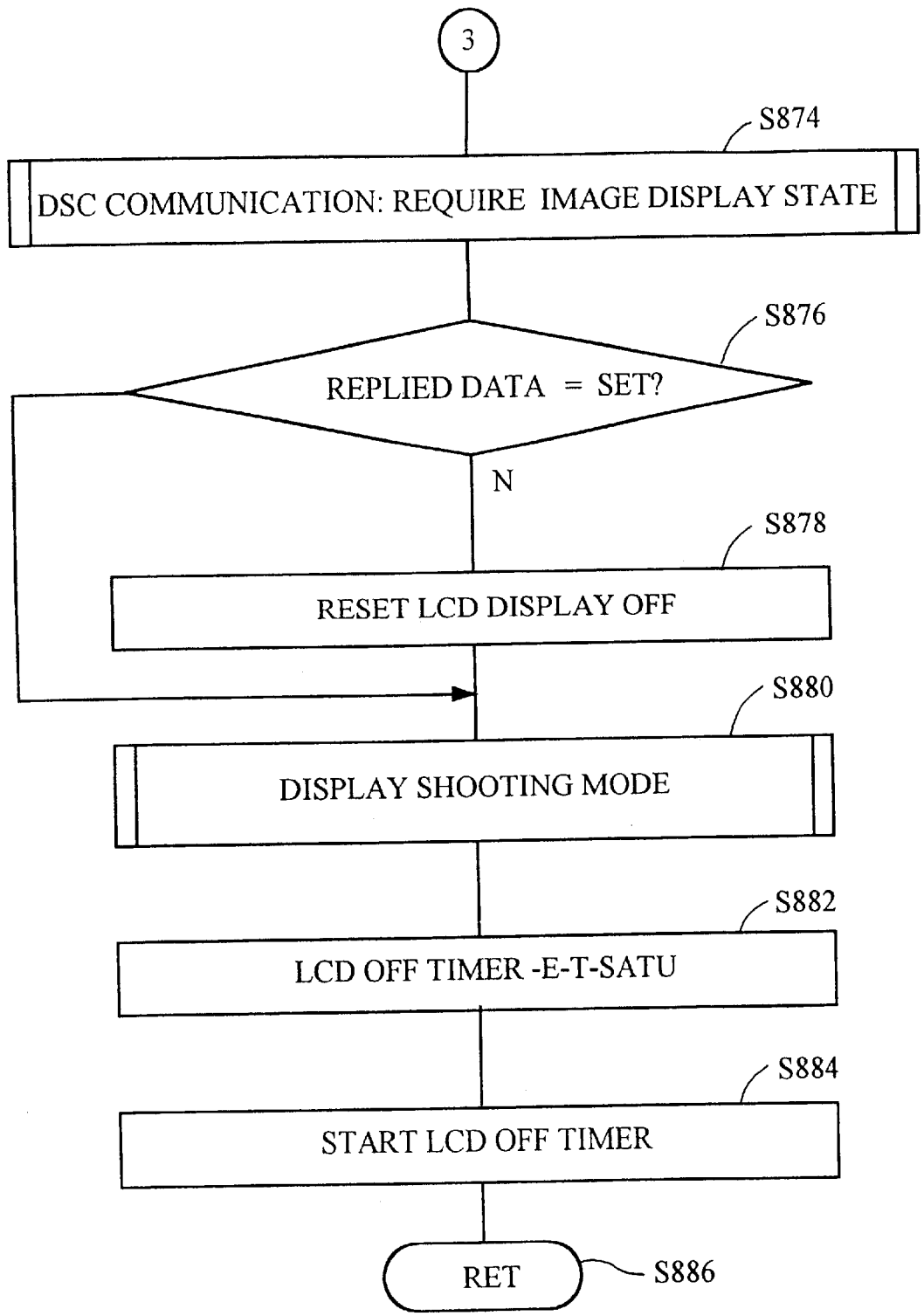
FIG. 18 is a flow chart showing the SM opening 1 processing (OFF→SHOOTING 1) of the hybrid camera in FIG. 1.

FIGS. 16, 17 and 18 are flow charts that show the SM opening 1 processing (OFF→SHOOTING 1).

When the setting of the mode switching dial 72 has changed from "OFF" to "SHOOTING 1", the SM opening 1 processing (OFF SHOOTING 1) in FIG. 16 is performed. When the SM opening 1 processing (OFF→SHOOTING 1) is started (S800), E-T-SATU that indicates the timer time for turning off the display of the liquid crystal monitor 40 is inputted to an LCDOFF timer (S802). Then, the battery checking processing of the APS is performed (S804). If the residual amount of the battery is determined NG in the determining processing (S806) of the residual amount of the battery, the process goes to S852 in FIG. 17. If the residual amount of the battery is determined OK, the displaying processing of the film counter is performed (S808). In this case, the APS displaying part 32 that was OFF when the setting of the mode switching dial 72 was OFF is turned ON and the number of the residual frames is displayed.

At S810, a processing (OPEN processing) for moving the lens barrel from the shooting-not possible position (withdrawn position) to a shooting-possible position (the wide end position, for example). A command (DSCVW= ON) is sent from the APSCPU 150 to the DSCCPU 184 through the communicating part 182 to turn ON the power source of the DSC (S812). The DSC is activated by the command (DSCVW=ON). At the same time, a one-second timer is started (S814), and whether the hardware of the DSC has been activated within one second is determined (S816 and S818). Unless the port of the /DSCBUSY becomes Low within one second, it is determined that something has malfunctioned. In this case, the DSC battery display of the APS displaying part 32 is turned ON to warn of the malfunction of the DSC at S820, and the process goes to S852 in FIG. 17 to make the shooting not possible.

On the other hand, if the port of the /DSCBUSY becomes Low within one second, it is determined that the hardware of the DSC has been normally activated. In this case, the one-second timer is started again (S822), and a command for "STATE CHECKING" is communicated by the DSC communication (S824). The command requires a check whether the DSC is able to shoot, and the APSCPU 150 determines the input from the DSC (S826). At S826, whether a DSC ready signal that indicates that the DSC is ready for shooting has been received is determined. If the DSC ready signal has not been received, whether an over time of one second has passed is determined (S830) after a 20 ms wait processing (S828). If the DSC ready signal was received within one second, the process goes to S824. If the DSC ready signal was not received within one second and the one-second timer is over at S830, something has malfunctioned and the DSC battery display of the APS displaying part 32 is turned on to warn of the malfunction (S832), and the process goes to S848 in FIG. 17. As stated above, when the DSC malfunctions for some reason, the operation of the DSC is made not possible.

If the DSC is normally activated and the APSCPU 150 receives the DSC ready signal at S826, then whether or not the encoder position is E0 is determined (S834). That the encoder position is E0 means that the APS lens barrel is at the impossible-shooting position (withdrawn position). If the lens barrel normally operates in the OPEN processing, the lens barrel is at the shooting-possible position at S834 and the process goes to S842 in FIG. 17. If it is determined that the encoder position is E0 for some reason, then encoder checking processing is performed (S836) and whether or not the lens barrel is at the withdrawn position is determined (S838). If the lens barrel is not at the withdrawn position, it is determined that the lens barrel has normally operated and the process goes to S842. On the other hand, if the lens barrel is at the withdrawn position, the lens barrel position is set to B (S840) and the process goes to S848 in FIG. 17.

At S842 in FIG. 17, the battery checking processing of the DSC is commanded by the DSC communication. This requires to inform whether or not the residual amount of the DSC battery is enough for the shooting by communication, and the DSC battery displaying processing may be performed according to the informed data.

Whether an error has been set in the DSC communication is determined (S844). If a communication error has been made, the process goes to S852 to make the operation of the camera not possible. If the DSC communication has been normally performed, whether a signal (BCNG) indicating that the residual amount of the battery is not enough is received as reply data is determined (S846). If the BCNG is received at S846, power supply OFF is commanded by the DSC communication (S848). After a 100 ms wait processing ( ), a processing of DSCVW=OFF is performed (S852) to turn OFF the hardware of the DSC. Then, the process returns to the main routine (S854).

If the reply data indicates that the residual amount of the battery is OK at S846, information that the setting of the SM state is shooting 1 is transmitted from the APS to the DSC by the DSC communication (S856). A reading processing of the setting of the CHP is performed (S858), and the reading result of the CHP is sent to the DSC by the DSC communication (S860).

The clocking function (time measuring function) is provided in the APS. Thus, year data, month and day data and hour and minute data are sent from the APS to the DSC by the DSC communication (S862, S864 and S866), and the date display (setting of the date mode) of the displaying part is sent from the APS to the DSC by the DSC communication (S868). At this time, an animation display starting processing is commanded by the DSC communication, and the processing for displaying an animation captured by the CCD on the liquid crystal monitor 40 is started (S870).

At S872, whether an error has been set in the DSC communication is determined. If a communication error has been made, the process goes to S852 to make the operation of the camera not possible. If the DSC communication has been normally performed, a command for requiring the image display state by the DSC communication at S874 in FIG. 18. This requires information whether one image is displayed on the liquid crystal monitor 40 or multiple images (four images) are displayed or the display is OFF.

The APSCPU 150 monitors the reply data from the DSC and determines whether the reply data indicates that the display is OFF (S876). If the reply data does not indicate that the display is OFF, that is, if the liquid crystal monitor 40 is ON and something is displayed on it, an LCD display OFF is reset (S878), and the shooting mode displaying processing is performed (S880).

If the reply data indicating that the LCD display is OFF is received at S876, the process goes to S880 in stead of S878 and the shooting mode displaying processing is performed (S880). Then, the E-T-SATU that is the data for turning off the liquid crystal monitor 40 after a predetermined time is set in the LCDOFF timer (S882), and the LCDOFF timer is started (S884). Then, the process returns to the main routine (S886).

Figure 19:
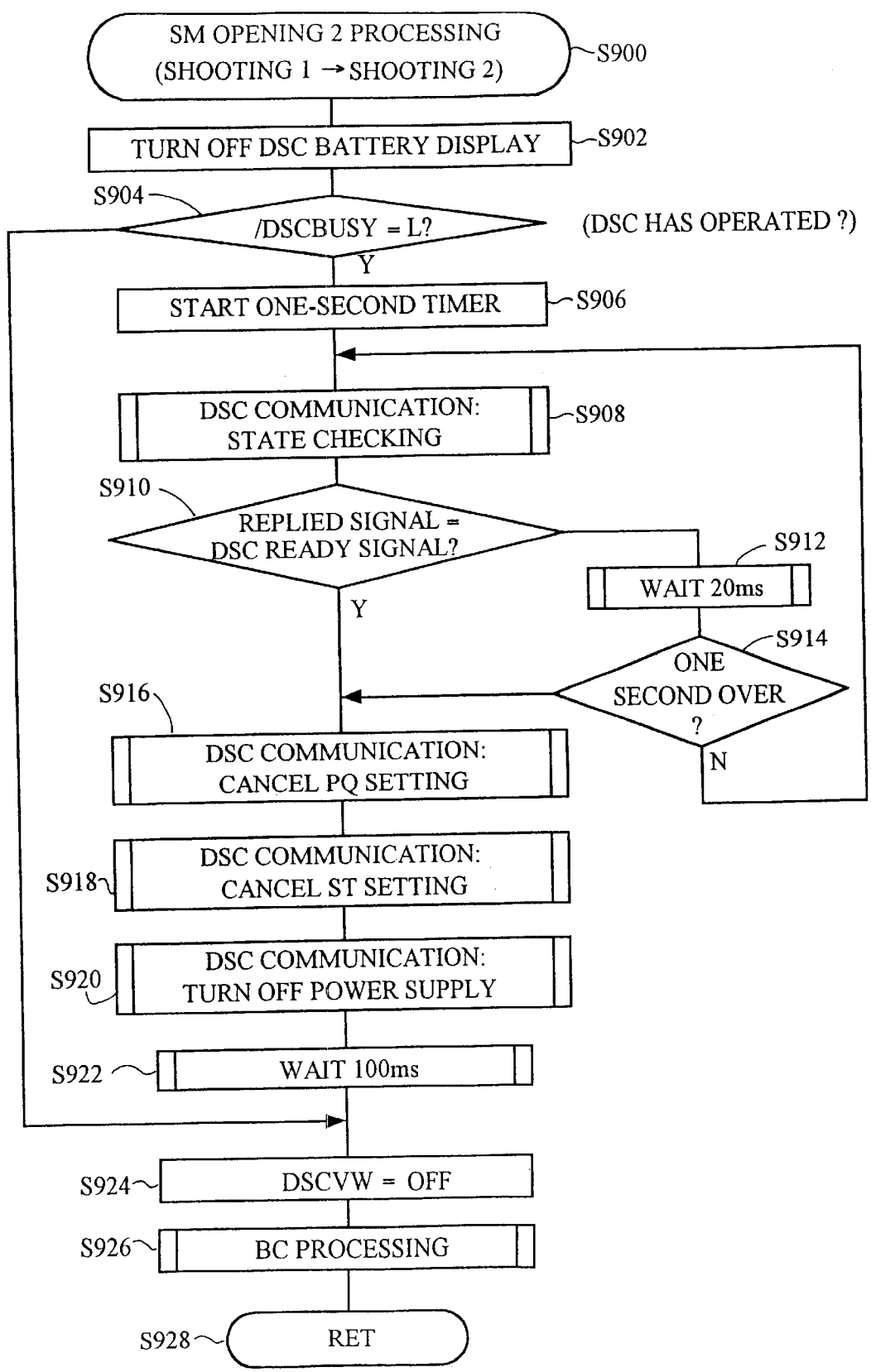
FIG. 19 is a flow chart showing an SM opening 2 processing (SHOOTING 1→SHOOTING 2) of the hybrid camera in FIG. 1.

FIG. 19 is a flow chart showing the SM opening 2 processing (SHOOTING 1→SHOOTING 2).

When the setting of the mode switching dial 72 has changed from "SHOOTING 1" to "SHOOTING 2", the SM opening 2 processing (SHOOTING 1→SHOOTING 2) in FIG. 19 is started. When the SM opening 2 processing (SHOOTING 1→SHOOTING 2) is started (S900), the DSC battery display is turned off (S902). Then, whether the port of the /DSCBUSY is Low is determined (S904). This determines whether or not the DSC has been operated. If the /DSCBUSY is Low, the DSC has been operated.

If the /DSCBUSY is Low at S904, a one-second timer is started (S906) and a command for "STATE CHECKING" is communicated by the DSC communication (S908). The APSCPU 150 determines whether the DSC ready signal has been received from the DSC (S910). If the DSC ready signal has not been received, whether an over time of one second has passed is determined (S914) after a 20 ms wait processing (S912). If the DSC ready signal was received within one second, the process goes to S908.

If the DSC ready signal was not received within one second and the one-second timer is over at S914 or the DSC ready signal was received at S910, cancellation of the setting of the number of prints (PQ setting) (S916), cancellation of the setting of the selected title (ST setting) (S918) and a command of power supply OFF (S920) are transmitted by the DSC communication. The PQ setting and the ST setting are canceled because they are not needed if they are inputted in the mode of the shooting 1 and the mode switching dial 72 is rotated without shooting.

A command for cutting off the power supply is sent (S920), and after a 100 ms wait (wait for cutting off) processing (S922), DSCVW=OFF is executed (S924). This cuts off the DSC power supply and only the APS functions becomes effective. Then, the voltage of the APS battery is checked (S926) and the process returns to the main routine (S928). If /DSCBUSY=High at S904, the DSC has not been operated and the process goes to S924 to turn OFF the DSC power supply.

Figure 20:
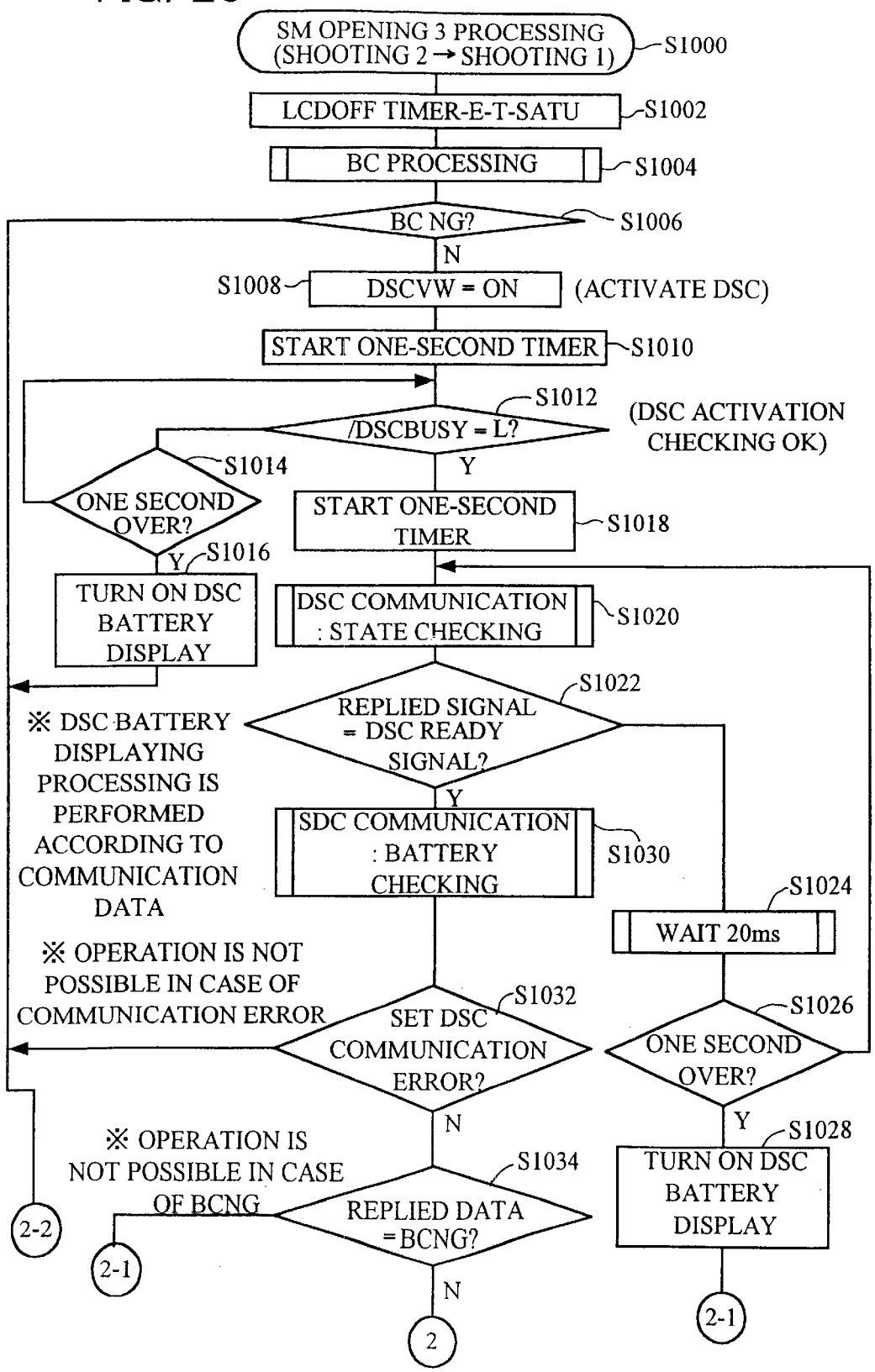
FIG. 20 is a flow chart showing an SM opening 3 processing (SHOOTING 2→SHOOTING 1) of the hybrid camera in FIG. 1.
Figure 21:
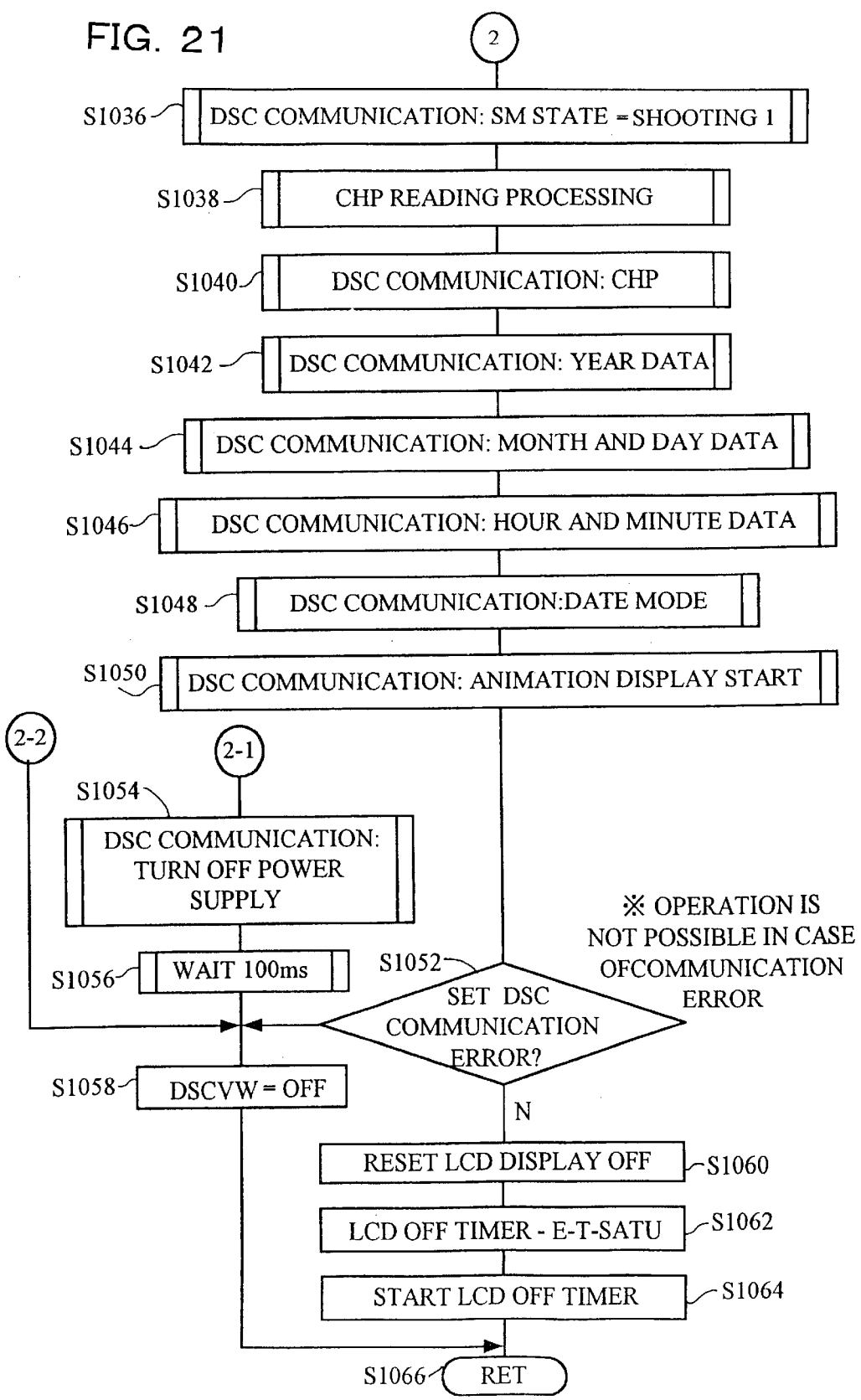
FIG. 21 is a flow chart showing the SM opening 3 processing (SHOOTING 2→SHOOTING 1) of the hybrid camera in FIG. 1.

FIGS. 20 and 21 are flow charts showing the SM opening 3 processing (SHOOTING 2→SHOOTING 1).

When the setting of the mode switching dial 72 has changed from "SHOOTING 2" to "SHOOTING 1", the SM opening 3 processing (SHOOTING 2→SHOOTING 1) in FIG. 21 is performed. When the SM opening 3 processing (SHOOTING 2→SHOOTING 1) is started (S1000), the E-T-SATU that is the data for turning off the liquid crystal monitor 40 after a predetermined time is inputted to the LCDOFF timer (S1002). Then, the a battery checking processing of the APS is performed (S1004). If the residual amount of the battery is determined NG in the determining processing (S1006) of the residual amount of the battery, the power supply of the DSC is turned OFF (S1058 in FIG. 21) and the process goes to the main routine (S1066).

If the residual amount of the battery is determined OK at S1006, DSCVW=ON is executed to activate the DSC (S1008). At the same time, the one-second timer is started (S1010), and whether the hardware of the DSC has been activated within one second is determined (S1012 and S1014). Unless the port of the /DSCBUSY becomes Low within one second, it is determined that something has malfunctioned. In this case, the DSC battery display of the APS displaying part 32 is turned on (S1016), and the process goes to S1058 in FIG. 21.

On the other hand, if the port of the /DSCBUSY becomes Low within one second at S1012, the one-second timer is started again (S1018), and the command for "STATE CHECKING" is communicated by the DSC communication (S1020). At S1020, whether the DSC ready signal has been received is determined. If the DSC ready signal has not been received, whether an over time of one second has passed is determined (S1026) after a 20 ms wait processing (S1024). If the DSC ready signal was received within one second, the process goes to S1020. If the DSC ready signal was not received within one second and the one-second timer is over at S1026, something has malfunctioned and the DSC battery display of the APS displaying part 32 is turned on (S1028), and the process goes to S1054 in FIG. 21. As stated above, when the DSC malfunctions for some reason, the operation of the DSC is made not possible.

If the APSCPU 150 receives the DSC ready signal at S1022, the command of the battery checking processing of the DSC is transmitted by the DSC communication (S1030). Whether or not an error has been set in the DSC communication is determined (S1032). If a communication error has been made, the process goes to S1058 in FIG. 21 to make the operation of the camera not possible. If the DSC communication has been normally performed at S1032, then whether the signal (BCNG) indicating that the residual amount of the battery is not enough is received as the reply data is determined (S1034). If the BCNG is received at S1034, the power supply OFF is commanded by the DSC communication to make the camera operation not possible (S1054 in FIG. 21). After a 100 ms wait processing (S1056), the processing of DSCVW=OFF is performed (S1058) to turn OFF the hardware of the DSC. Then, the process returns to the main routine (S1066).

If the reply data indicates that the residual amount of the battery is OK at S1034, information that the setting of the SM state is shooting 1 is transmitted from the APS to the DSC by the DSC communication (S1036 in FIG. 21). The reading processing of the setting of the CHP is performed (S1038), and the reading result of the CHP is informed to the DSC by the DSC communication (S1040).

The year data, the month and day data, the hour and minute data and the date mode are sent from the APS to the DSC by the DSC communication (S1042–S1048). At this time, the animation display starting processing is commanded by the DSC communication, and the processing for displaying the animation captured by the CCD on the liquid crystal monitor 40 is started (S1050).

At S1052, whether an error has been set in the DSC communication is determined. If a communication error has been made, the process goes to S1058 to make the operation of the camera not possible. If it is determined that the DSC communication has been normally performed at S1052, the LCD display OFF is reset (S1060), and the E-T-SATU is set in the LCDOFF timer (S1062), and the LCDOFF timer is started (S1064). Then, the process returns to the main routine (S1066).

Figure 22:
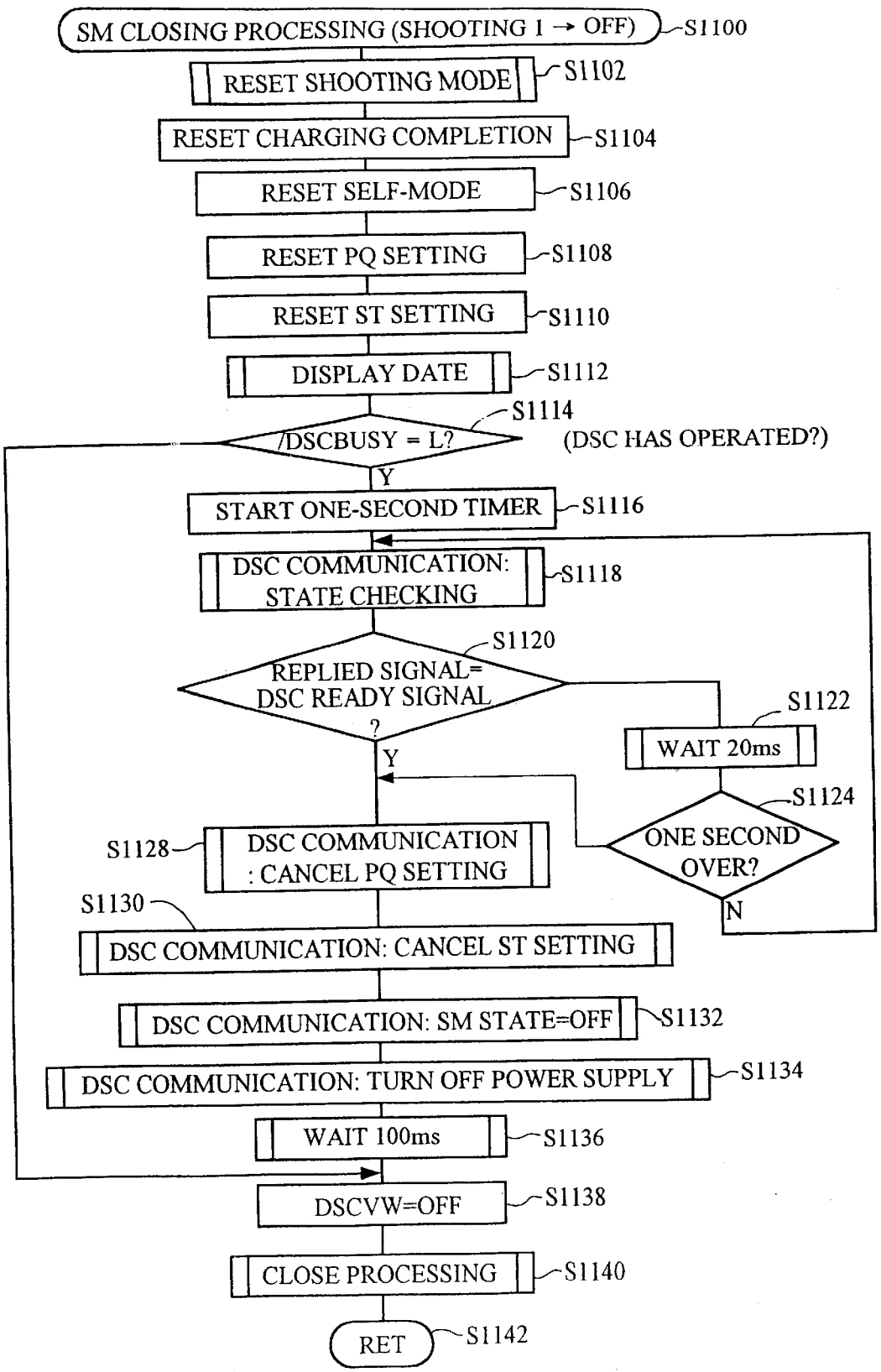
FIG. 22 is a flow chart showing an SM closing processing (SHOOTING 1→OFF) of the hybrid camera in FIG. 1.

FIG. 22 is a flow chart showing the SM closing processing (SHOOTING 1→OFF).

When the setting of the mode switching dial 72 has changed from "SHOOTING 1" to "OFF", the SM closing processing (SHOOTING 1→OFF) in FIG. 22 is started. When the SM closing processing is started (S1100), the shooting mode is reset (S1102). Then, charging completion of the electronic flash is reset (S1104) and the self-mode is reset (S1106) and the PQ setting is reset (S1108) and the ST setting is reset (S1110) to cancel the unneeded setting information.

Then, the date displaying processing of the APS displaying part 32 is performed (S1112). If the PQ or the ST is set, the number of the prints (for example, "P-10") or the selected title number (for example, "06–30") may be displayed on the APS displaying part 32 in stead of the date. Thus, the date is displayed on the APS displaying part 32 after the cancellation of the PQ setting and the ST setting.

After the date displaying processing, whether or not the /DSCBUSY is Low is determined (S1114) to determine whether the DSC is operating. If the DSC operates, the port of the /DSCBUSY is Low. In this case, the one-second timer is started (S1116) and the command for "STATE CHECKING" is communicated by the DSC communication (S1118). The APSCPU 150 determines whether the DSC ready signal has been received from the DSC (S1120). If the DSC ready signal has not been received, whether or not an over time of one second has passed is determined (S1124) after a 20 ms wait processing (S1122). If the DSC ready was received within one second, the process goes to S1118. If the DSC ready signal was not received within one second and the one-second timer is over at S1124 or the DSC ready signal was received at S1120, the cancellation of the setting of the number of prints (PQ setting) (S1128), the cancellation of the setting of the selected title (ST setting) (S1130), information that the SM state is changed to OFF (SM STATE= OFF) (S1132) and the command of power supply OFF (S1134) are transmitted by the DSC communication.

The command for cutting off the power supply is sent (S1134), and after the 100 ms wait (wait for cutting off) processing (S1136), DSCVW=OFF is executed (S1138). This cuts off the DSC power supply. Then, the CLOSE processing for driving the taking lens of the APS to the withdrawn position is performed (S1140), and the process returns to the main routine (S1142).

If NO at S1114, DSCVW=OFF (S1138) and the CLOSE processing (S1140) are executed, and the process returns to the main routine (S1142).

Figure 23:
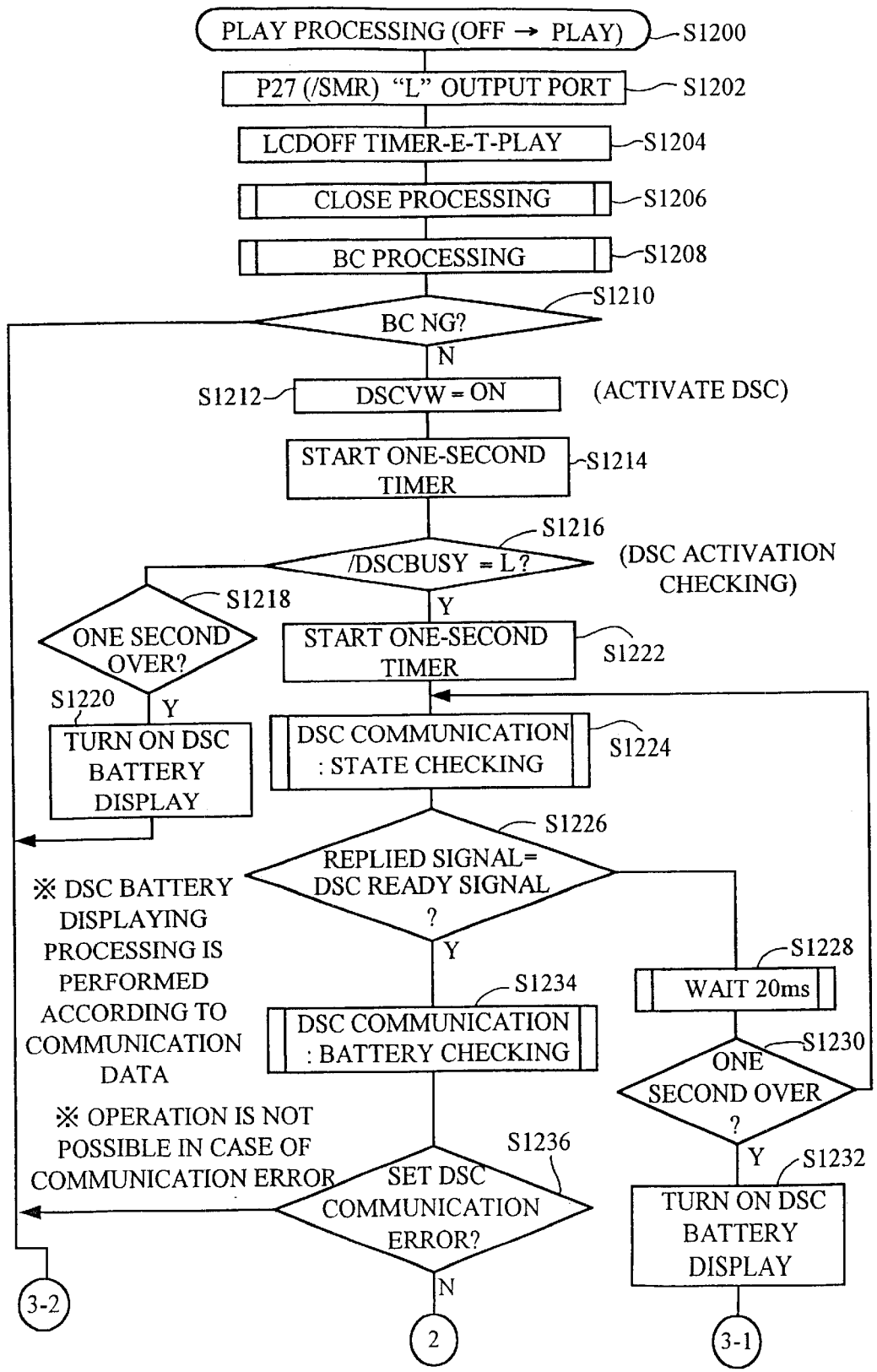
FIG. 23 is a flow chart showing a PLAY processing (OFF→PLAY) of the hybrid camera in FIG. 1.
Figure 24:
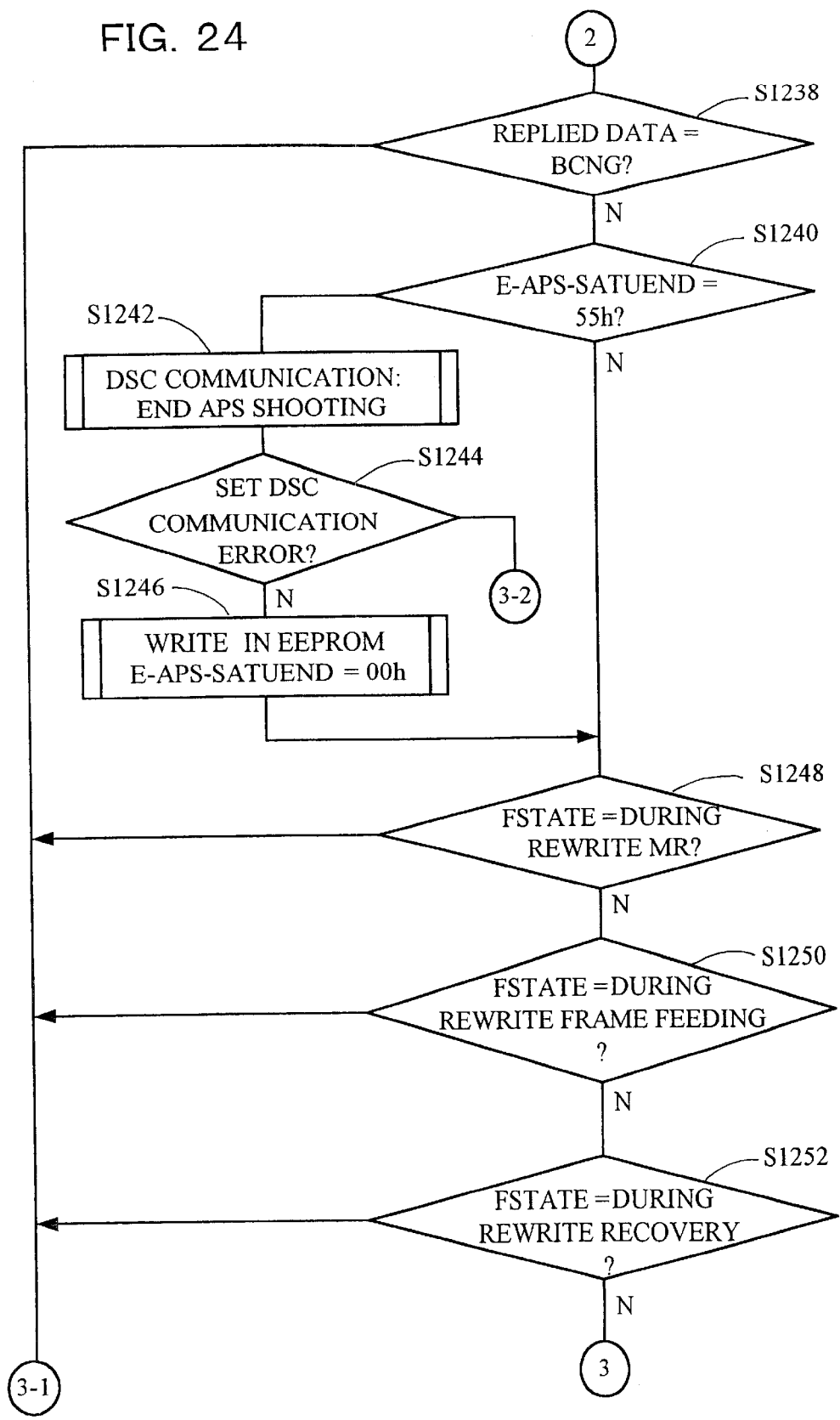
FIG. 24 is a flow chart showing the PLAY processing (OFF→PLAY) of the hybrid camera in FIG. 1.
Figure 25:
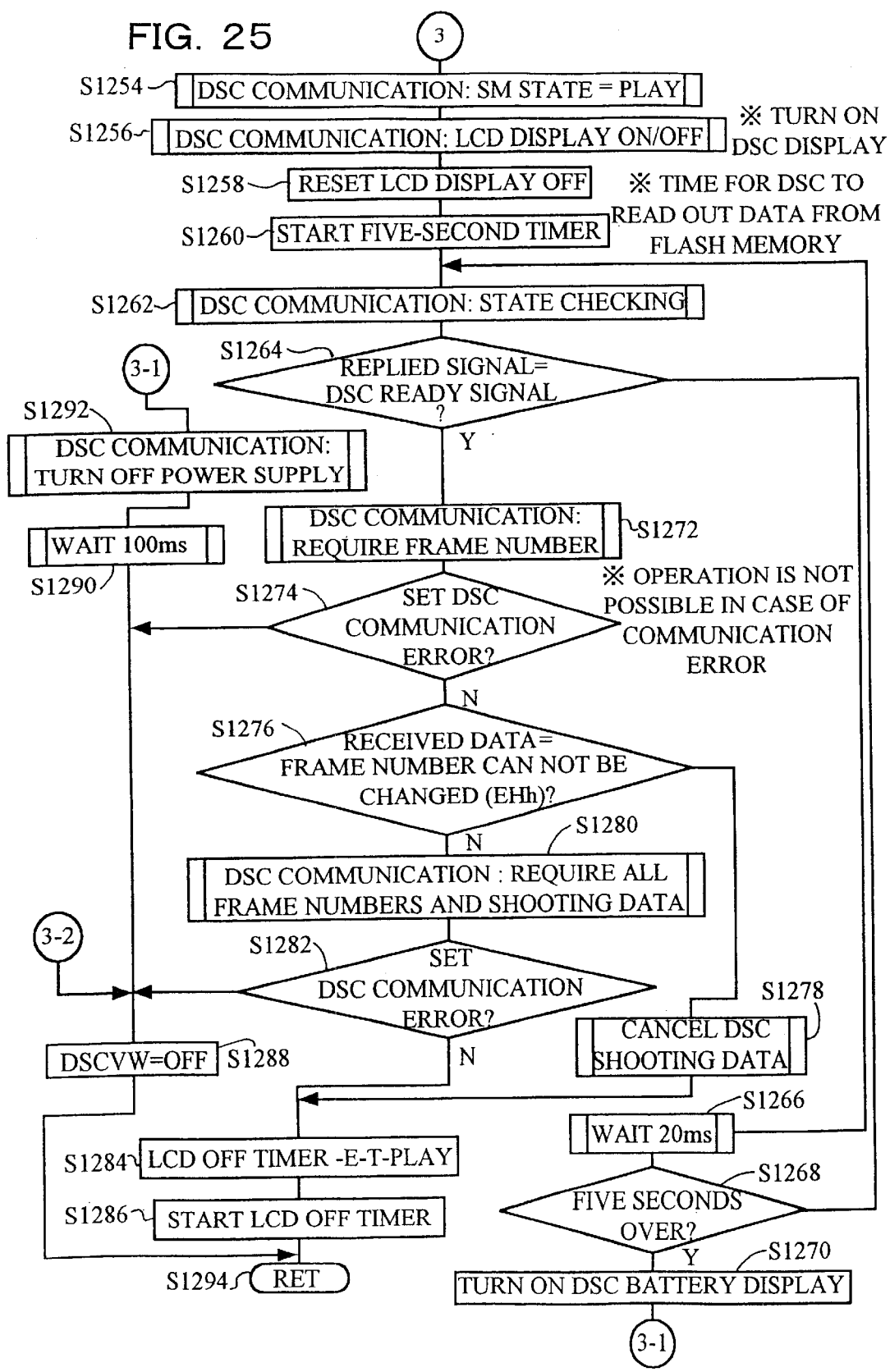
FIG. 25 is a flow chart showing the PLAY processing (OFF→PLAY) of the hybrid camera in FIG. 1.

FIGS. 23, 24 and 25 are flow charts showing the PLAY processing (OFF→PLAY).

When the setting of the mode switching dial 72 has changed from "OFF" to "PLAY", the PLAY processing (OFF→PLAY) in FIG. 23 is performed. When the PLAY processing is started (S1200), the APSCPU 150 makes the port 27 (/SMR) L output (S1202). The port indicates the state where the input of the RW switch 43 is prohibited.

Then, E-T-PLAY is set in the LCDOFF timer (S1204), and the CLOSE processing is performed (S1206). Then, the battery checking processing is performed (S1208). If the residual amount of the battery is determined NG in BC determination (S1210), the process goes to S1288 in FIG. 25 and the operation becomes not possible. If the DSCVW=ON processing is executed (S1212) to activate the DSC.

At the same time, the one-second timer is started (S1214), and whether the hardware of the DSC has been activated within one second is determined (S1216 and S1218). Unless the port of the /DSCBUSY becomes Low within one second, it is determined that something has malfunctioned. In this case, the DSC battery display of the APS displaying part 32 is turned on (S1220), and the process goes to S1288 in FIG. 25.

On the other hand, if the port of the /DSCBUSY becomes Low within one second at S1216, the one-second timer is started again (S1222), and the command for "STATE CHECKING" is communicated by the DSC communication (S1224). At S1226, whether the DSC ready signal has been received is determined. If the DSC ready signal has not been received, whether or not an over time of one second has passed is determined (S1230) after a 20 ms wait processing (S1228). If the DSC ready signal was received within one second, the process goes to S1224. If the DSC ready signal was not received within one second and the one-second timer is over at S1230, something has malfunctioned and the DSC battery display of the APS displaying part 32 is turned on (S1232), and the process goes to S1292 in FIG. 25.

If the APSCPU 150 receives the DSC ready signal at S1226, the command of the battery checking processing of the DSC is transmitted by the DSC communication (S1234). Whether an error has been set in the DSC communication is determined (S1236). If a communication error has been made, the process goes to S1288 in FIG. 25 to make the operation of the camera not possible. If the DSC communication has been normally performed at S1236, whether the signal (BCNG) indicating that the residual amount of the battery is not enough is received as the reply data is determined (S1238 in FIG. 24). If the BCNG is received at S1238, the process goes to S1292 in FIG. 25 to make the operation of the camera not possible.

If the reply data indicates that the residual amount of the battery is OK at S1238, status information about the APS in the EEPROM 178 is checked and whether E-APS-SATUEND is 55h is determined (S1240). That E-APS-SATUEND is 55h means that the information about APS shooting end has not transmitted to the DSC. In this case, an APS shooting end signal is transmitted by the DSC communication (S1242). After the communication, whether an error has been made is determined by the DSC communication (S1244). If an error has been made, the process goes to S1288 in FIG. 25 to make the operation not possible. If the communication has been normally performed, a writing processing for the EEPROM 178 is performed (S1246) and data 00h indicating that the signal has been transmitted is written in the E-APS-SATUEND.

After S1246 or S1240, FSTATE indicating the state of the APS is determined. Whether the FSTATE is during rewrite MR (S1248), whether the FSTATE is during rewrite frame feeding (S1250) and whether the FSTATE is during rewrite recovery (S1252) are determined in order. If YES at any of S1248–S1252, the process goes to S1292 in FIG. 25. Then, a command for cutting off the power supply is sent by the DSC communication (S1292), and after a 100 ms wait (wait for cutting off) processing (S1290), DSCVW=OFF processing is executed (S1288). This cuts off the DSC power supply. After that, the process goes to the main routine (S1294).

If NO at all of S1248–S1252, a signal indicating SM STATE=PLAY is transmitted by the DSC communication (S1254 in FIG. 25), and an ON/OFF command of the LCD display is transmitted (S1256) to turn on the liquid crystal monitor 40. The LCD display OFF is reset (S1258), and a five-second timer is started (S1260). The timer monitors the time for the DSC to read out data from the flash memory. The command for "STATE CHECKING" is communicated by the DSC communication (S1262), and whether the DSC ready signal has been received is determined (S1264). If the DSC ready signal has not been received, whether or not an over time of five seconds has passed is determined (S1268) after a 20 ms wait processing (S1266). If the DSC ready signal was received within five seconds, the process goes to S1262. If the DSC ready signal was not received within five seconds and the five-second timer is over at S1268, something has malfunctioned and the DSC battery display is turned on (S1270), and the process goes to S1292.

If the APSCPU 150 receives the DSC ready signal at S1264, a frame number requirement command is transmitted by the DSC communication (S1272). Then, it is determined if an error has been set in the DSC communication (S1274). If a communication error has been made, the process goes to S1288 to make the operation of the camera not possible. If the DSC communication has been normally performed at S1274, whether or not the received reply data is EDh indicating that the frame number can not be changed is determined (S1276). If the frame number can not be changed (EDh), the shooting data of the DSC is canceled (S1278), and the process goes to S1284. On the other hand, if the frame number can be changed, a command for requiring all the frame numbers and the shooting data is transmitted (S1280). After the communication, checking for errors is performed (S1282). If an communication error has been made, the process goes to S1288 to turn OFF the power supply of the DSC. If it is determined that the DSC communication has been normally performed, E-T-PLAY is set in the LCDOFF timer (S1284), and after starting the LCD-OFF timer (S1286), the process returns to the main routine.

Figure 26:
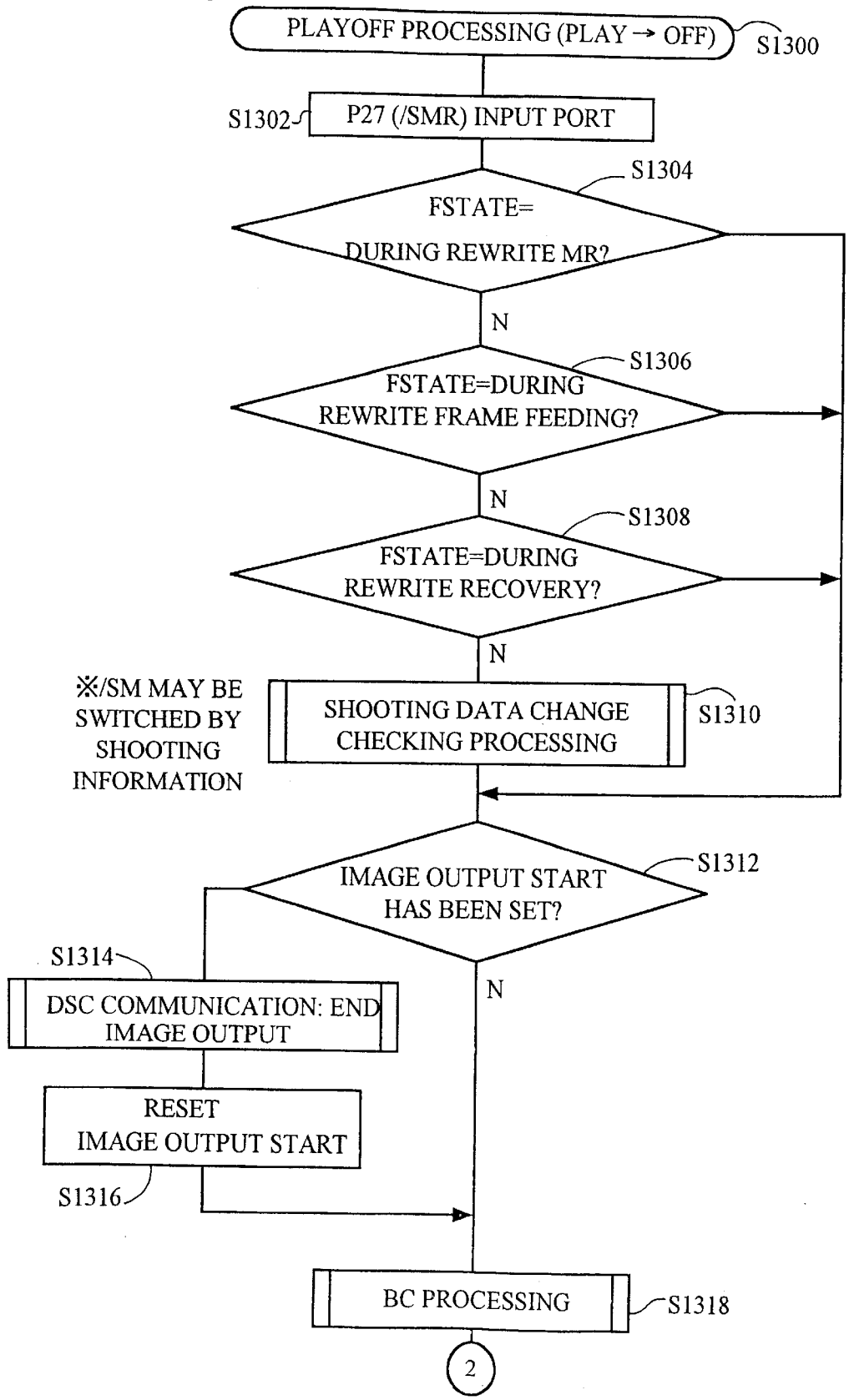
FIG. 26 is a flow chart showing a PLAYOFF processing (PLAY→OFF) of the hybrid camera in FIG. 1.
Figure 27:
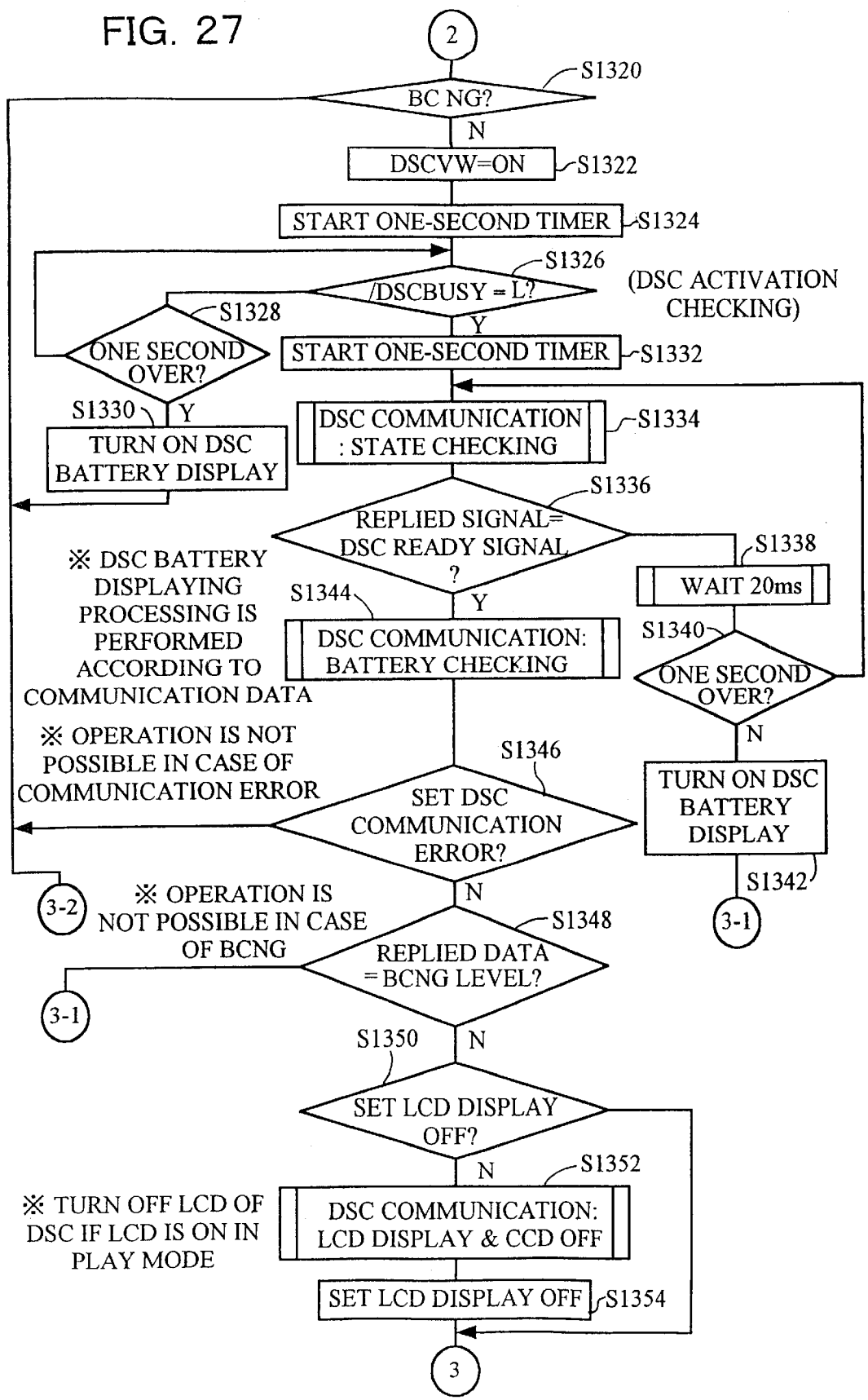
FIG. 27 is a flow chart showing the PLAYOFF processing (PLAY→OFF) of the hybrid camera in FIG. 1.
Figure 28:
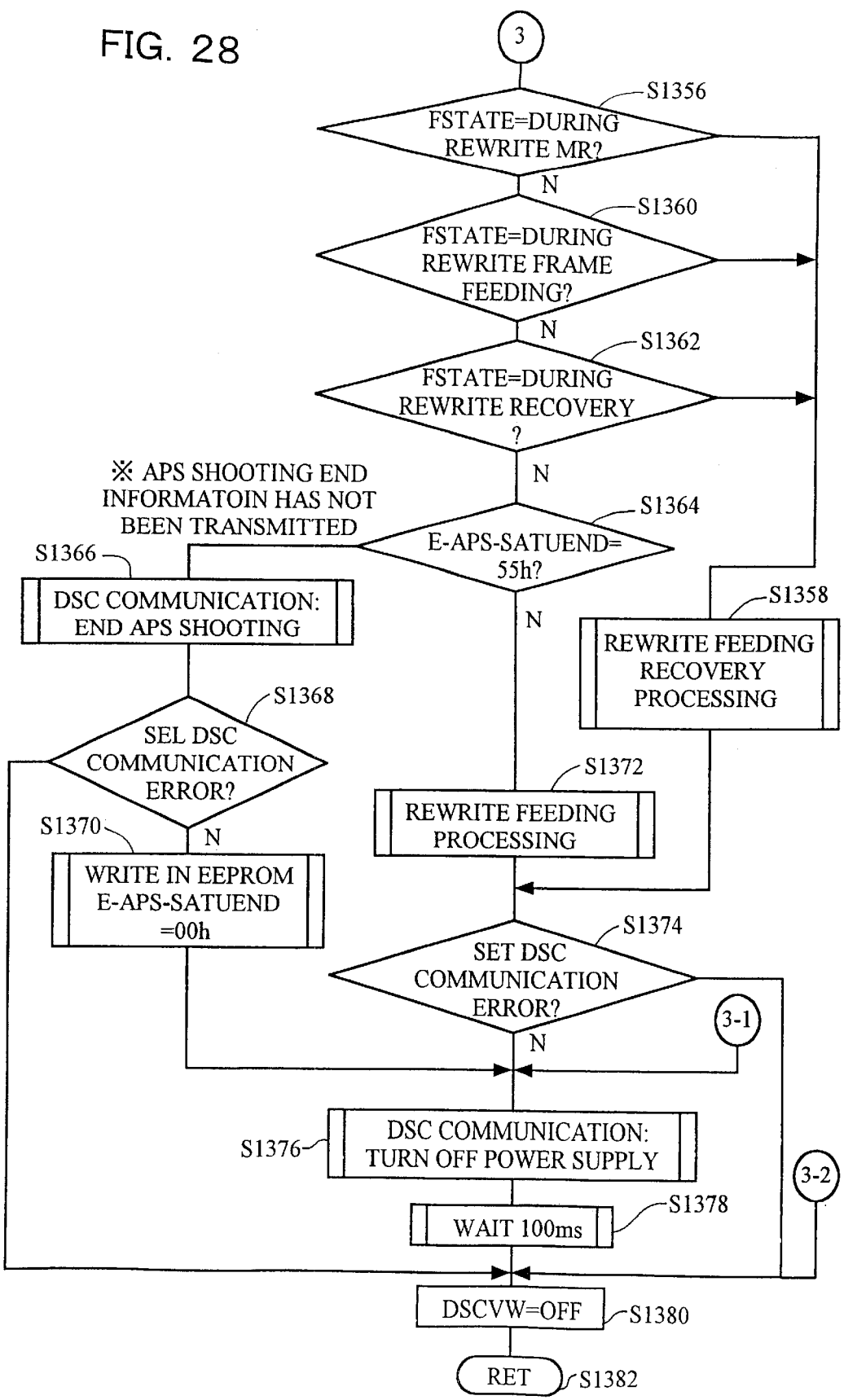
FIG. 28 is a flow chart showing the PLAYOFF processing (PLAY→OFF) of the hybrid camera in FIG. 1.

FIGS. 26, 27 and 28 are flow charts showing the PLAY-OFF processing (PLAY→OFF).

When the setting of the mode switching dial 72 has changed from "PLAY" to "OFF", the PLAYOFF processing (PLAY→OFF) in FIG. 26 is started. When the PLAYOFF processing is started (S1300), the APSCPU 150 makes the port 27 (/SMR) an input port (S1302). Whether the FSTATE is during rewrite MR (S1304), whether the FSTATE is during rewrite frame feeding (S1306) and whether the FSTATE is during rewrite recovery (S1308) are determined in order. If NO at all of S1304–S1308, a shooting data change checking processing is performed at S1310 and the processing goes to the S1312. This considers a case where the user rotates the mode switching dial 72 after changing the shooting information.

If YES at any of S1304–S1308, the process goes to S1312 in stead of S1310.

At S1312, whether image output start has been set is determined. If it has been set, after image output end is sent by the DSC communication (S1314), the image output start is reset (S1316). After S1316 or if the image output start has been reset at S1312, the process goes to S1318 to perform the battery checking (S1318).

If the residual amount of the battery is determined NG in BC determination (S1320 in FIG. 27), the process goes to S1380 in FIG. 28 and the operation becomes not possible. If the residual amount of the battery is determined OK in the BC determination at S1320, the DSCVW=ON processing is executed (S1322) to activate the DSC. At the same time, the one-second timer is started (S1324), and whether or not the hardware of the DSC has been activated within one second is determined (S1326 and S1328). Unless the port of the /DSCBUSY becomes Low within one second, it is determined that something has malfunctioned. In this case, the DSC battery display is turned on (S1330), and the process goes to S1380 in FIG. 28.

On the other hand, if the port of the /DSCBUSY becomes Low within one second at S1326, the one-second timer is started again (S1332), and the command for "STATE CHECKING" is communicated by the DSC communication (S1334). At S1336, whether the DSC ready signal has been received is determined. If the DSC ready signal has not been received, whether or not an over time of one second has passed is determined (S1340) after a 20 ms wait processing (S1338). If the DSC ready signal was received within one second, the process goes to S1334. If the DSC ready signal was not received within one second and the one-second timer is over at S1340, something has malfunctioned and the DSC battery display is turned on (S1342), and the process goes to S1376 in FIG. 28.

If the APSCPU 150 receives the DSC ready signal at S1336, the command of the battery checking processing is transmitted by the DSC communication (S1344). Whether an error has been set in the DSC communication is determined (S1346). If a communication error has been made, the process goes to S1380 in FIG. 29 to make the operation of the camera not possible. If the DSC communication has been normally performed at S1346, whether the signal (BCNG)

indicating that the residual amount of the battery is not enough is received as the reply data is determined (S1348). If the BCNG is received at S1348, the process goes to S1376 in FIG. 28 to make the operation of the camera not possible.

If the reply data indicates that the residual amount of the battery is OK at S1348, and whether or not the LCD display OFF has been set is determined (S1350). If the LCD of the DSC has been on in the PLAY mode, it is determined NO in S1350, and the process goes to S1352 to transmit a command for the LCD display and turning OFF the CCD. After the LCD display OFF is set (S1354), the process goes to S1356 in FIG. 28. If the LCD display OFF has been set at S1350, the process goes to S1356 in FIG. 28 in stead of S1352 and S1354.

Whether the FSTATE is during the rewrite MR (S1356), whether the FSTATE is during the rewrite frame feeding (S1360) and whether the FSTATE is during the rewrite recovery (S1362) are determined in order. If YES at any of S1356–S1362, the process goes to S1358 to perform a rewrite feeding recovery processing.

If NO at all of S1356–S1362, then whether the E-APS-SATUEND is 55h is determined (S1364). If the end information of the APS shooting has been transmitted, it is determined NO at S1364 and a rewrite feeding processing is performed (S1372). After the rewrite feeding processing (S1372) or after the rewrite feeding recovery processing (S1358), whether a DSC communication error has been set is determined (S1374). If an error has been set, the DSCVW=OFF processing is executed (S1380) and then the process goes to the main routine (S1382).

If it is confirmed that the DSC communication has been normally performed at S1374, the power supply OFF is commanded by the DSC communication (S1376), and after a 100 ms wait processing (S1378), the DSCVW=OFF processing is performed (S1380) and the process returns to the main routine (S1382).

If the APS shooting end information has not been transmitted in the determination at S1364, the process goes to S1366 to send the APS shooting end information by the DSC communication. After the communication, whether an error has been made is determined by the DSC communication (S1368). If an error has been made, the DSCVW=OFF processing is executed (S1380) and then the process goes to the main routine (S1382).

If it is determined that the communication has been normally performed at S1368, the writing processing for the EEPROM 178 is performed (S1370) and the data 00h indicating that the signal has been transmitted is written in the E-APS-SATUEND. After S1370–S1382, the process returns to the main routine.

FIGS. 29 through 43 are flow charts showing the SP1 switch processing.

Figure 29:
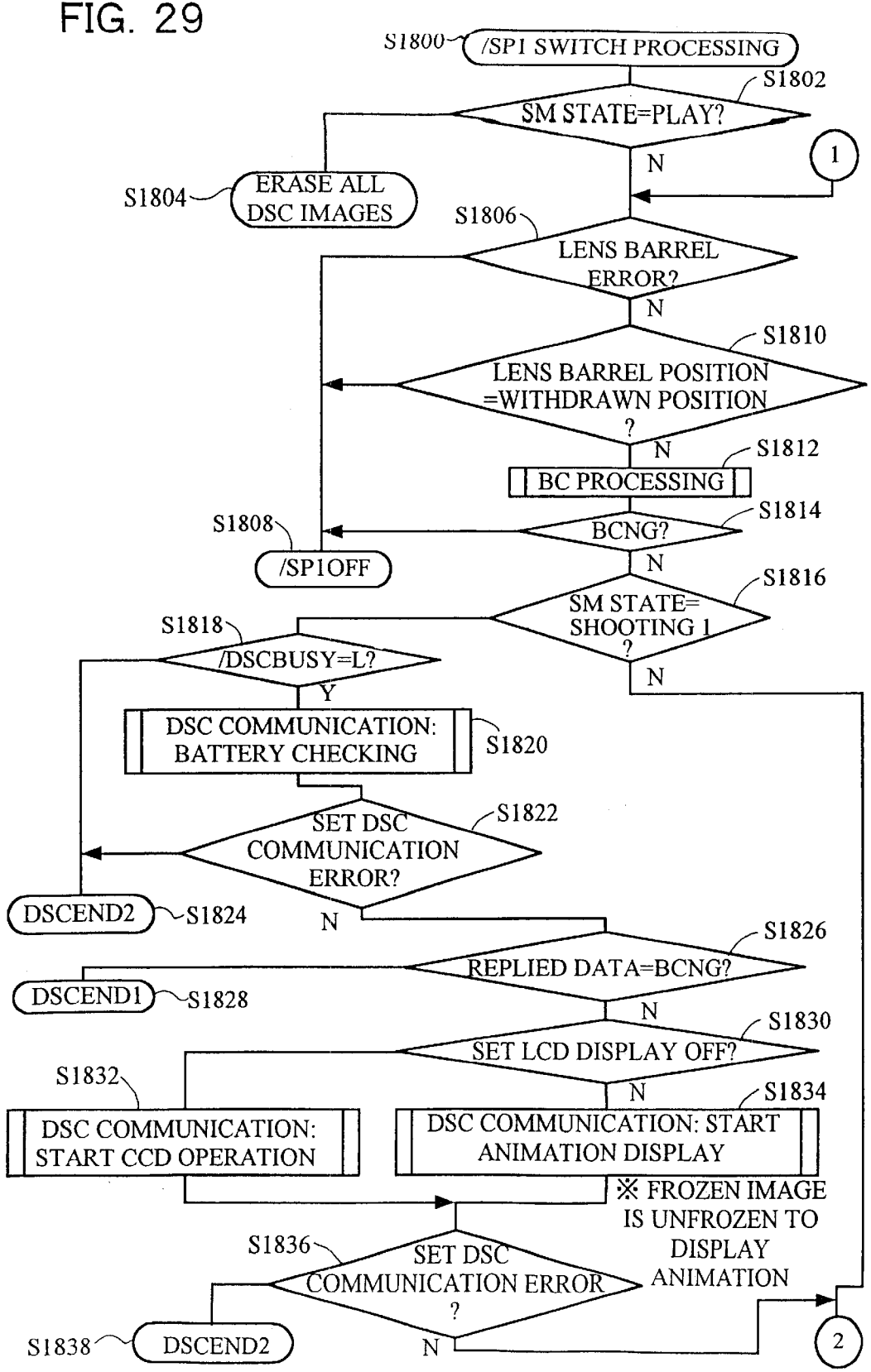
FIG. 29 is a flow chart showing an SPI switch processing of the hybrid camera in FIG. 1.

If the shutter release button 30 is pressed, the subroutine of the SP1 switch processing in FIG. 29 is started. If the SP1 switch processing is started (S1800), then whether the SM state is PLAY is determined (S1802). If the SM state is PLAY, the whole image data stored in the recording medium off the DSC is erased (S1804). By pushing the shutter release button 30 in the PLAY mode, a command "ERASE ALL DSC IMAGES" is executed.

If the SM state is not PLAY at S1802, whether a lens barrel error has been made (S1806). If the lens barrel error has been made at S1806, the process goes to "/SPlOFF" at S2352 in FIG. 45 (S1808). If the lens barrel is normally operated, then whether or not the lens barrel is at the withdrawn position is determined (S1810). If the lens barrel is at the withdrawn position, the process goes to S1808. If the lens barrel is not at the withdrawn position but the shooting-possible position, the battery checking processing is performed (S1812).

If it is determined that the battery is NG in a battery checking NG determination at S1814, the process goes to S1808. If it is determined that the battery is OK, the SM state is confirmed (S1816). At S1816, whether the SM state is the shooting 1 is determined. If the shutter release button 30 is pressed in the shooting 1 mode, it is determined YES at S1816, and that the DSC has been activated is confirmed at S1818. Unless the port of the /DSCBUSY is Low, it is determined that something has malfunctioned. In this case, the process goes from "DSCEND2" of S1824 to "DSCEND2" of S2360 in FIG. 44 to stop the shooting.

If the /DSCBUSY is L at S1818, the command for the battery checking processing is transmitted by the DSC communication (S1820). Then, whether an error has been set is determined by the DSC communication (S1822). If a communication error has been set, the process goes from "DSCEND2" of S1824 to "DSCEND2" of S2360 in FIG. 44 to stop the shooting. If it is determined whether the DSC communication has normally been performed at S1822, whether the signal (BCNG) indicating that the residual amount of the battery is not enough is received as the reply data is determined (S1826). If the BCNG is received at S1862, the process goes from "DSCEND2" of S1824 to "DSCEND1" of S2354 in FIG. 44.

If the reply data indicates that the residual amount of the battery is OK at S1826, then whether or not the LCD display OFF has been set is determined (S1830). If the shooting is performed while the liquid crystal display 40 is OFF, it is determined YES at S1830. In this case, the CCD start is commanded by the DSC communication at S1832. Thus, the image can be captured by only driving the CCD while the liquid crystal display 40 is OFF. Meanwhile, if the shooting is performed while the liquid crystal display 40 is ON and displaying a through animation, it is determined NO at S1830. In this case, a command for an animation display start is transmitted by the DSC communication at S1834. As a result, an image frozen during the shooting is unfrozen to display the animation.

After the DSC communication at S1832 or S1834, then whether an error of the DSC communication has been made is determined (S1836). If an error has been made, the process goes to "DSCEND2" of S2360 in FIG. 44 (S1838). If the communication has been normally performed, the photometry processing is performed at S1840 in FIG. 30.

Figure 30:
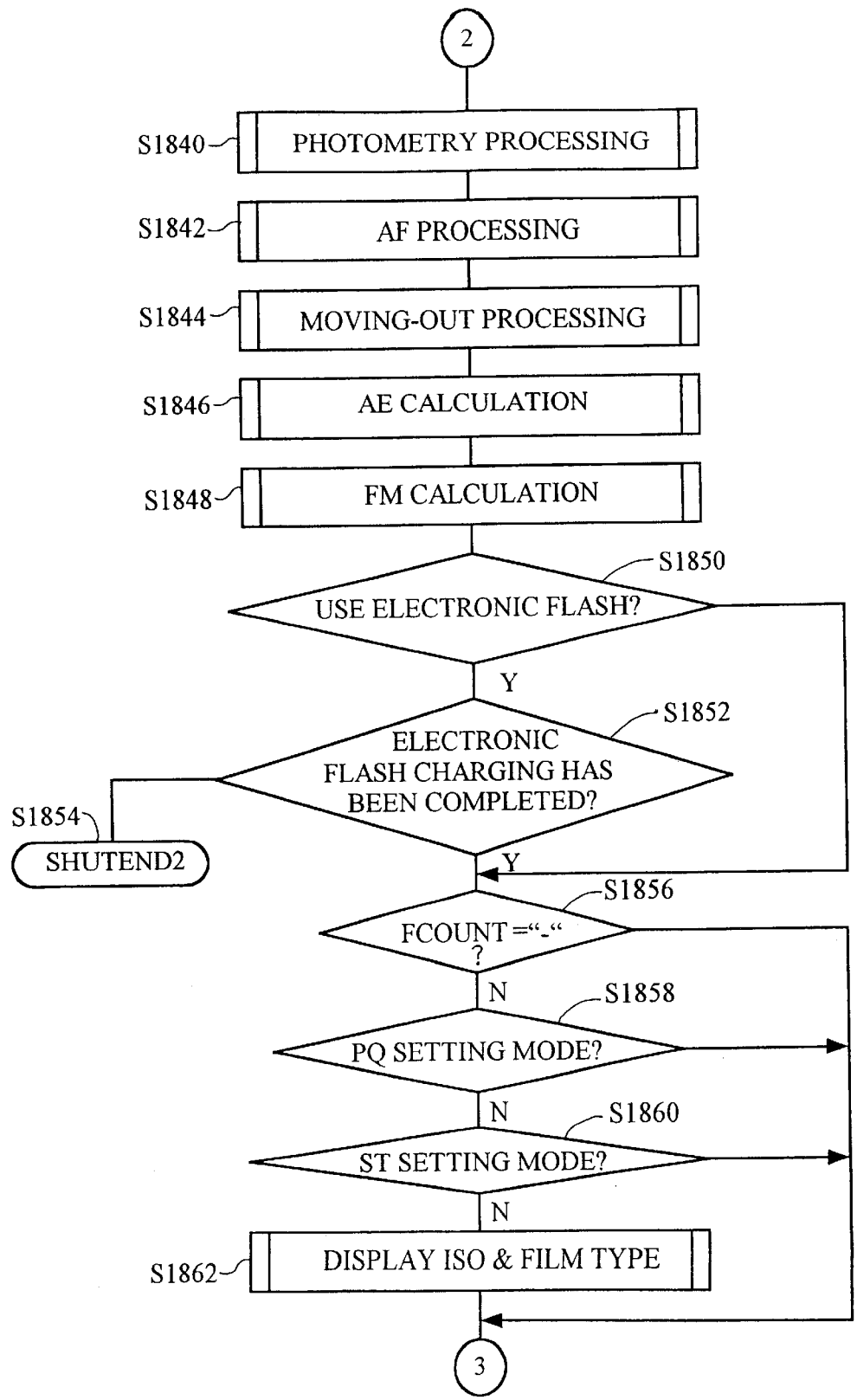
FIG. 30 is a flow chart showing the SPI switch processing of the hybrid camera in FIG. 1.

If the SM state is not the shooting 1 at S1816, that is, if the SM state is the shooting 2, the process goes to the photometry processing of S1840 in FIG. 30 in stead of S1818–S1836.

In the photometry processing, the luminance of the subject is measured according to the determination results of the photometry part (for example, CdS sensor) of the camera to acquire measurement data by calculation and so on. In the distance-measuring processing, the distance to the subject is calculated according to the light-receiving signals from the AF light-receiving part while making use of the principle of the triangulation (S1842). Then, the focus point is found according to the distance calculated by the distance-measuring calculation and present position of the lens barrel to calculate the moving-out amount of the lens barrel (S1844). In an AE calculating processing of S1846, the appropriate exposure time is calculate on the basis of the photometry data. In a flashmatic (FM) calculating processing of S1848, the appropriate light-emitting timing (light-emitting amount and light-emitting time) of the electronic flash is calculated.

After that, whether to use the electronic flash is determined (S1850). If the electronic flash is to be used, and whether the charging of the electronic flash has been completed is determined (S1852). If the charging of the electronic flash has not been completed, the process goes from S1854 to S2300 (SHUTEND2) in FIG. 44 to ban the exposure. Meanwhile, if the charging of the electronic flash has been completed or the electronic flash is not needed at S1850, whether the film count (FCOUNT) is "–" is determined at S1856. "–" means that the film cartridge has not been loaded in the camera. If the film cartridge has not been loaded in the camera, the process goes to S1864 in FIG. 31.

If the FCOUNT is not "–" (NO determination) at S1856, whether the PQ setting mode is set (S1858) and whether the ST setting mode is set (S1860) are determined in order. If YES at either of S1858 and S1860, the process goes to S1864 in FIG. 31.

Meanwhile, if NO at any of S1856–S1860, an ISO & FILMTYPE displaying processing is performed at S1862. In the processing, information about the film cartridge loaded in the camera is displayed on the APS displaying part 32, and the information includes the ISO sensitivity and the type of the film such as negative, reversal and black and white.

Figure 31:
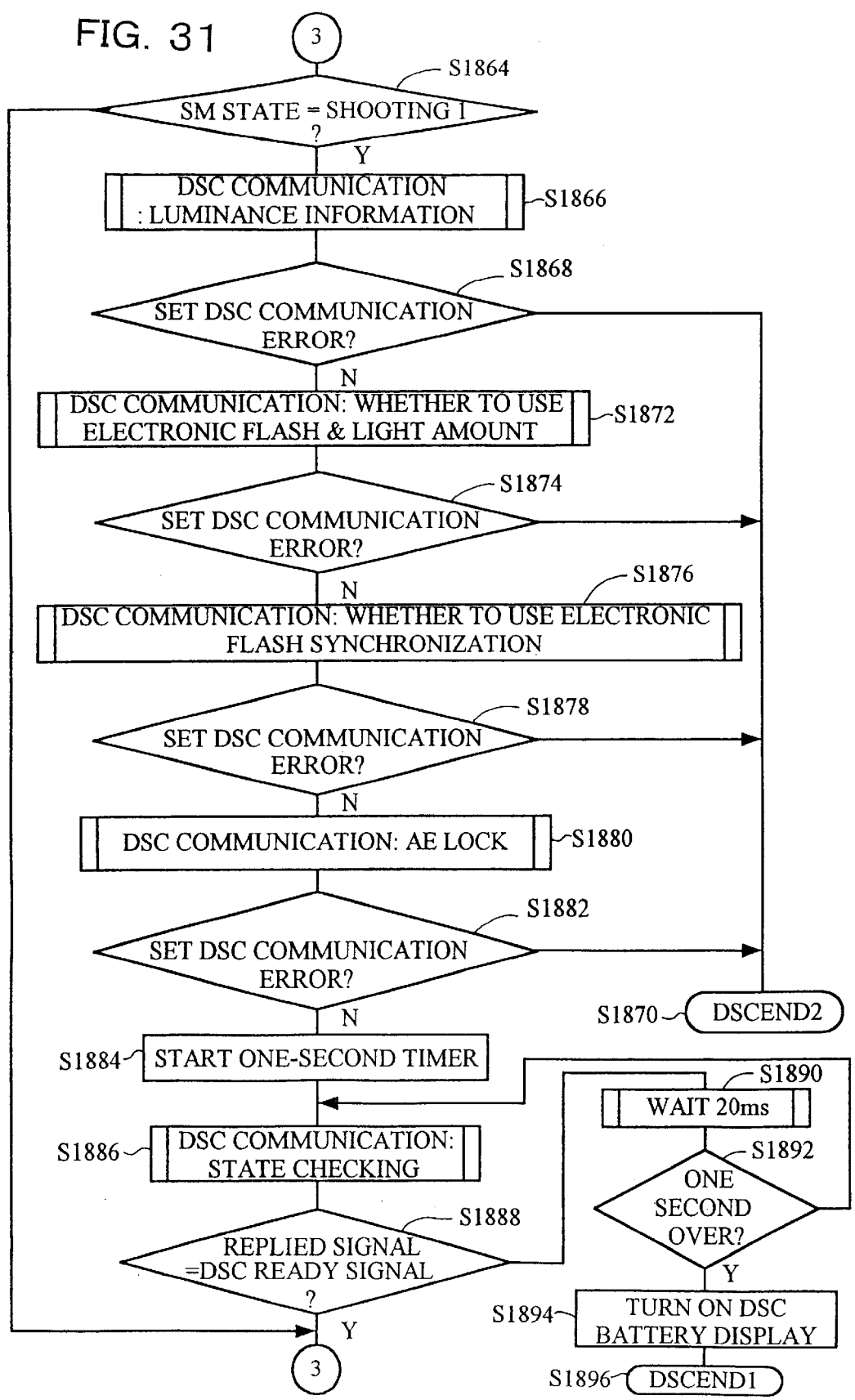
FIG. 31 is a flow chart showing the SPI switch processing of the hybrid camera in FIG. 1.

At S1864 in FIG. 31, whether the SM state is the shooting 1 is determined. If the SM state is not the shooting 1, the process goes to S1898 in FIG. 33. If the SM state is the shooting 1, the luminance information is transmitted by the DSC communication (S1866). After the communication, whether an error of the DSC communication has been made is determined (S1868). If an error has been made, the process goes to "DSCEND2" of S2360 in FIG. 44 (S1870) to make the operation not possible.

If the communication has been normally performed at S1868, information on whether to use the electronic flash and the light amount is transmitted by the DSC communication (S1872). Then, whether an error of the DSC communication has been made is determined (S1874). If an error has been made, the process goes to S1870. If the communication has been normally performed at S1874, information on whether to use the electronic flash synchronization is transmitted by the DSC communication (S1876). This is setting information on whether to synchronize the light-emission of the electronic flash at the APS shooting and the image-capturing of the CCD of the DSC. After the communication, whether an error of the DSC communication has been made is determined (S1878). If an error has been made, the process goes to S1870.

If the communication has been normally performed at S1878, a command for an AE lock is given by the DSC communication (S1880). After the communication, whether an error of the DSC communication has been made is determined (S1882). If an error has been made, the process goes to S1870. If the communication has been normally performed at S1882, the one-second timer is started: (S1884), and the command for "STATE CHECKING" is communicated by the DSC communication (S1886). At S1888, whether the DSC ready signal has been received is determined. If the DSC ready signal has not been received, whether or not an over time of one second has passed is determined (S1892) after a 20 ms wait processing (S1890). If the DSC ready signal was received within one second, the process goes to S1886. If the DSC ready signal was not received within one second and the one-second timer is over at S1892, something has malfunctioned and the DSC battery display is turned on to warn on the malfunction of the DSC on the LCD of the APS (S1894), and the process goes to S2354 "DSCEND1" in FIG. 44 to make the shooting not possible (S1896).

Figure 32:
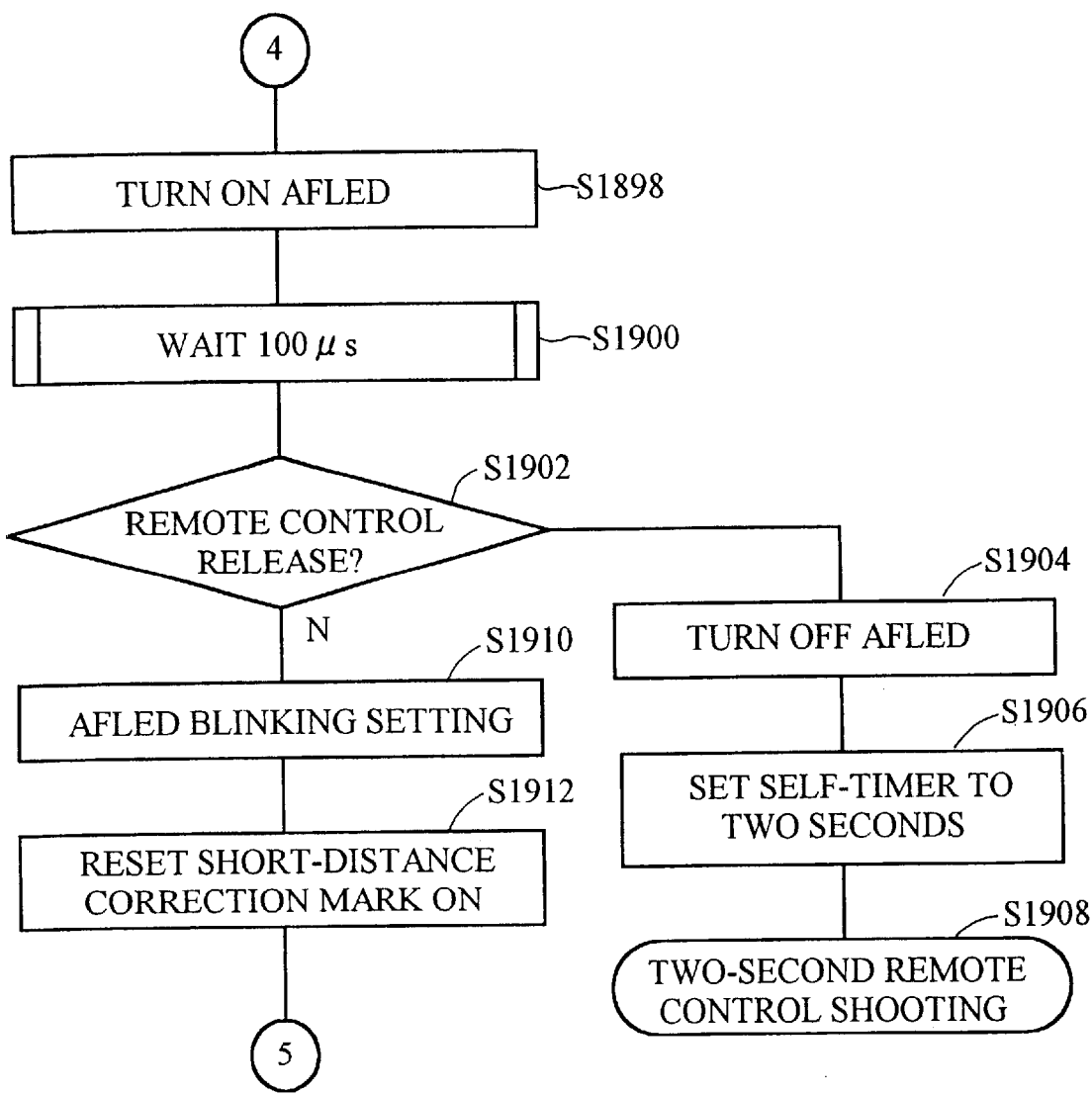
FIG. 32 is a flow chart showing the SPI switch processing of the hybrid camera in FIG. 1.

If the APSCPU 150 receives the DSC ready signal at S1888, an "AFLED ON" processing of S1898 in FIG. 32 is performed. This is the processing for turning on the LED for the AF that indicates the completion of the focusing.

After the "AFLED ON" processing of S1898, a "100 μs WAIT" processing is performed at S1900 and whether to use "REMOTE CONTROL RELEASE" is determined at S1902. If a release signal is received from the remote control, an "AFLED OFF" processing is performed at S1904, and after the self-timer is set to two seconds (S1906), a two-second remote control shooting is performed (S1908).

If NO at S1902, after an "AFLED BLINKING SETTING" processing is performed at S1910, a short-distance correction mark ON is reset (S1912).

Figure 33:
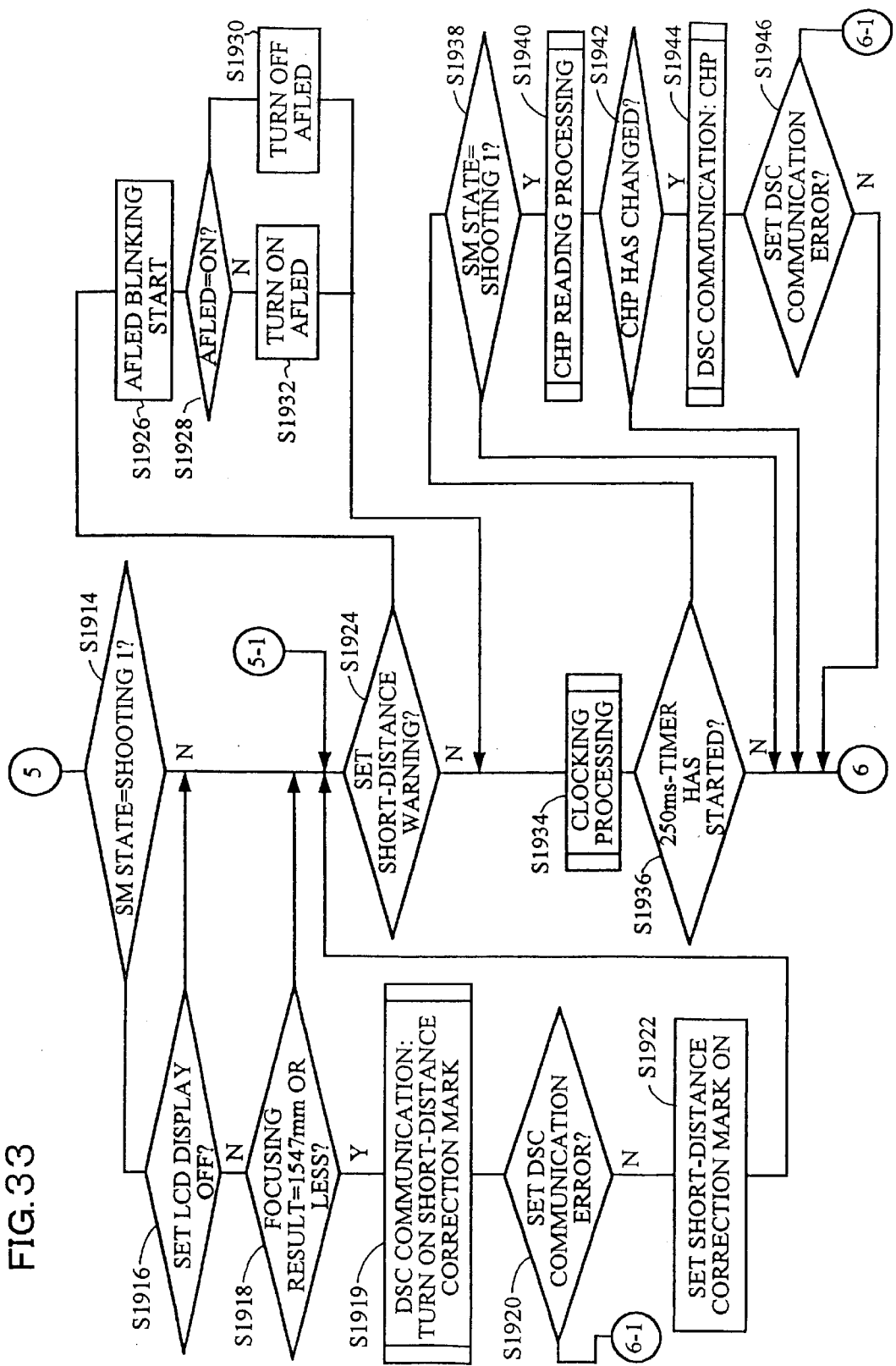
FIG. 33 is a flow chart showing the SPI switch processing of the hybrid camera in FIG. 1.

At S1914 in FIG. 33, whether the SM state is the shooting 1 is determined. If the SM state is the shooting 1, whether the LCD display OFF has been set is determined (S1916). If the LCD display is ON (if the LCD display OFF has been reset), the focusing result is 1547 mm or less at S1918. If YES at S1918, it is determined a short-distance shooting in which the parallax is large between the APS shooting and the DSC shooting, and a command for turning on the short-distance correction mark is transmitted by the DSC communication (S1919).

If the command for turning on the short-distance correction mark is transmitted by the DSC communication, the short-distance correction mark indicating the parallax is displayed on the liquid crystal monitor 40 of the DSC.

After the DSC communication, whether an error of the DSC communication has been made is determined (S1920). If an error has been made, the process goes to S1956 in FIG. 34, and after short-distance correction mark turning on is reset (S1956) and the AFLED turning off processing (S1958), the process goes to "SHUTEND2" of S2300 in FIG. 44 (S1960) to make the shooting not possible.

If it is determined that the communication has been normally performed at S1920, the short-distance correction mark turning on is set at S1922. The APSCPU 150 determines that the short-distance correction mark is ON. After the short-distance correction mark turning on is set at S1922, the process goes to a "SHORT-DISTANCE WARNING SET" determination of S1924. If the SM state is not the shooting 1, or if the LCD display OFF has been set at S1916, or if the distance is not determined short at S1918, the process goes to S1924.

Whether the short-distance warning has been set is determined at S1924. The distance is extremely short due to a difficulty of focusing, an "AFLED BLINKING START" processing is performed at S1926. If YES in the determination whether the AFLED is ON at S1928, the AFLED is turned OFF at S1930. If NO at S1928, after the AFLED is turned ON at S1932, the process goes to a clocking processing of S1934.

Figure 34:
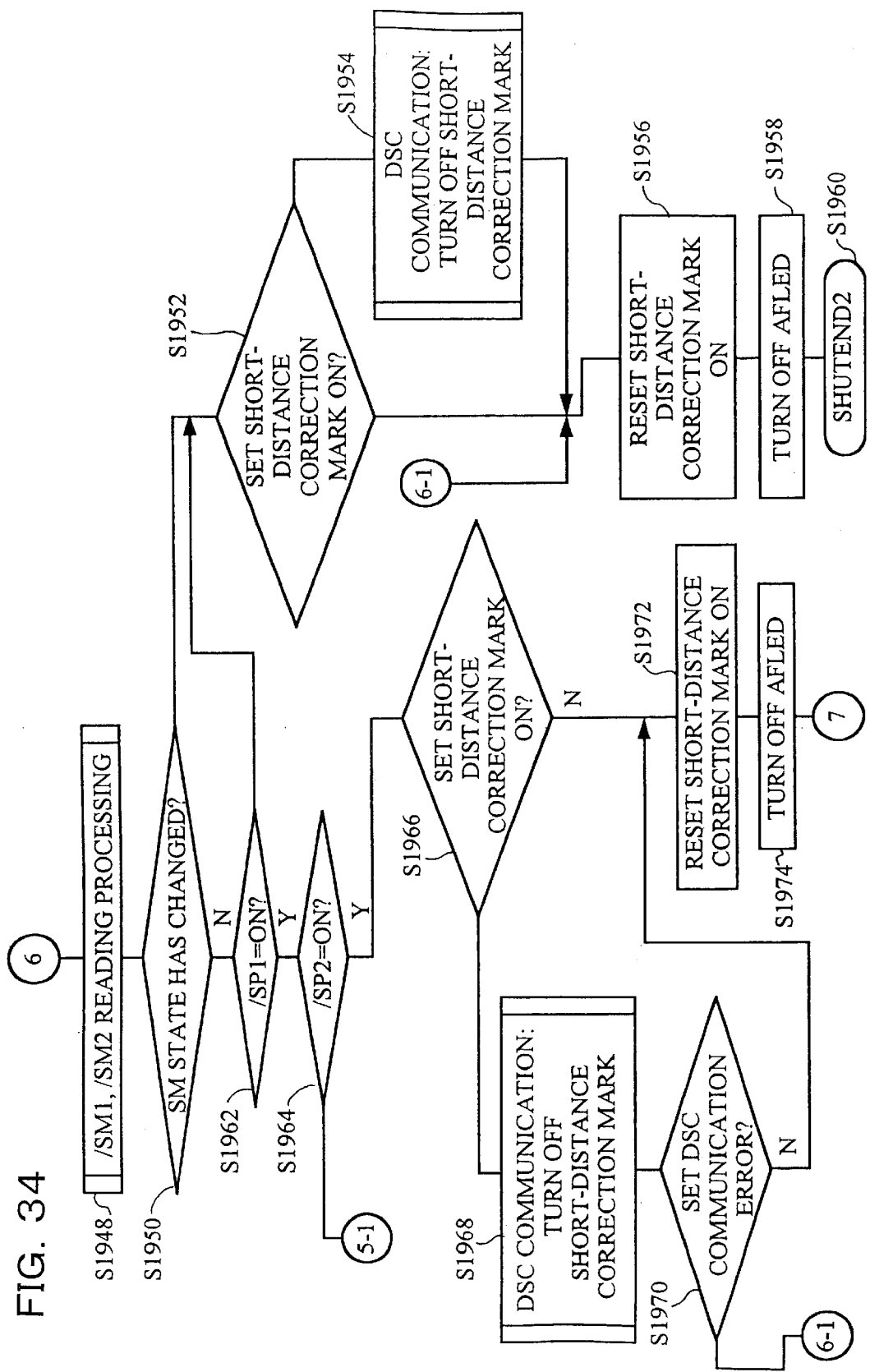
FIG. 34 is a flow chart showing the SPI switch processing of the hybrid camera in FIG. 1.

If NO at S1924, the process goes to the clocking processing of S1934. The clocking processing is a processing for integrating 250 ms and set the minute-display. A trigger is generated every 250 ms, and whether a 250 ms-timer has started is determined at S1936. If the 250 ms-timer has started, whether the SM state is the shooting 1 is determined S1938. If the SM state is the shooting 1, the CHP reading processing (S1940). If the CHP has changed (S1942), the CHP information is transmitted by the DSC communication at S1944. After the DSC communication, whether an error of the DSC communication has been made is determined (S1946). If it is determined that the communication has been normally performed, a "/SM1, /SM2 READING PROCESSING" of S1948 in FIG. 34 is performed. If an error has been made at S1946, the process goes to S1956 in FIG. 34, and the shooting becomes not possible after S1956–S1960.

On the other hand, if NO at either of S1936, S1938 and S1942, the "/SM1, /SM2 READING PROCESSING" of S1948 in FIG. 34 is performed.

After S1948 in FIG. 34, whether the SM state has changed (S1950). It is determined YES, if the mode switching dial 72 is rotated while the shutter release button is half pressed (SP1=ON). In this case, whether the short-distance correction mark turning on has been set is determined (S1952). If the short-distance correction mark turning on has been set, the command for turning off the short-distance correction mark is transmitted by the DSC communication (S1954), and then the short-distance correction mark turning on is reset at S1956. If NO at S1952, the process goes to S1956 in stead of S1954. Then, an "AFLED TURNING ON" processing is performed (S1958), and the process goes to a "SHUTEND2" processing of S2300 in FIG. 44 (S1960).

If NO at S1950, whether the /SP1 is ON is determined (S1962). If NO, the process goes to S1952. If the /SP1 is ON at S1962, and whether or not the /SP2 is ON is determined at S1964. That the /SP2 is ON means that the shutter release button is being fully pressed and corresponds to the shooting start command. If NO at S1964, the process returns to S1924 in FIG. 33 to wait for the SP2 to be turned ON.

It is determined that the SP2 is ON at S1964, a shutter release is started. At S1966, whether the short-distance correction mark turning on has been set is determined at S1966. If the short-distance correction mark is ON (if YES), it is commanded to turn off the short-distance correction mark (S1968). Then, whether an error of the DSC communication has been made is determined (S1970) and the short-distance correction mark turning on is reset at S1972. If an error has been made at S1970, the process goes to S1956 and the shooting becomes not possible after S1958–S1960.

If NO at S1966, the process goes to S1972 to reset the short-distance correction mark turning on. The AFLED is turned OFF (S1974), and then whether the SM state is the shooting 1 is determined at S1976 in FIG. 35. If the SM state is the shooting 1, a command for a blackout is transmitted by the DSC communication (S1978). The display is blacked-out (turning OFF the display) according to the command not to display the image on the liquid crystal monitor 40 when the lens barrel of the APS taking lens is driven for the focusing. The lens of the DSC and the lens of the optical finder move in association with the lens barrel of the APS taking lens, and thus a blurring occurs due to the focusing. Not to present the blurring image to the user, the liquid crystal display is temporarily turned OFF or blacked out (so called, the blackout).

Then, the CCD exposure controlling information about CCDAV, CCDG, CCDR and CCDB is transmitted by the DSC communication (S1979). The aperture and the gain of the DSC at the image-capturing are set according to the information.

After the DSC communication, it is determined if an error of the DSC communication has been made. If an error has been made, the process goes to "DSCEND2" of S2360 in FIG. 44 (S1982) to make the shooting not possible.

If the DSC communication has been normally performed or if NO at S1976, a self-timer processing (S1984) and a lens drive (LD) processing (S1986) are performed. The LD processing is the processing for moving the lens in accordance with the result of the coming-out distance calculation.

To determine if there has been a lens barrel error (S1988), and whether or not the lens barrel has been operated is determined. If the lens barrel has not moved, and whether or not the SM state is the shooting 1 is determined (S1996). If YES, a command for canceling the AE lock is transmitted by the DSC communication (S1998) and whether the LCD display OFF has been set is determined (S2000). If the LCD display is ON, the command for animation display start is transmitted and the process goes to S2048 in FIG. 37. If the SM state is not the shooting 1 at S1996 or if the LCD display OFF has been set at S2000, the process goes to S2048 in FIG. 37.

If the lens barrel error is not detected at S1988, and whether or not the lens drive is NG is determined at S1990. The movement of the lens barrel is determined by a photo-interrupter, and the displacement of the lens barrel is determined with pulses generated by the operation of the lens barrel. If the LD is NG at S1990, whether the time of the photo-interrupter is over is determined at S1992. If YES, a lens return processing is performed (S1994) and the process goes to S1996. If NO at S1992, the process goes to S1996 in stead of S1994. Then, the process goes to S2048 in FIG. 37 after S1996–S2002.

If the lens drive is not NG at S1990, the red-eye effect reducing processing (S2004) and the CHP reading processing (S2006) are performed. Whether the SM state is the shooting 1 is determined at S2008. If NO, the process goes to S2020 in FIG. 36. If YES, a communication of an exposure timing is performed by the DSC communication at S2010. Then, whether an error of the DSC communication has been made is determined (S2012). If an error has been made, the lens return processing is performed (S2014) to return the moved-out lens to the waiting position, and the process goes to "DSCEND2" of S2360 in FIG. 44 (S2016).

If the DSC communication has been normally performed at S2012, then whether or not the nth pulse of the DSCEXP pulse signal has been inputted is determined at S2018. Pulses are counted in order to synchronize the DSC shooting and the APS shooting at the nth pulse. When the nth pulse is detected, the process goes to S2020 in FIG. 36. If the SM state is the shooting 1 at S2008, that is, if the SM state is the shooting 2, the process goes to S2020 in FIG. 36.

Figure 36:
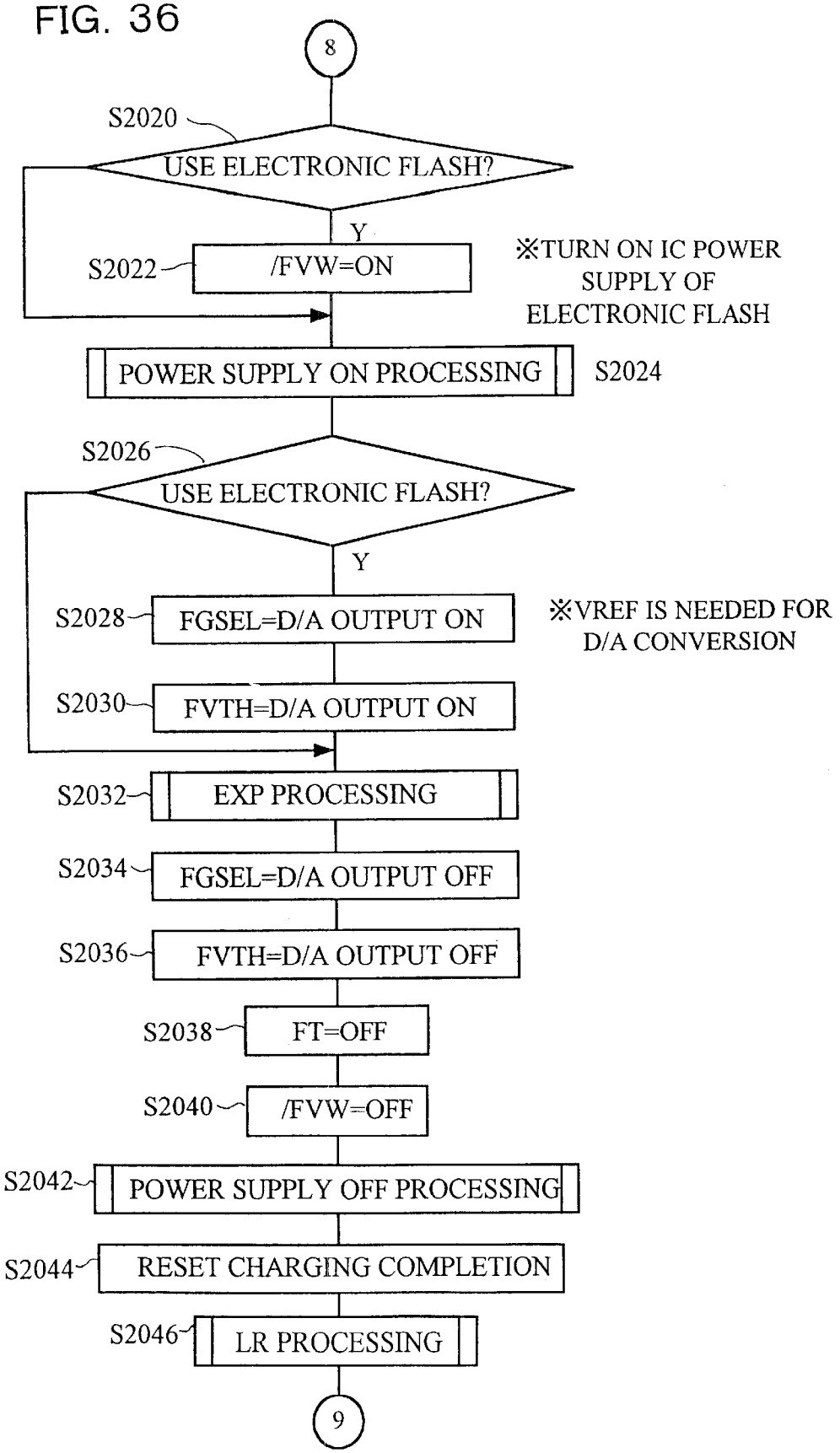
FIG. 36 is a flow chart showing the SPI switch processing of the hybrid camera in FIG. 1.

At S2020 in FIG. 36, whether to use the electronic flash is determined. If the electronic flash is needed, an "/FVW= ON" processing is performed at S2022 to turn ON the IC power supply of the electronic flash. If the electronic flash is not needed at S2020 or after S2022, a power supply ON processing is performed at S2024. The power supply ON processing is a processing for turning ON a power supply of the shutter driving part. At S2026, whether to use the electronic flash is determined again. If YES, an "FGSEL= D/A output ON" (S2028) and an "FVTH=D/A output ON" (S2030) are performed. This is because an analog value is outputted from a micro computer of the camera to the electronic flash unit and the IC in the electronic flash unit controls the light-emission according to the analog value. If the electronic flash is not needed at S2026, the process goes to S2032 in stead of S2028–S2030.

Then, an exposure processing (EXP processing) of S2032 is performed. At the "EXP PROCESSING", the received light amount of the electronic flash light-adjusting sensor 23 is monitored, and the light-emission of the electronic flash is stopped when the received light amount reaches a predetermined value. After the EXP processing, an "FVTH=D/A output OFF" (S2034), and an "FGSEL=D/A output OFF" (S2036), an OFF processing of the flash trigger (FT) (S2038) and an "/FVW=OFF" processing (S2040) are performed in order, and a power supply OFF processing of S2042 is performed to shut off the power supply to the shutter driving part. After a "CHARGING COMPLETION RESETTING" processing at S2044, the lens barrel is returned to the waiting position in an LR processing (S2046). After that, the process goes to S2048 in FIG. 37.

Figure 37:
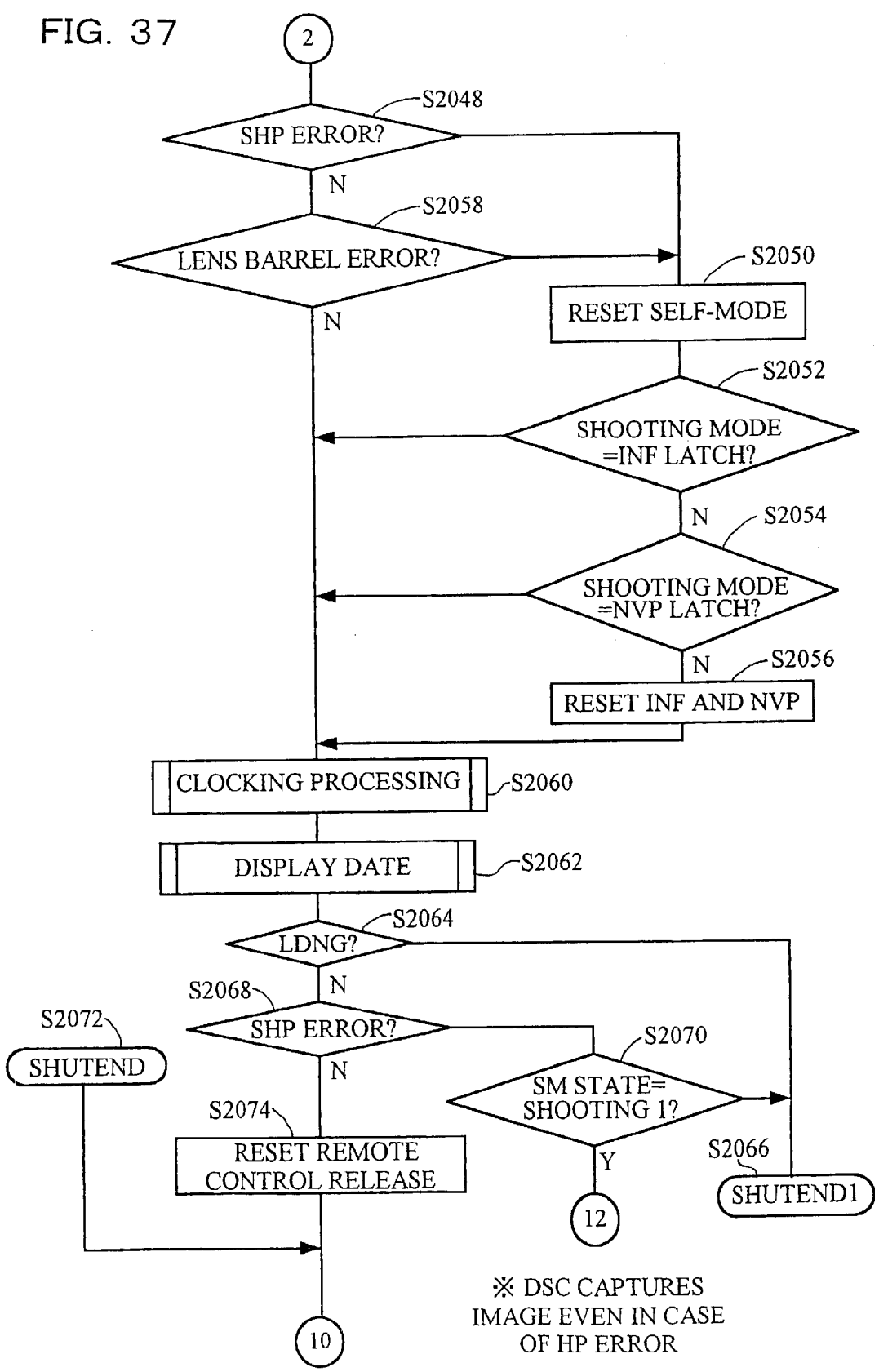
FIG. 37 is a flow chart showing the SPI switch processing of the hybrid camera in FIG. 1.
Figure 38:
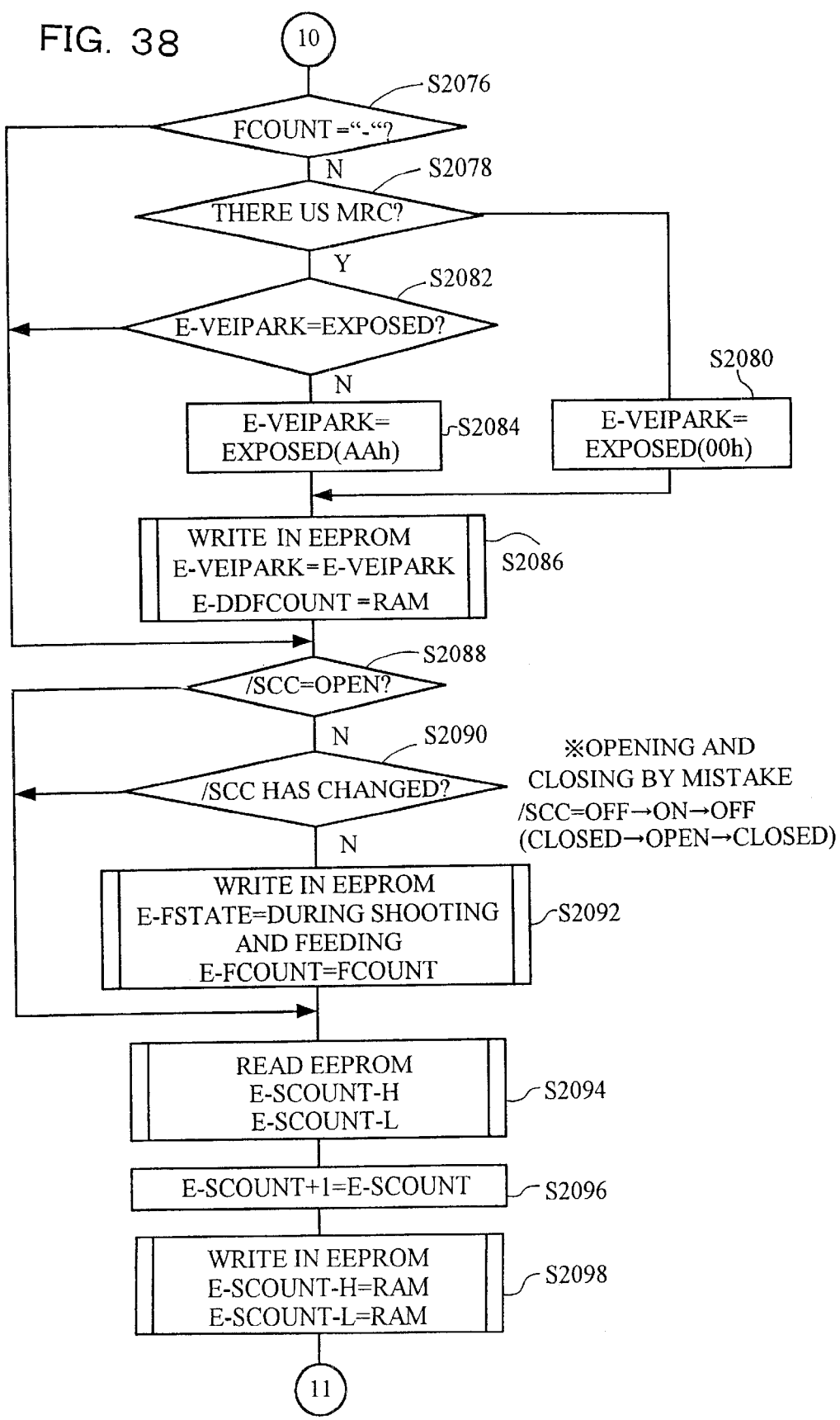
FIG. 38 is a flow chart showing the SPI switch processing of the hybrid camera in FIG. 1.

At S2048 in FIG. 37, whether a home position error of the shutter has been made is determined, and at S2058, whether the lens barrel error has been made is determined. If NO in both of the determinations (no errors), the process goes to S2060 to perform the clocking processing. If either the home position error of the shutter or the lens barrel error is detected, a self-mode resetting processing is performed (S2050). For example, an error is made at the first shot in the three-shot self-mode, the second shot and the third shot are not performed. Then, whether the shooting mode is set to an INF latch mode or an NVP latch mode is determined (S2052 and S2054). If the shooting mode is set to either of the modes, latch settings of the INF and the NVP are reset at S2056, and the process goes to S2060.

After the clocking processing at S2060, the date displaying processing of S2062 is performed. This stops the ISO & FILMTYPE display to display the date since the APS displaying part is apt to be displaying the ISO & FILMTYPE. Then, whether the lens drive is NG is determined (S2064). If the lens drive is NG, the process goes to a "SHUTEND1" of S2308 in FIG. 44 (S2066) to make the operation not possible. If the lens drive is OK, an "SHP ERROR" of S2068 is determined. If the error is detected, whether the SM state is the shooting 1 is determined (S2070). If NO, the process goes to the "SHUTEND1" of S2308 in FIG. 44 (S2066) to make the operation not possible.

Figure 40:
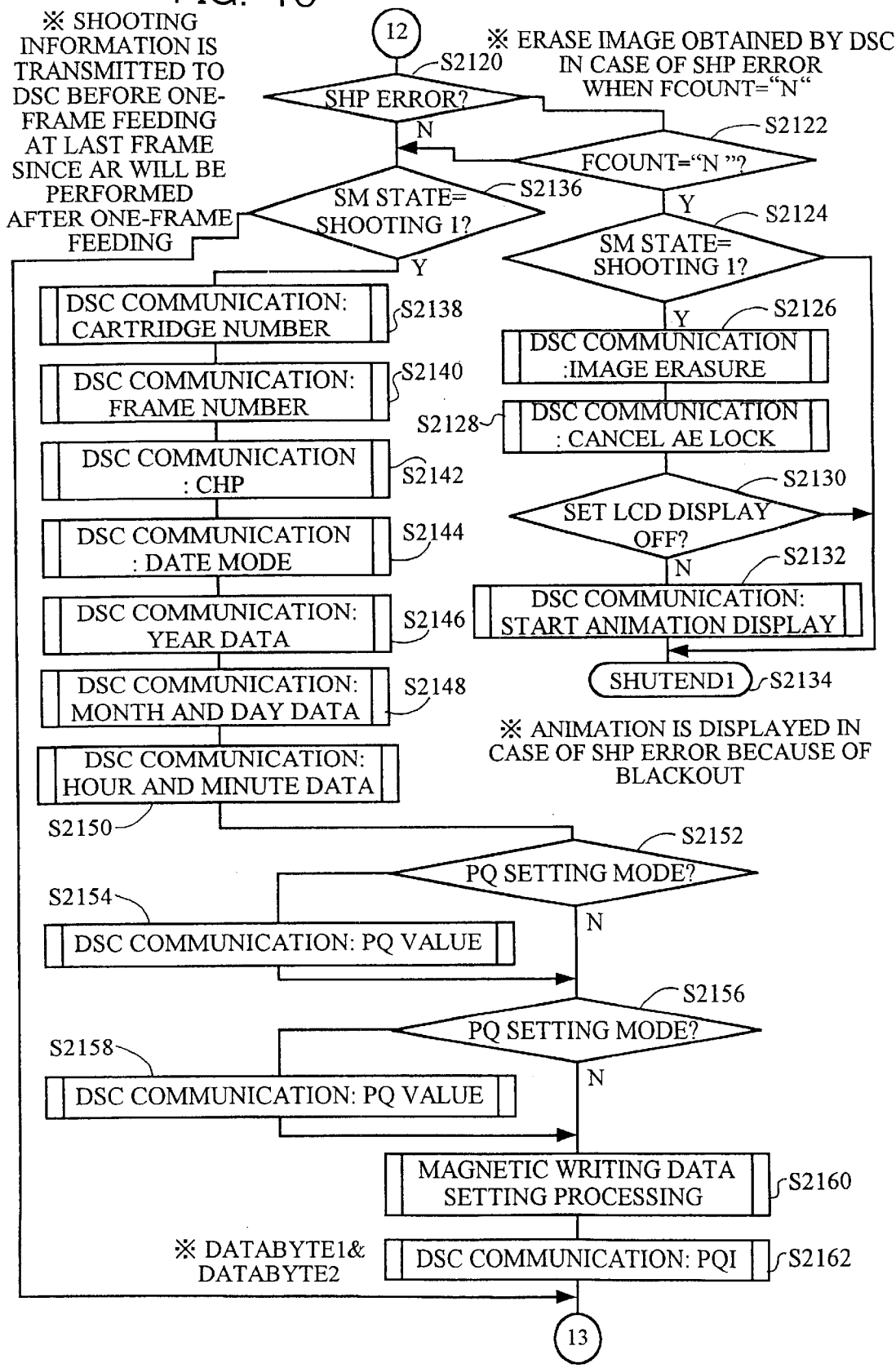
FIG. 40 is a flow chart showing the SPI switch processing of the hybrid camera in FIG. 1.

If the SM state is the shooting 1 at S2070, the process goes to S2120 in FIG. 40. Even if the home position error of the shutter is made, the image data corresponding to an image that is not recorded on the film remains only in the DSC since the DSC has captured the image. The processing (S2122-S2132) is performed to erase the image data.

If NO at S2068 in FIG. 37, a "REMOTE CONTROL RELEASE RESETTING" is performed at S2074. Then, whether the FCOUNT is "−" is determined S2076 in FIG. 40. If NO, whether there is a mid-roll-change (MRC) function is determined (S2078). The MRC function is a function in which a roll of film is rewound before exposing all the framed to be stored in the film cartridge and unloaded from the camera, and the film is automatically fed to the position of an unexposed frame when the film is loaded in the camera again. The MRC function is optionally provided, and the EEPROM 178 of the camera stores setting information on whether there is the MRC function or not.

In case of a camera in which the MRC function is set to be of no effect, it is determined NO at S2078, an "E-VEIPARK=EXPOSED (00h)" processing is performed at S2080. This writes information "EXPOSED (00h)" indicating that the film has been exposed in an area of a VEIPARK of the EEPROM 178. Mark holes indicating "○", a "semicircle", "×" and "□" are formed in the end surface of the APS film cartridge, and only a mark whole at which a white piece member is displayed white. This displays the processing information of the film inside. "○" indicates that the film has not been used (unexposed), and the "semicircle" indicates that some of the frames has been exposed (PARTIAL) an the others has not been exposed, and "×" indicates that the film has been exposed (EXPOSED), and "□" indicates that the film has been developed. This display is called the VEI display. In case of a camera without the MRC function, when one or more frames are exposed, the film is regarded as exposed even if there are residual unexposed frames. Thus, the "E-VEIPARK=EXPOSED (00h)" processing is performed at S2080.

On the other hand, in case of a camera with the MRC function, it is determined YES at S2078 and whether E-VEIPARK is EXPOSED at S2082. If NO, an "E-VEIPARK=EXPOSED (AAh)" processing is performed (S2084). If YES, the process goes to "/SCC=OPEN" of S2088. After S2084 or S2080, the EEPROM writing processing is performed at S2086. At S2086, the E-VEIPARK in the EEPROM 178 is rewritten to new E-VEIPARK set at S2084 or S2080, and information about the RAM is written in E-DDFCOUNT.

Then, whether the /SCC is OPEN is determined at S2088, and whether the /SCC has changed is determined at S2090. Opening and closing operation of the cartridge lid 80 by mistake is taken into consideration, if the cartridge lid 80 is opened during the shooting and it is closed soon, it is determined YES at S2088 or S2090 and the process goes to S2094. They are determined NO at S2078 and S2080 since the cartridge lid 80 is usually closed, and the writing processing for the EEPROM 178 is performed at S2092. At S2092, information indicating that the film is being exposed and fed is written in an EFSTATE and the value of the FCOUNT is written in the E-FCOUNT. The status information is written in the EEPROM 178 to prevent double-imaging by recognizing the previous state when the battery is loaded even if the battery is unloaded while the film is being fed and the feeding is stopped.

The writing processing for the EEPROM 178 is performed at S2094. At S2094, E-SCOUNT-H and E-SCOUNT-L corresponding to recording information of the total shot counter is read from the EEPROM 178. Then, a new value of the E-SCOUNT is arrived at by adding 1 to the read value (ESCOUNT) at S2096. This is updated in a written processing (S2098) for the EEPROM 178. The total shot number is used as inside information for maintenance and inspection such as evaluation of the camera or at a factory, and it is not presented to the user.

Figure 39:
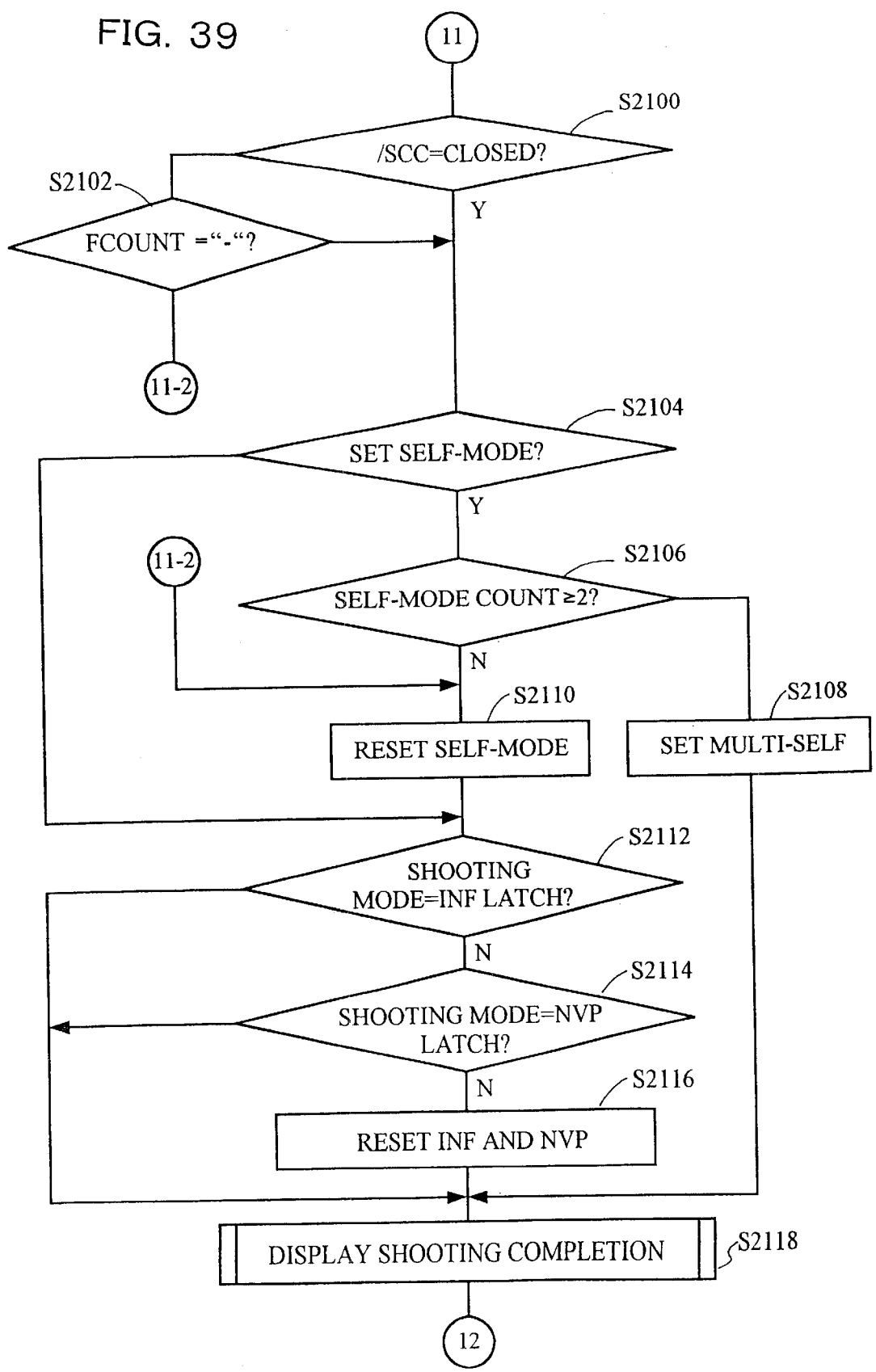
FIG. 39 is a flow chart showing the SPI switch processing of the hybrid camera in FIG. 1.

Then, whether the /SCC is CLOSED is determined at S2100 in FIG. 39. Usually, it is determined YES since the cartridge lid 80 is usually closed. But the cartridge lid 80 can be opened by mistake and the film cartridge can be in the camera. In this case, it is determined NO at S2100 and the process goes to S2102 to determine whether the FCOUNT is "−". If NO, the process goes to S2110.

If YES at S2100 or S2102, whether the self-mode has been set is determined S2104. If the self-mode has been set, whether the self-mode count is two or more is determined (S2106). If the self-mode count is two or more, a multi-self setting for continuously performing multiple self-shootings is performed (S2108). If NO at S2106, that is, if the self-mode count is 1, a self-mode resetting is performed at S2110.

If NO (self-mode setting) at S2104 or after the self-mode resetting is performed at S2110, whether the shooting mode is set to the INF latch or the NVP latch is determined (S2112 and S2114). If the shooting mode is not set to any of the modes, an "INF, NVP RESETTING" is performed (S2116) and then the shooting completion displaying processing is performed (S2118).

If the shooting mode is set to the INF latch or the NVP latch at S2112 or S2114, the process goes to S2118 in stead of S2116.

At S2118, the self-LED and the AFLED are ON for a predetermined time to inform the user that the shutter has been released (the image has been captured). Then, whether an SHP error has been made is determined at S2120 in FIG.

40. If the error is detected, the film count is checked (S2122). If the SHP error is made when the FCOUNT is "N", whether the SM state is the shooting 1 is determined (S2124) and then erasure of the image data is commanded by the DSC communication (S2126) and the cancellation of the AE lock is transmitted (S2128). Then, whether the LCD display OFF has been set is determined (S2130). If the LCD is displaying (NO determination), start of animation display is commanded by the DSC communication (S2132). This is because the LCD has had the blackout by the SP1 processing. After the communication of the animation display starting command, the process goes to the "SHUTEND1" processing (S2134).

If NO (the DSC has not operated) at S2124 or YES (the LCD display is OFF) at S2130, the process goes to S2134.

If the SHP error is not detected at S2120 and NO at S2122, and whether or not the SM state is the shooting 1 is determined (S2136). If the SM state is not the shooting 1, the process goes to S2164 in FIG. 41. If the SM state is the shooting 1, a cartridge number, the frame number, the CHP, the setting of the date mode, the year data, the month and day data, the hour and minute data are transmitted by the DSC communication in order (S2138–S2150). The cartridge number is a number that is automatically given to a cartridge when the cartridge is loaded in the camera in order, and each time a film is changed, the cartridge number is updated by adding 1. The data related to the latest cartridge number can be edited, but the data related to the former cartridge numbers can not be edited.

Then, whether or not the PQ setting mode or the ST setting mode has been set is determined (S2152 and S2156). If the mode has been set, the PQ value (S2154) or information about language and the title (S2158) is transmitted by the DSC communication.

After that, a magnetic writing data setting processing is performed (S2160), and print quality information (PQI) is sent to the DSC by the DSC communication (S2162). The PQI has two parameters that are a DATABYTE1 and a DATABYTE2, and information such as the brightness of the subject, the magnification and whether to use the electronic flash is written with the parameters.

Figure 41:
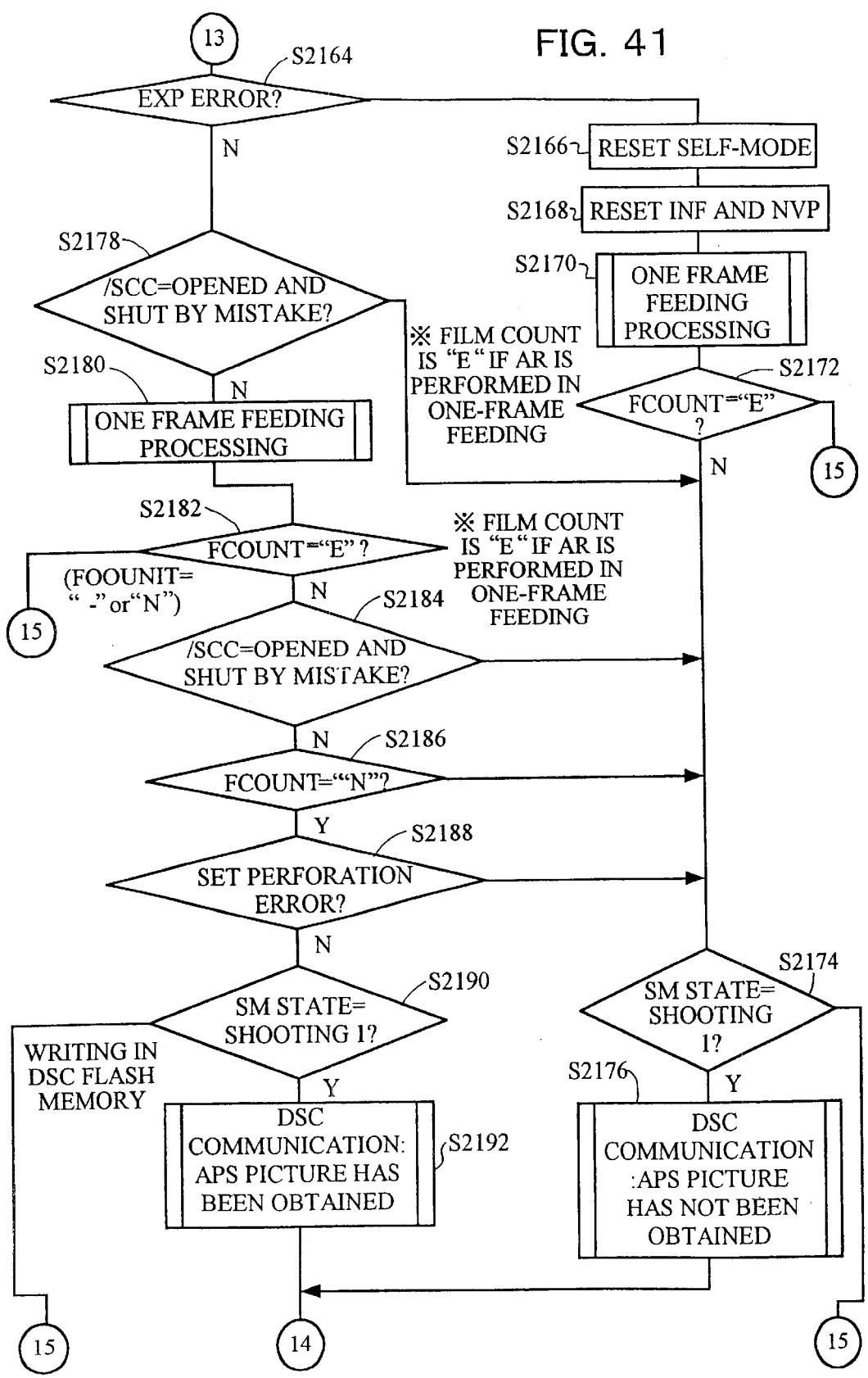
FIG. 41 is a flow chart showing the SPI switch processing of the hybrid camera in FIG. 1.

After S2162, the process goes to S2164 in FIG. 41 to determine whether an EXP error has been made. At S2164, whether or not something has malfunctioned with the exposure operation, for example, whether the shutter opened but did not shut, is determined. If the EXP error is detected, a self-mode resetting (S2166), the "INF, NVP RESETTING" (S2168) and a "ONE FRAME FEEDING PROCESSING" (S2170) are performed. If the shooting is performed and one frame is fed when the number of the residual frame is 1, the whole film is rewound into the cartridge and the FCOUNT becomes "E". In the other cases, the FCOUNT reduces by 1 on the one-frame winding. After S2170, whether the FCOUNT becomes "E" is determined (S2172). If YES, the process goes to S2226 in FIG. 43. If NO, the process goes to S2174.

At S2174, whether the SM state is the shooting 1. If NO, the process goes to S2226 in FIG. 43. If YES, information indicating that the APS picture has not been obtained is transmitted by the DSC communication (S2176).

If NO at S2164, then whether or not the /SCC has opened and shut by mistake is determined (S2178). If it is detected that the film cartridge lid 80 has opened and shut by mistake, the process goes to S2174. It is usually determined NO since the film cartridge lid 80 is closed, and the one frame feeding processing (S2180) is performed. Then, whether the FCOUNT is "E" is determined (S2182). If YES, the process goes to S2226 in FIG. 45. If NO (FCOUNT="–" or "N"), then whether or not the /SCC has opened and closed by mistake (S2184), whether the FCOUNT is "N" (S2186) and whether a perforation error has been set (S2188) are determined in order. If it is determined that the film cartridge lid 80 has opened and closed by mistake at S2184, or if only the DSC shooting is performed when the cartridge has not been loaded at S2186, or if the perforation error has been set at S2188, the process goes to S2174. By setting the perforation error, the second frame after next is exposed in stead of the next frame to prevent the double-imaging when an error is made in the perforation count.

If the camera normally operates, it is determined NO at S2188 and then whether or not the SM state is the shooting 1 is determined (S2190). If the SM state is the shooting 1, information indicating that the APS picture has been obtained is transmitted by the DSC communication (S2192). If the SM state is not the shooting 1, the process goes to S2226 in FIG. 43. The information indicating that the APS picture has been obtained is written in the flash memory of the DSC with the image obtained by the DSC.

Figure 42:
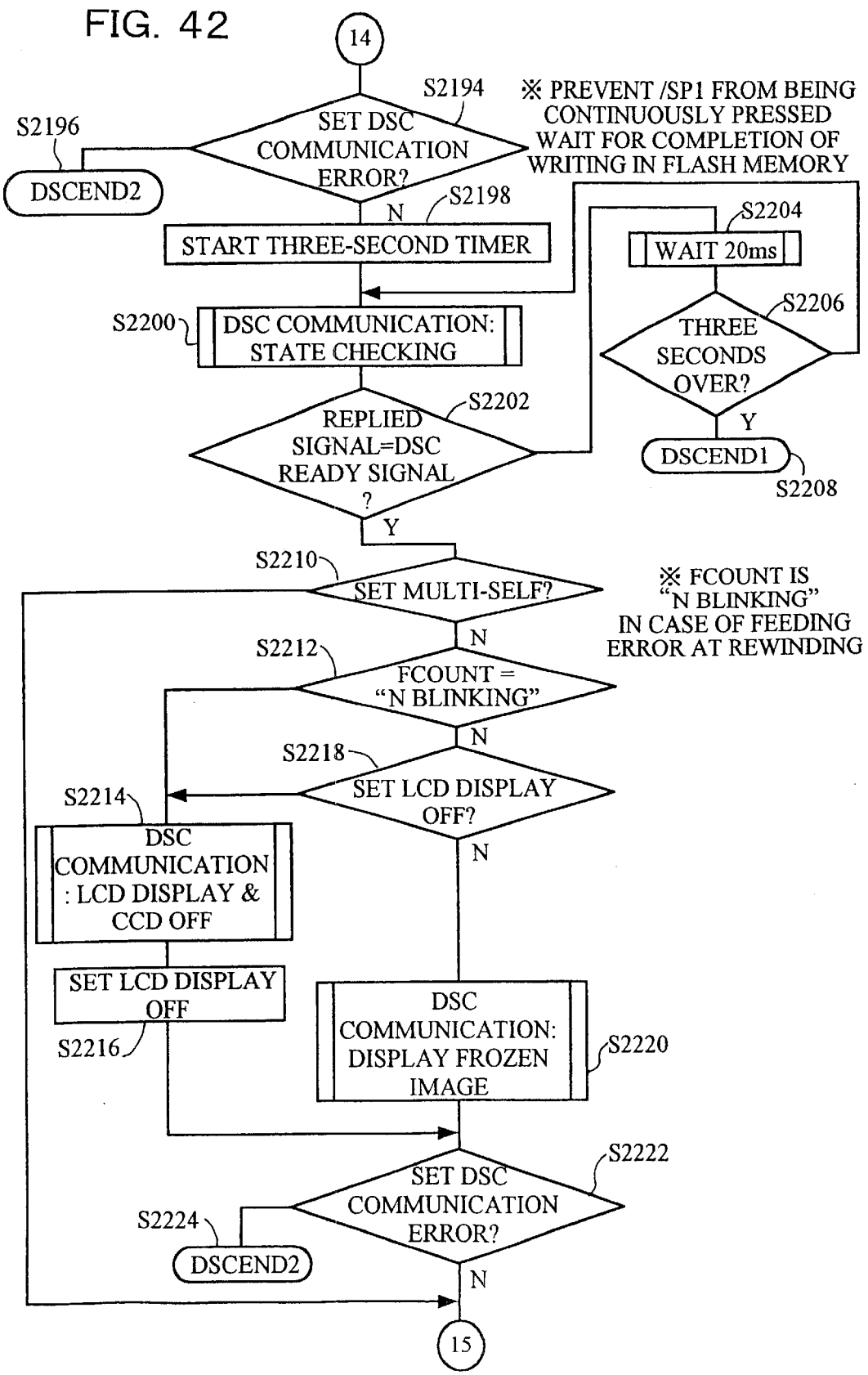
FIG. 42 is a flow chart showing the SPI switch processing of the hybrid camera in FIG. 1.

After the DSC communication at S2192 or S2176, whether or not an communication error has been made is determined (S2194 in FIG. 42). If the error is detected, the process goes to the "DSCEND2" of S2360 in FIG. 44 (S2196) to make the operation not possible. On the other hand, if the communication has been normally performed, a three-second timer is started (S2198), and the command for "STATE CHECKING" is communicated by the DSC communication (S2200). The three-second timer is a measure to prevent the SP1 from being continuously pushed, and is set to wait the writing processing of the image data to the flash memory to end. After that, whether or not the DSC ready signal has been received is determined (S2202). If the DSC ready signal has not been received, then whether or not an over time of three seconds has passed is determined (S2206) after a 20 ms wait processing (S2204). If the DSC ready signal was received within three seconds, the process goes to S2200. If the DSC ready signal was not received within three seconds and the three-second timer is over at S2206, something has malfunctioned and the process goes to S2354 "DSCEND1" in FIG. 44 (S2208) to make the shooting not possible.

If the DSC ready signal has been received at S2202, then whether or not the multi-self has been set is determined (S2210). If the multi-self has been set, the process goes to S2226 in FIG. 43. If the multi-self has not been set, then whether or not the FCOUNT is "N BLINKING" is determined (S2212). The FCOUNT becomes the "N BLINKING" when an feeding error is made at the rewinding. If the "N BLINKING" is detected, the LCD display OFF and the CCD driving OFF are commanded by the DSC communication (S2214) and the LCD display OFF is set (S2216). Then, whether an error has been made in the DSC communication is determined (S2222). If the error is detected, the process goes to S2360 "DSCEND2" in FIG. 44 (S2224) to make the operation not possible. If the communication has been normally performed, the process goes to S2226 in FIG. 43.

If the "N BLINKING" is not detected at S2212, then whether or not the LCD display OFF has been set is determined (S2218). If the LCD is OFF, the process goes to S2214. The CCD driving is stopped since the CCD has started image-capturing even if the LCD is OFF.

If the LCD is ON at S2218, a command for frozen image display is transmitted by the DSC communication (S2220). The shot image is displayed by the command.

Whether an communication error has been made is determined at S2222. If the error is detected, the process goes to the "DSCEND2" of S2360 in FIG. 44 (S2224) to make the operation not possible. If the communication has been normally performed, the process goes to S2226 in FIG. 43.

Figure 43:
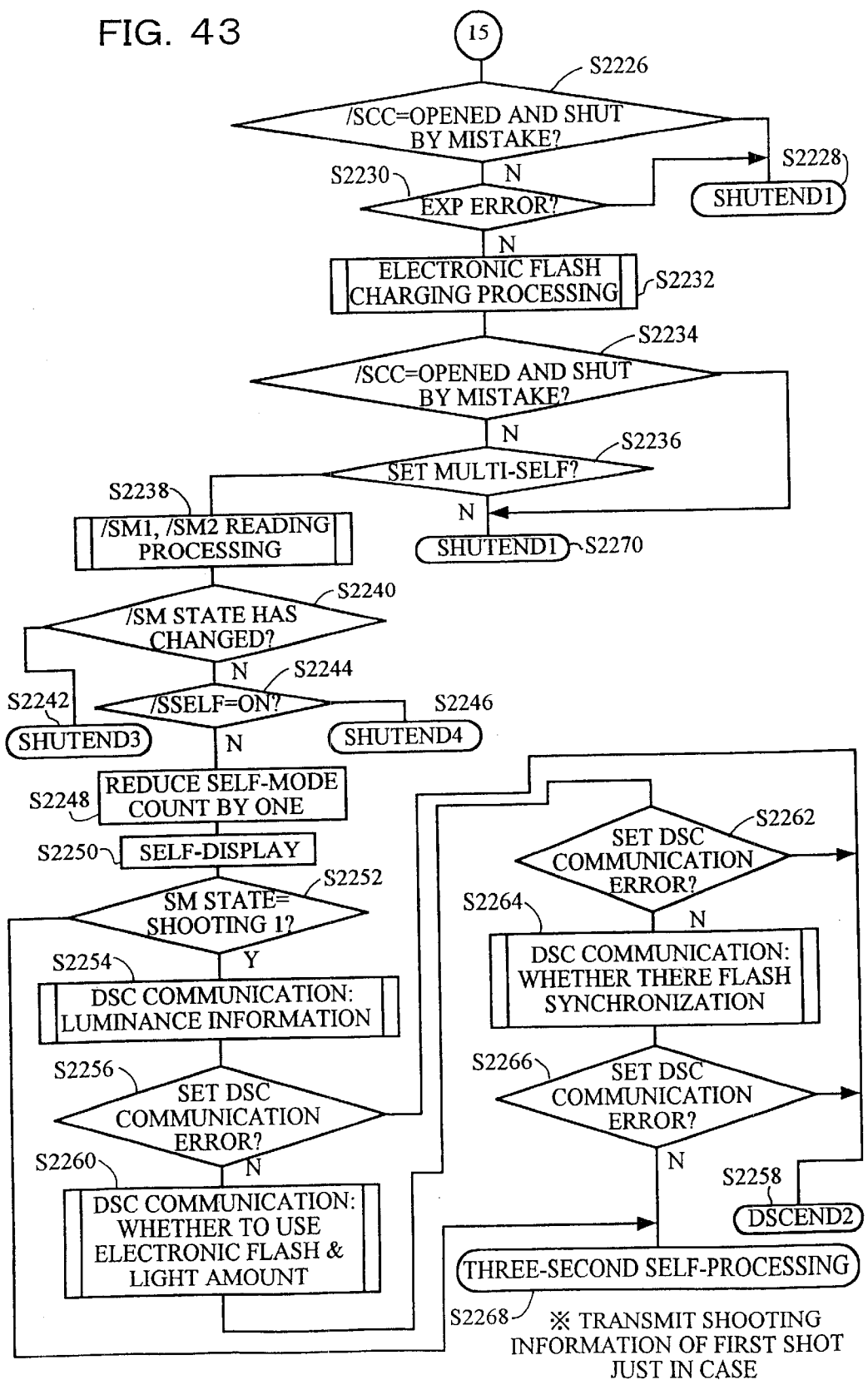
FIG. 43 is a flow chart showing the SPI switch processing of the hybrid camera in FIG. 1.
Figure 44:
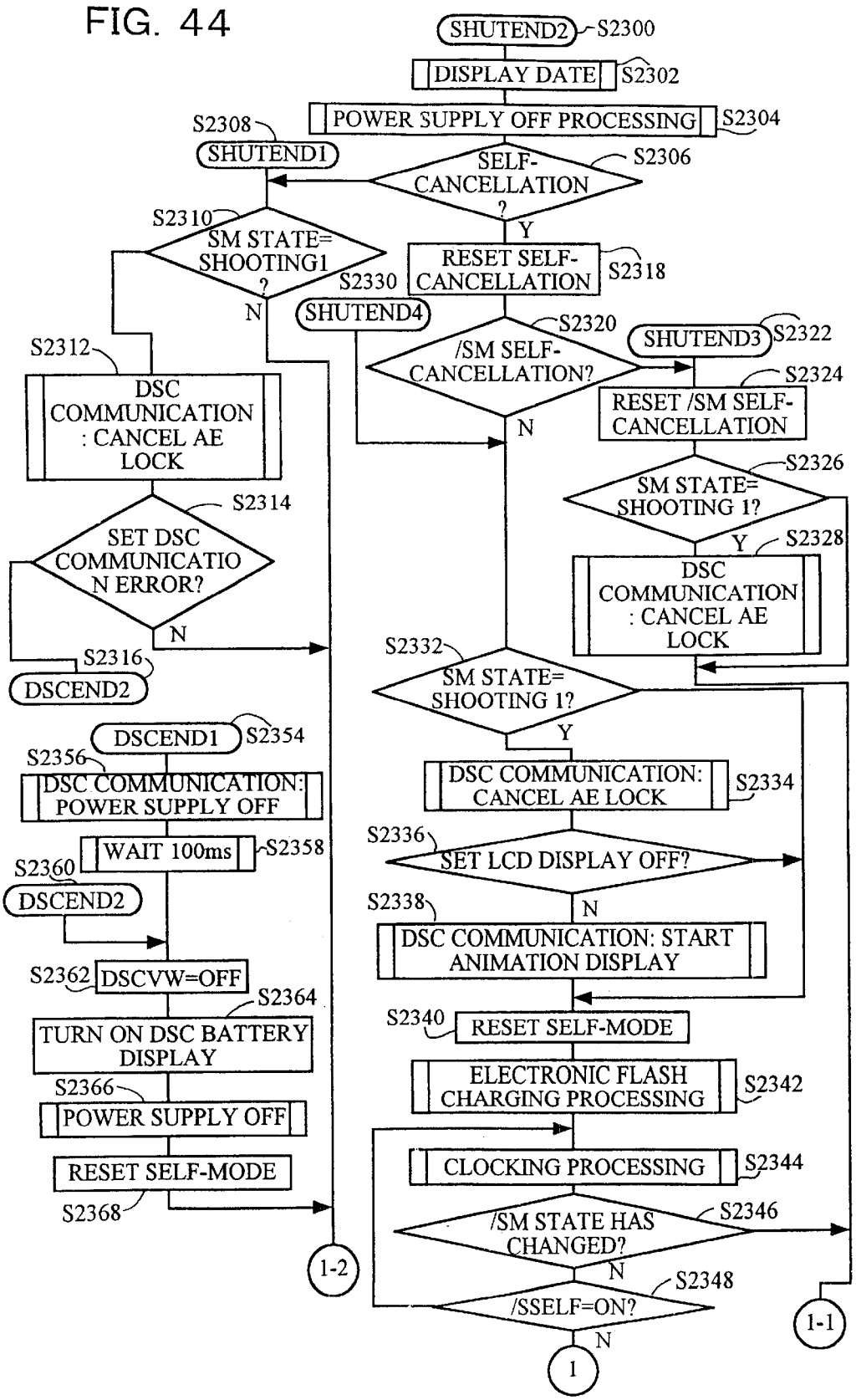
FIG. 44 is a flow chart showing a SHUTEND2 processing of the hybrid camera in FIG. 1.

At S2226 in FIG. 43, whether the /SCC has opened and shut by mistake is determined. If it is detected that the film cartridge lid 80 has opened and shut by mistake, the "SHUTEND1" of S2308 in FIG. 44 is performed (S2228). If it is not detected that the film cartridge lid 80 has opened and shut by mistake at S2226, then whether or not the EXP error has been made is determined (S2230). If the EXP error has been made, the process goes to S2228. If the EXP error is not detected, the electronic flash charging processing (S2232) is performed.

Whether the /SCC has opened and shut by mistake is determined again (S2234) since the cartridge lid 80 can be opened during the electronic flash charging processing. If it is detected that the film cartridge lid 80 has opened and shut by mistake, the "SHUTEND1" of S2308 in FIG. 44 is performed (S2270). If it is not detected that the film cartridge lid 80 has opened and shut by mistake at S2234, then whether or not the multi-self has been set is determined (S2236). If the multi-self has not been set, the process goes to S2270. If the multi-self has been set, the "/SM1, /SM2 READING PROCESSING" is performed (S2238). Then, whether the SM state has changed is determined (S2240). If the SM state has changed, the process goes to "SHUTEND3" of S2322 in FIG. 44 (S2242). If the SM state has changed at S2240, then whether or not the /SSELF is ON is determined (S2244). If YES, the process goes to "SHUTEND4" of S2330 in FIG. 44 (S2246) to reset the self-mode. Meanwhile, if NO at S2244, the self-mode count is reduced by 1 at S2248 and then a self-display is performed (S2250).

Then, whether the SM state is the shooting 1 is determined (S2252). If the SM state is the shooting 1, the luminance information is transmitted by the DSC communication (S2254). Then, whether a communication error has been made is determined (S2256). If the DSC communication has been normally performed, information on whether to use the electronic flash and the light amount is transmitted by the DSC communication (S2260). After the communication, whether an error has been made is determined (S2262). If the communication has been normally performed, then whether or not there is the electronic flash synchronization is transmitted by the DSC communication (S2264). Then, whether a communication error has been made is determined (S2266). If the DSC communication has been normally performed, the process goes to a three-second self processing (S2268). If the error is detected at any of the S2256, S2262 and S2266, the process goes to the "DSCEND2" of S2360 in FIG. 44 (S2258) to make the operation not possible. If the SM state is not the shooting 1 is at S2252, the process goes to S2268 to transmit the shooting information of the first shot just in case.

Figure 45:
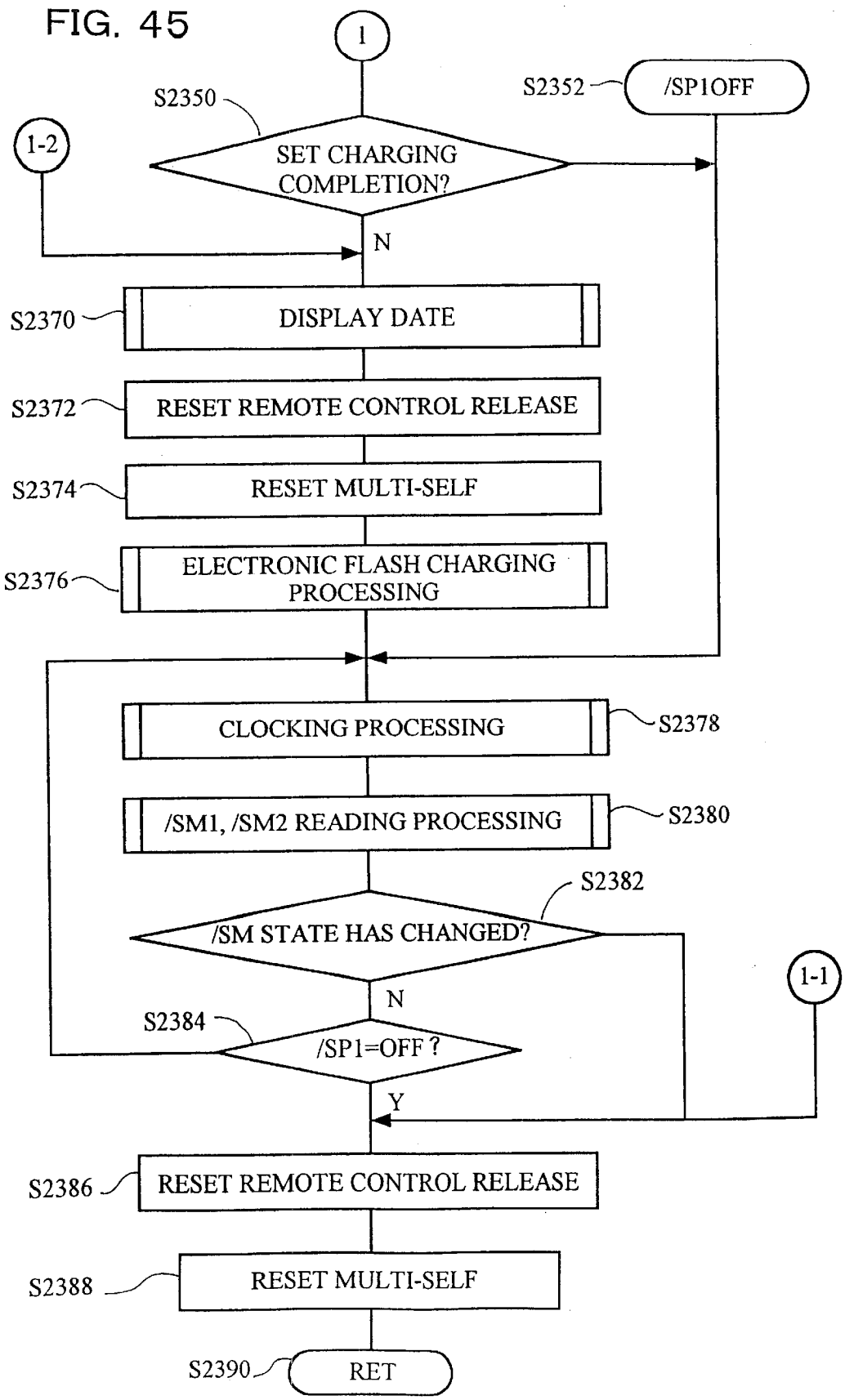
FIG. 45 is a flow chart showing the SHUTEND2 processing of the hybrid camera in FIG. 1.

FIGS. 44 and 45 are flow charts showing the SHUTEND2 processing.

If the SHUTEND2 processing in FIG. 44 is started (S2300), a date displaying processing is performed (S2302). If the APS displaying part 32 has displayed the ISO and the FILMTYPE, the display of them is stopped to display the date. The power supply OFF processing is performed (S2304), and then whether the self-cancellation has been performed is determined (S2306). If NO, the process goes to S2310 to determine whether the SM state is the shooting 1. If the SM state is the shooting 1, the AE lock cancellation is commanded (S2312) and whether an error has been made in the DSC communication is determined (S2314). If the DSC communication has been normally performed, the process goes to S2370 in FIG. 45. If a communication error is detected, the process goes to the "DSCEND2" of S2360 (S2316) to forcibly turn OFF the DSC. If the SM state is not the shooting 1 (NO determination) at S2310, the process goes to S2370 in FIG. 45.

If YES at S2306, the self-cancellation is reset (S2318) and then "/SM SELF-CANCELLATION" is determined (S2320). This is a determination whether the state of the mode switching dial 72 has changed. If YES, the /SM self-cancellation is reset (S2324) and then whether or not the SM state is the shooting 1(S2326). If the SM state is the shooting 1, the AE lock cancellation is commanded by the DSC communication (S2328). Then, the process goes to the remote control release resetting of S2386 in FIG. 45. After the multi-self resetting (S2388), the process goes to the main routine (S2390). If the SM state is not the shooting 1 at S2326, the process goes to the S2386 in stead of S2328.

If NO at S2320, the AE lock cancellation is transmitted (S2334) after determining whether the SM state is the shooting 1 at S2332. Then, whether the LCD display OFF has been set is determined (S2336). If the display is ON, the animation display start is commanded by the DSC communication (S2338). If NO at S2336, the process goes to S2340.

The self-mode is reset at S2340, and the electronic flash charging processing (S2342) and the clocking processing (S2344) are performed in order. Then, whether the /SM state has changed is determined (S2346). If the /SM state has changed, the process goes to S2386 in FIG. 45. If the /SM state has not changed, then whether or not the /SSELF is ON is determined (S2348). If YES, the process goes to S2344. If NO, then whether or not the charging completion has been set is determined (S2350 in FIG. 45). If the charging completion has been set, the process goes to the clocking processing of S2378. If the process has come from the "/SP1OFF" of S1808 in FIG. 29 to S2352, the process goes to S2378.

If NO at S2350, the date display processing (S2370), the remote control release resetting (S2372), the multi-self resetting (S2374) and the electronic flash charging processing (S2376) are performed in order. Then, the clocking processing is performed at S2378, and the /SM1, SM2 reading processing is performed (S2380). Then whether or not the SM state has changed is determined (S2382). If the SM state has changed, the process goes to the main routine (S2390) after the remote control release resetting (S2386) and the multi-self resetting (S2388).

On the other hand, if the SM state has not changed S2382, then whether or not the SP1 is OFF is determined (S2384). If NO, the process returns to S2378. If YES, the process goes to the main routine (S2390) after S2386 and S2388.

If the process has come from S1896 in FIG. 31 or the "DSCEND1" of S2208 in FIG. 42 to S2354 in FIG. 44, the power supply OFF is commanded by the DSC communication (S2356). After a 100 ms wait processing (S2358), the DSCVW is turned OFF (S2362). The DSC battery display turning on (S2364), the power supply OFF processing (S2366) and the self mode resetting (S2368) are performed in order. Then the process goes to S2370 in FIG. 45, and the process returns to the main routine after S2370–S2390.

Figure 35:
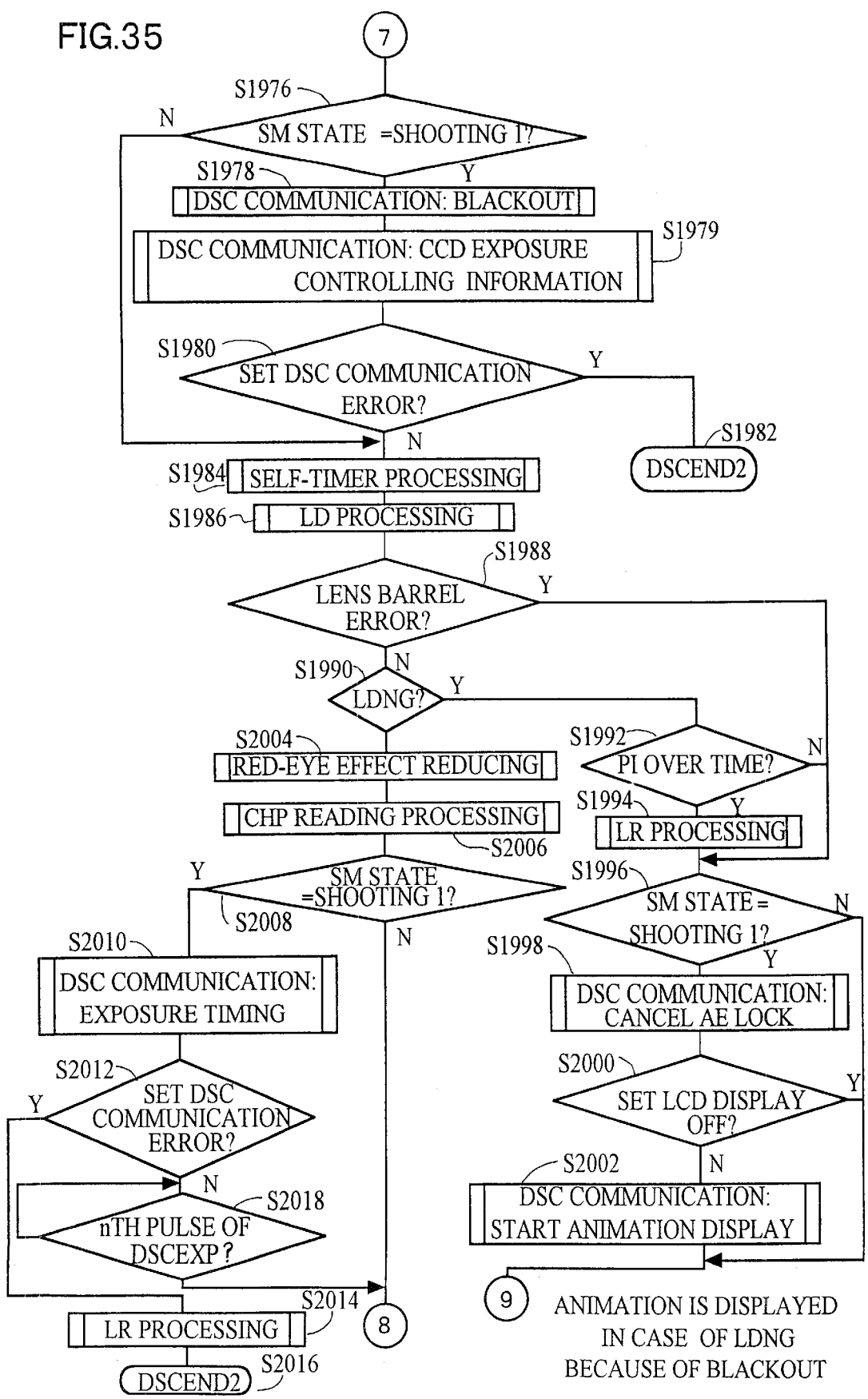
FIG. 35 is a flow chart showing the SPI switch processing of the hybrid camera in FIG. 1.

If the process has come from S1824, S1838 in FIG. 29, S1870 in FIG. 31, S1982, S2016 in FIG. 35, S2196, S2224 in FIG. 42 or the "DSCEND2" of S2258 in FIG. 43 to S2360 in FIG. 44, the process goes to the DSCVW=OFF processing, and then the process returns to the main routine after S2362–S2390.

FIGS. 46–61 are flow charts showing principal processings regarding to the shooting of the DSC by the DSC communication.

Figure 46:
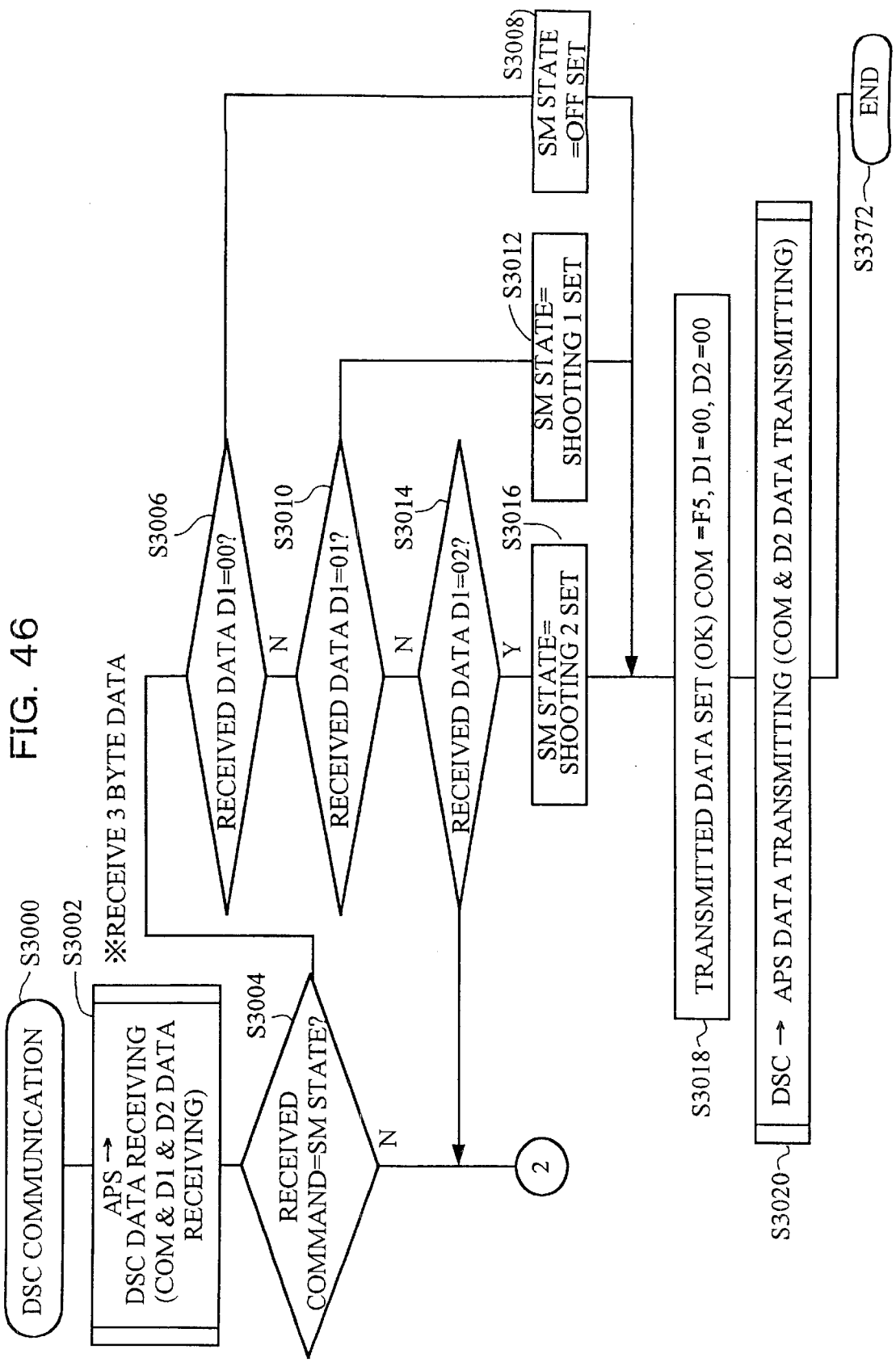
FIG. 46 is a flow chart showing a processing of a DSC by a DSC communication of the hybrid camera in FIG. 1.

The subroutine of the "DSC COMMUNICATION" of S3000 in FIG. 46 is a flow of the transmission and reception of communication commands and data information with respect to the DSCCPU 184.

At "APS→DSC DATA RECEIVING (COM & D1 & D2 DATA RECEIVING)" of S3002, the DSCCPU 184 receives a command (COM) and data (D1, D2) that have been transmitted from the APSCPU 150 and the DSCCPU 184 receives them in a communication buffer. The analysis of the data and transmission of reply data according to received data will be performed at the steps of the signal processing in the DSC.

At "RECEIVED COMMAND=SM STATE?" of S3004, whether the received command (COM) is a command indicating the setting of the mode switching dial 72 (SM state) is determined. If the command (COM) is the command indicating the SM state, "RECEIVED DATA D1=00?" of S3006 branches off. If the command (COM) is not the command indicating the SM state, "RECEIVED COMMAND=BATTERY CHECKING" of S3024.

At the "RECEIVED DATA D1=00?" of S3006, "RECEIVED DATA D1=01?" of S3010 and "RECEIVED DATA D1=02" of S3014, the data (D1) indicating the setting of the mode switching dial 72 is analyzed. If the received data is 00h, the process goes to "SM STATE=OFF SET" of S3008 to memorize that the setting of the mode switching dial 72 is OFF. If the received data is 01h, the process goes to "SM STATE=SHOOTING 1 SET" of S3012 to memorize that the setting of the mode switching dial 72 is the shooting 1. If the received data is 02h, the process goes to "SM STATE=SHOOTING 2 SET" of S3016 to memorize that the setting of the mode switching dial 72 is the shooting 2.

At "TRANSMITTED DATA SET (OK) COM=F5, D1=00, D2=00" of S3018, a responding command indicating that the DSCCPU 184 has normally performed a processing with respect to the transmitted command is set. At "DSC→APS DATA TRANSMITTING (COM & D2 DATA TRANSMITTING)" of S3020, the set data is transmitted to the APSCPU 150. The command (COM=F5) indicates that the processing has been normally finished. If the transmission of the data ends, the process goes to "END" of S3772 to end the "DSC COMMUNICATION" of S3000 of the subroutine.

Figure 47:
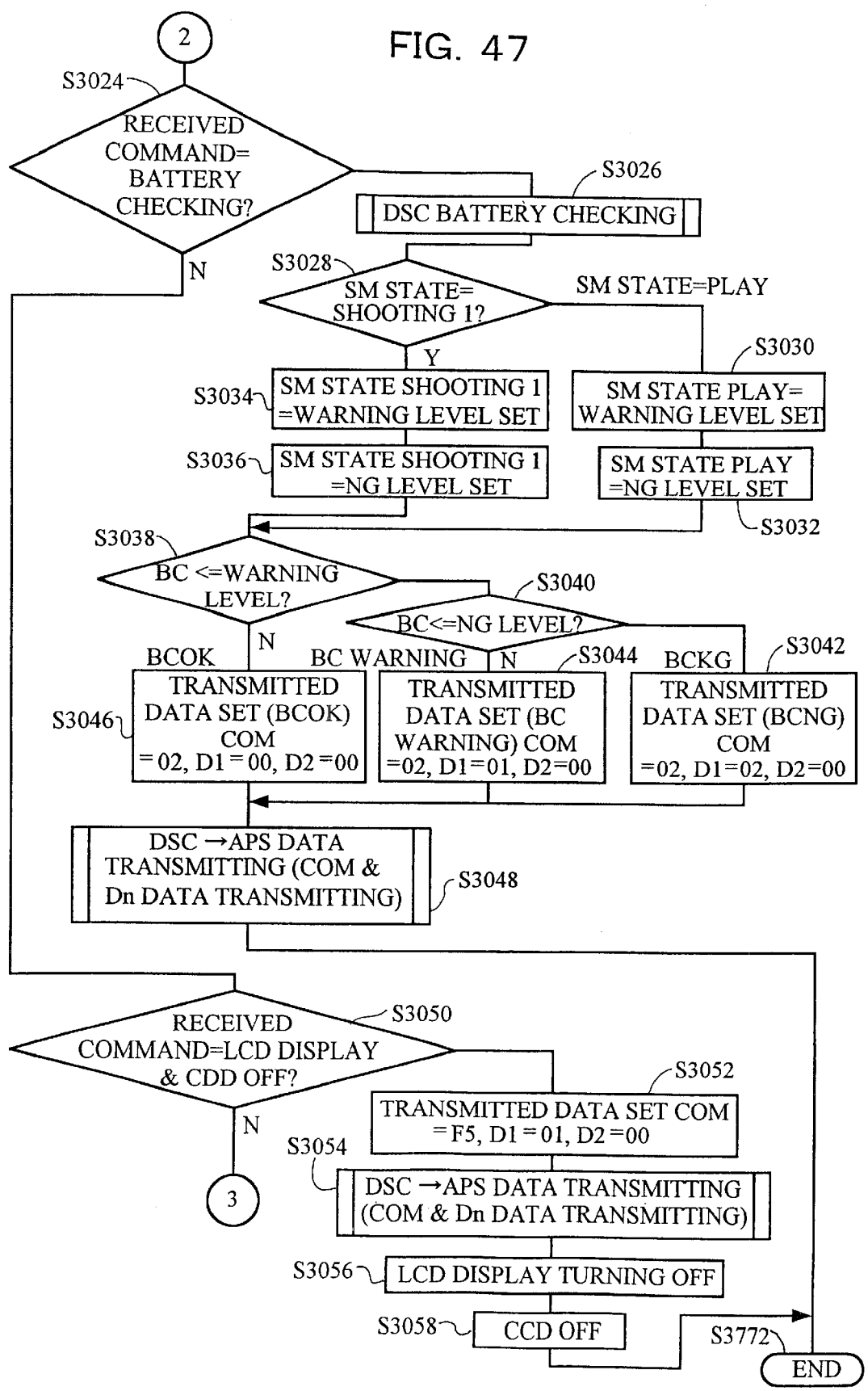
FIG. 47 is a flow chart showing the processing of the DSC by the DSC communication of the hybrid camera in FIG. 1.

At "RECEIVED COMMAND=BATTERY CHECKING" of S3024 in FIG. 47, whether the received command (COM) is a command of the battery checking is determined. If the command (COM) is the command of the battery checking, "DSC BATTERY CHECKING" of S3026 branches off. If the command (COM) is the command of the battery checking, the process goes to "RECEIVED COMMAND= LCD DISPLAY & CCD OFF" of S3050.

At the "DSC BATTERY CHECKING" of S3026, the residual amount of the DSC battery 86 is measured. A "WARNING LEVEL" and a "NG LEVEL" of the battery will be set according to the residual amount of the battery, and whether the residual amount of the battery is the "WARNING LEVEL" or less and whether it is the "NG LEVEL" or less will be determined in each mode.

At "SM STATE=SHOOTING 1?" of S3028, whether the setting of the mode switching dial 72 is the "SHOOTING 1" is determined. If the setting of the mode switching dial 72 is not the "SHOOTING 1", it is the "PLAY". Thus, the process goes to "SM STATE PLAY=WARNING LEVEL SET" of S3030 to set the "WARNING LEVEL" in the "PLAY" mode, and the process goes to "SM STATE PLAY=NG LEVEL SET" of S3032 to set the "NG LEVEL".

If the setting of the mode switching dial 72 is the "SHOOTING 1", the process goes to "SM STATE SHOOTING 1=WARNING LEVEL SET" of S3034 to set the "WARNING LEVEL" in the "SHOOTING 1" mode, and the process goes to "SM STATE SHOOTING 1=NG LEVEL SET" of S3036 to set the "NG LEVEL".

At "BC<=WARNING LEVEL?" of S3038, whether the measured residual amount of the battery is the set "WARNING LEVEL" or less is determined. If the residual amount is the "WARNING LEVEL" or less, the process goes to "BC<=NG LEVEL?" of S3040. If the residual amount is more than the "WARNING LEVEL", the process goes to "TRANSMITTED DATA SET (BCOK) COM=02, D1=00, D2=00" of S3046 to set a reply command (COM=02) for the APSCPU 150 and data (D1=00) that indicates that the residual amount is more than the "WARNING LEVEL" and the "NG LEVEL". The reply command (COM=02) and the data are transmitted at "DSC→APS DATA TRANSMITTING (COM & Dn DATA TRANSMITTING)" of S3048. The data (D2=00) that will be transmitted next is the data to make the transmitted command of 3 bytes, and it does not have any meanings.

At "BC<=NG LEVEL?" of S3040, whether the measured residual amount of the battery is the set "NG LEVEL" or less is determined. If the residual amount is the "NG LEVEL" or less, the process goes to "TRANSMITTED DATA SET (BCNG) COM=02, D1=02, D2=00" of S3042 to set the reply command (COM=02) for the APSCPU 150 and data (D1=02 and D2=00) that indicates that the residual amount is the "WARNING LEVEL" or less and is the "NG LEVEL" or less. The reply command (COM=02) and the data are transmitted at "DSC→APS DATA TRANSMITTING (COM & Dn DATA TRANSMITTING)" of S3048.

If the residual amount of the battery is more than the "NG LEVEL" at S3040, the process goes to "TRANSMITTED DATA SET (BC WARNING) COM=02, D1=01, D2=00" of S3044 to set the reply command (COM=02) for the APSCPU 150 and data (D1=01 and D2=00) that indicates that the residual amount is the "WARNING LEVEL" or less and is more than the "NG LEVEL". The reply command (COM=02) and the data are transmitted at "DSC→APS DATA TRANSMITTING (COM & Dn DATA TRANSMITTING)" of S3048.

If the transmission of the data has been finished, the process goes to "END" of S3772 to end the "DSC COMMUNICATION" of S3000 of the subroutine.

At the "RECEIVED COMMAND=LCD DISPLAY & CCD OFF" of S3050, whether the received command (COM) is a command for ending the display of the liquid crystal monitor 40 of the DSC is determined. If the command (COM) is "LCD DISPLAY & CCD OFF", the process goes to "TRANSMITTED DATA SET COM=F5, D1=01, D2=00" of S3052. If the command (COM) is not the "LCD DISPLAY & CCD OFF", the process goes to "TRANSMITTED DATA=LCD DISPLAY ON/OFF?" of S3060 in FIG. 48.

At the "TRANSMITTED DATA SET COM=F5, D1=01, D2=00" of S3052, a responding command (COM=F5) indicating that the DSCCPU 184 has normally received the transmitted command is set. At "DSC→APS DATA TRANSMITTING (COM & Dn DATA TRANSMITTING)" of S3054, the set data is transmitted to the APSCPU 150.

At "LCD DISPLAY TURNING OFF" of S3056, the backlight of the liquid crystal monitor 40 is turned OFF according to the received data and the operation of the LCD displaying part 190 is stopped.

At "CCD OFF" at S3058, a command for stopping the operation of the CCD circuit part 188 is outputted to the CCD circuit part 188. Since the backlight of the liquid crystal monitor 40, the LCD displaying part 190 and the CCD circuit part 188 consume a large deal of electricity, the operation of the CCD circuit part 188 is stopped to reduce the consumption of electricity in the DSC.

If the transmission of the data has been finished, the process goes to "END" of S3772 to end the "DSC COMMUNICATION" of S3000 of the subroutine.

Figure 48:
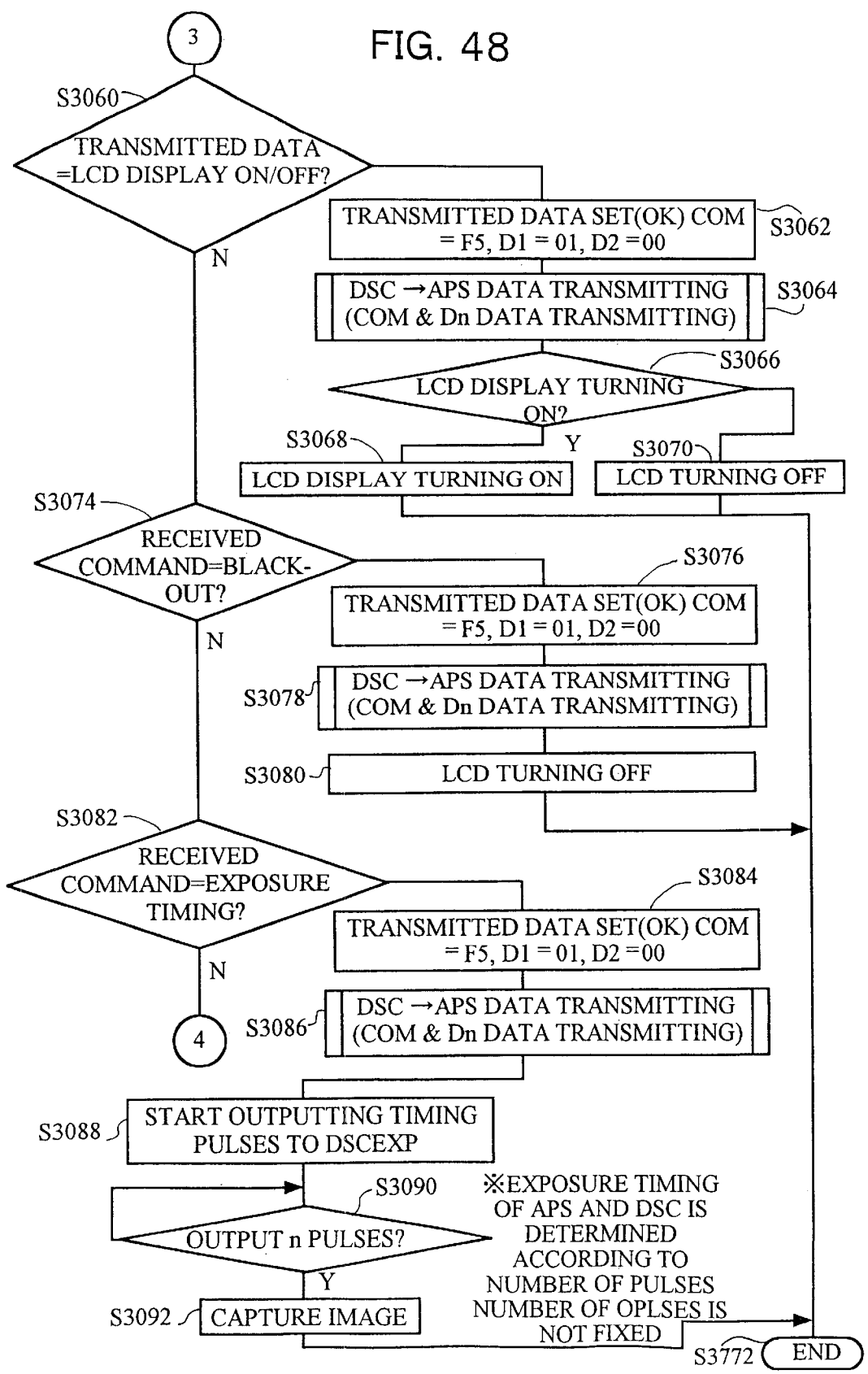
FIG. 48 is a flow chart showing the processing of the DSC by the DSC communication of the hybrid camera in FIG. 1.

At the "TRANSMITTED DATA=LCD DISPLAY ON/OFF?" of S3060 in FIG. 48, whether the received command (COM) is a command for turning ON/OFF the display of the liquid crystal monitor 40 of the DSC is determined. If the command (COM) is "LCD DISPLAY ON/OFF", the process goes to "TRANSMITTED DATA SET (OK) COM=F5, D1=00, D2=00" of S3062. If the command (COM) is not the "LCD DISPLAY ON/OFF", the process goes to "RECEIVED COMMAND= BLACKOUT?" of S3074.

At the "TRANSMITTED DATA SET (OK) COM=F5, D1=00, D2=00" of S3062, the responding command (COM=F5) indicating that the DSCCPU 184 has normally received the transmitted command is set. At "DSC→APS DATA TRANSMITTING (COM & Dn DATA TRANSMITTING)" of S3064, the set data is transmitted to the APSCPU 150.

At "LCD DISPLAY TURNING ON?" of S3066, whether the received data is "LCD TURNING ON" is determined. If the received data is the "LCD TURNING ON", the process goes to "LCD DISPLAY TURNING ON" of S3068 to turn ON the backlight of the liquid crystal monitor 40 and output a command for operating the LCD displaying part 190 to the LCD displaying part 190.

If the received data is not the "LCD TURNING ON", "LCD TURNING OFF" of S3070 branches off, and the DSCCPU 184 outputs a command for stopping the LCD display to the LCD displaying part 190.

After the command is outputted to the LCD displaying part 190, the process goes to "END" of S3772 to end the "DSC COMMUNICATION" of S3000 of the subroutine.

At the "RECEIVED COMMAND=BLACKOUT?" of S3074, whether the received command (COM) is a command for turning OFF the backlight of the liquid crystal monitor 40 of the DSC is determined. If the command (COM) is "BLACKOUT", the process goes to "TRANSMITTED DATA SET (OK) COM=F5, D1=00, D2=00" of S3076. If the command (COM) is not the "BLACKOUT", the process goes to "RECEIVED COMMAND= EXPOSURE TIMING?" of S3082.

At the "TRANSMITTED DATA SET (OK) COM=F5, D1=00, D2=00" of S3076, the responding command (COM=F5) indicating that the DSCCPU 184 has normally received the transmitted command is set. At "DSC→APS DATA TRANSMITTING (COM & Dn DATA TRANSMITTING)" of S3078, the set data is transmitted to the APSCPU 150.

At "LCD TURNING OFF" of S3080, the DSCCPU 184 outputs a command for turning OFF the backlight of the liquid crystal monitor 40 and a command for stopping the operation of the LCD display to the LCD displaying part 190.

After the commands are outputted to the LCD displaying part 190, the process goes to "END" of S3772 to end the "DSC COMMUNICATION" of S3000 of the subroutine.

At the "RECEIVED COMMAND=EXPOSURE TIMING?" of S3082, whether the received command (COM) is "EXPOSURE TIMING" is determined. If the command (COM) is the "EXPOSURE TIMING", the process goes to "TRANSMITTED DATA SET (OK) COM=F5, D1=00, D2=00" of S3084. If the command (COM) is not the "EXPOSURE TIMING", the process goes to "RECEIVED COMMAND=AE LOCK?" of S3094.

At the "TRANSMITTED DATA SET (OK) COM=F5, D1=00, D2=00" of S3084, the responding command (COM=F5) indicating that the DSCCPU 184 has normally received the transmitted command is set. At "DSC→APS DATA TRANSMITTING (COM & Dn DATA TRANSMITTING)" of S3086, the set data is transmitted to the APSCPU 150.

At "START OUTPUTTING TIMING PULSES TO DSCEXP" of S3088, timing pulses corresponding to scanning lines for starting the shooting of the DSC is outputted to the APSCPU 150.

At "OUTPUT n PULSES?" of S3090, timing pulses are outputted according to the scanning lines of the DSC.

The APS and the DSC capture the images at one time according to the edge of the predetermined timing pulse. When there is no electronic flash synchronization, there is a time lag for one vertical synchronizing signal between the image-capturing by the DSC and the shutter operation of the APS. At "CAPTURE IMAGE" of S3092, the image of the DSC is captured. At this time, the aperture and the gain are set according to the data about CCDAV, CCDG, CCDR and CCDB communicated from the APS as explained at S1979 in FIG. 35, and the image is captured under the setting.

At the image-capturing processing, the CCD exposure controlling conditions sent from the APS have priority, thus the state at the AE lock is temporarily corrected. After the image-capturing, the conditions at the AE lock become effective again to wait for the command for the AE lock cancellation to be received. Thus, the conditions of the animation displaying are kept before and after the blackout.

After the image-capturing, the process goes to "END" of S3772 to end the "DSC COMMUNICATION" of S3000 of the subroutine.

Figure 49:
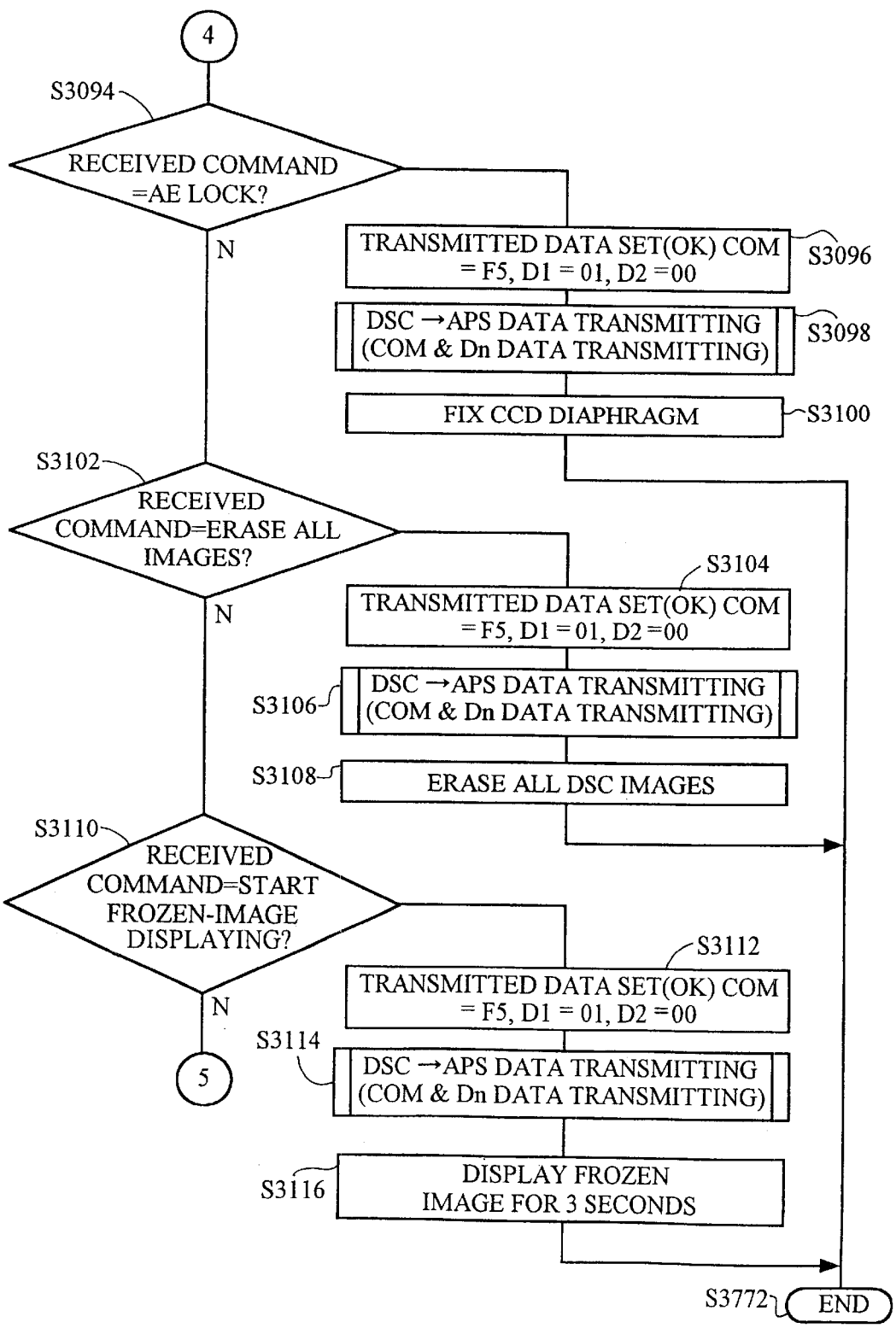
FIG. 49 is a flow chart showing the processing of the DSC by the DSC communication of the hybrid camera in FIG. 1.

At the "RECEIVED COMMAND=AE LOCK?" of S3094 in FIG. 49, whether the received command (COM) is "AE LOCK" is determined. If the command (COM) is the "AE LOCK", the process goes to "TRANSMITTED DATA SET (OK) COM=F5, D1=00, D2=00" of S3096. If the command (COM) is not the "AE LOCK", the process goes to "RECEIVED COMMAND=ERASE ALL IMAGES?" of S3102.

At the "TRANSMITTED DATA SET (OK) COM=F5, D1=00, D2=00" of S3096, the responding command (COM=F5) indicating that the DSCCPU 184 has normally received the transmitted command is set. At "DSC→APS DATA TRANSMITTING (COM & Dn DATA TRANSMITTING)" of S3098, the set data is transmitted to the APSCPU 150.

At "FIX CCD DIAPHRAGM" of S3100, a command for fixing the aperture setting is outputted to the CCD circuit part 188 not to change the exposure at the DSC shooting.

After the command is outputted to the CCD circuit part 188, the process goes to "END" of S3772 to end the "DSC COMMUNICATION" of S3000 of the subroutine.

At the "RECEIVED COMMAND=ERASE ALL IMAGES?" of S3102, whether the received command (COM) is "ERASE ALL IMAGES" is determined. If the command (COM) is the "ERASE ALL IMAGES", the process goes to "TRANSMITTED DATA SET (OK) COM= F5, D1=00, D2=00" of S3104. If the command (COM) is not the "ERASE ALL IMAGES", the process goes to "RECEIVED COMMAND=START FROZEN-IMAGE DISPLAYING?" of S3110.

At the "TRANSMITTED DATA SET (OK) COM=F5, D1=00, D2=00" of S3104, the responding command (COM=F5) indicating that the DSCCPU 184 has normally received the transmitted command is set. At "DSC→APS DATA TRANSMITTING (COM & Dn DATA TRANSMITTING)" of S3106, the set data is transmitted to the APSCPU 150.

At "ERASE ALL DSC IMAGES" of S3108, the DSCCPU 184 commands the FLASH ROM 192 to erase all the stored image.

After the command is outputted to the FLASH ROM 192, the process goes to "END" of S3772 to end the "DSC COMMUNICATION" of S3000 of the subroutine.

At the "RECEIVED COMMAND=START FROZEN IMAGE DISPLAYING?" of S3110, whether the received command (COM) is "START FROZEN IMAGE DISPLAYING" is determined. If the command (COM) is the "START FROZEN IMAGE DISPLAYING", the process goes to "TRANSMITTED DATA SET (OK) COM=F5, D1=00, D2=00" of S3112. If the command (COM) is not the "START FROZEN IMAGE DISPLAYING", the process goes to "RECEIVED COMMAND=START ANIMATION DISPLAYING?" of S3126 in FIG. 50.

At the "TRANSMITTED DATA SET (OK) COM=F5, D1=00, D2=00" of S3112, the responding command (COM=F5) indicating that the DSCCPU 184 has normally received the transmitted command is set. At "DSC→APS DATA TRANSMITTING (COM & Dn DATA TRANSMITTING)" of S3114, the set data is transmitted to the APSCPU 150.

At "DISPLAY FROZEN IMAGE FOR 3 SECONDS" of S3116, the DSCCPU 184 commands the LCD displaying part 190 to display the shot image on the liquid crystal monitor 40 for three seconds.

After the command for displaying the frozen image for three seconds is outputted to the LCD displaying part 190, the process goes to "END" of S3772 to end the "DSC COMMUNICATION" of S3000 of the subroutine.

Figure 50:
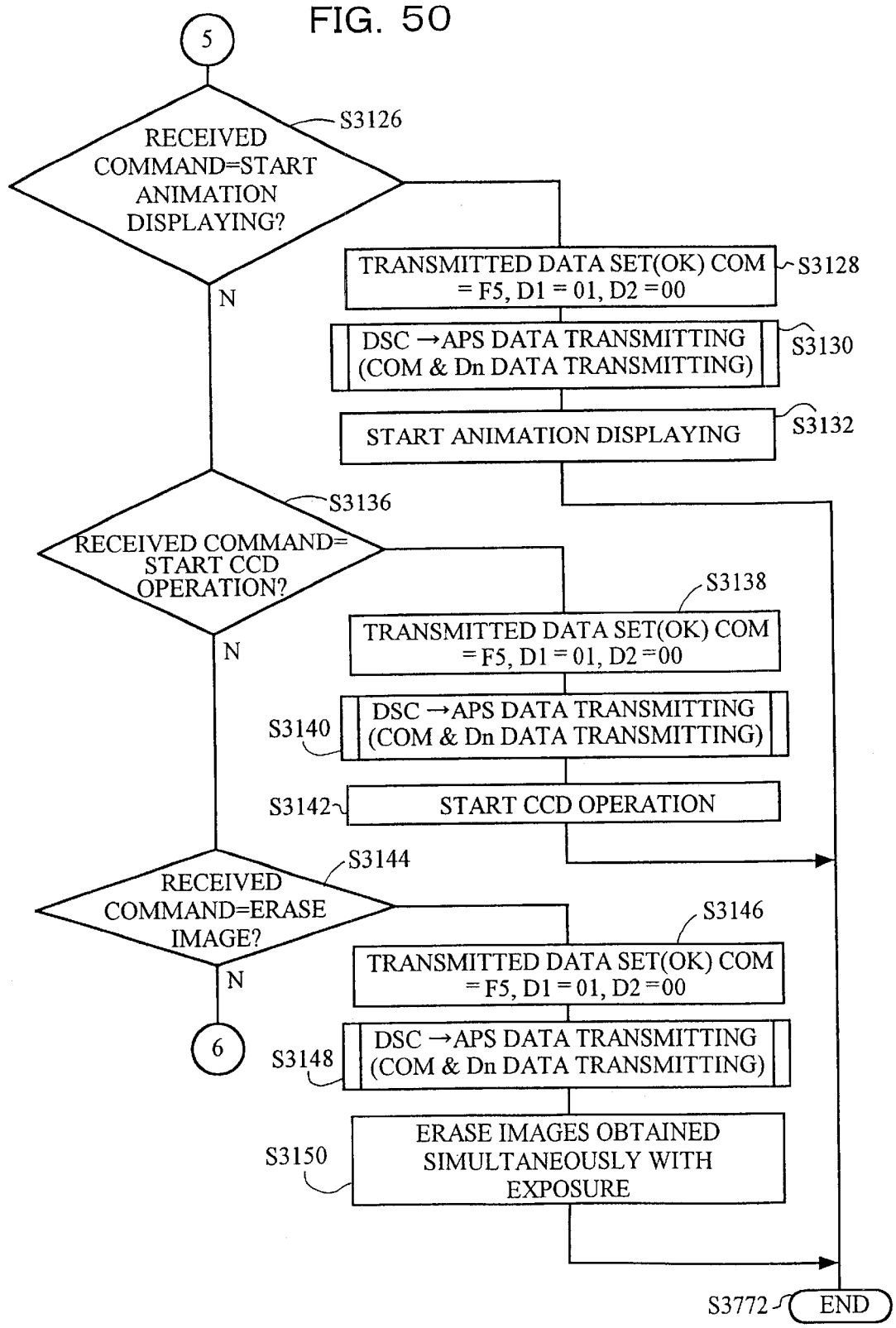
FIG. 50 is a flow chart showing the processing of the DSC by the DSC communication of the hybrid camera in FIG. 1.
Figure 51:
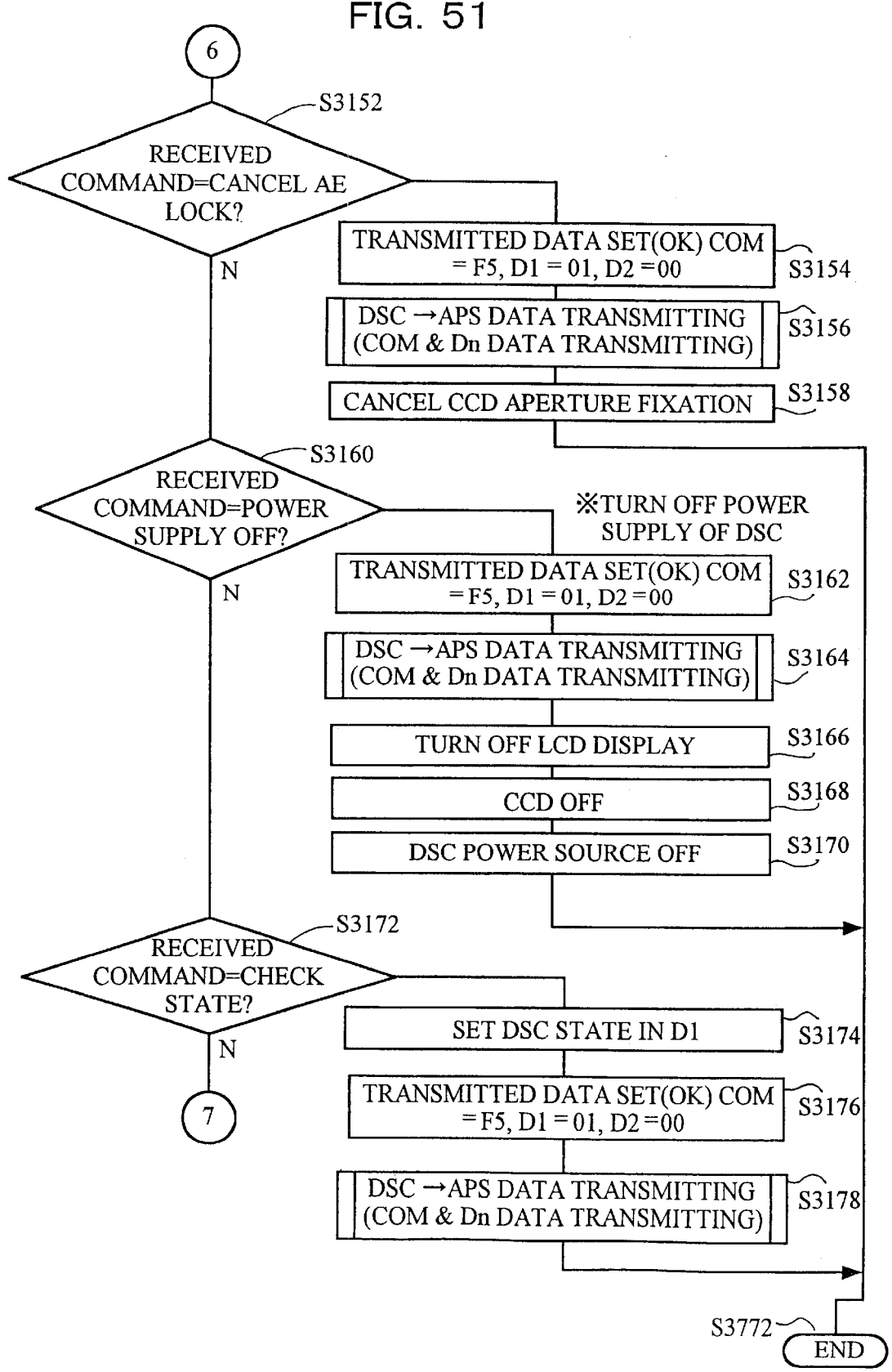
FIG. 51 is a flow chart showing the processing of the DSC by the DSC communication of the hybrid camera in FIG. 1.

At the "RECEIVED COMMAND=START ANIMATION DISPLAYING?" of S3126 in FIG. 50, whether the received command (COM) is "START ANIMATION DISPLAYING" is determined. If the command (COM) is the "START ANIMATION DISPLAYING", the process goes to "TRANSMITTED DATA SET (OK) COM=F5, D1=00, D2=00" of S3128. If the command (COM) is not the "START ANIMATION DISPLAYING", the process goes to "RECEIVED COMMAND=START CCD OPERATION?" of S3136.

At the "TRANSMITTED DATA SET (OK) COM=F5, D1=00, D2=00" of S3128, the responding command (COM=F5) indicating that the DSCCPU 184 has normally received the transmitted command is set. At "DSC→APS DATA TRANSMITTING (COM & Dn DATA TRANSMITTING)" of S3130, the set data is transmitted to the APSCPU 150.

At "START ANIMATION DISPLAYING" of S3132, the DSCCPU 184 outputs a command for continuously capturing the animation to the CCD circuit part 188 and outputs a command for continuously displaying the animation which is being shot on the liquid crystal monitor 40 to the LCD displaying part 190.

After the commands are outputted to the CCD circuit part 188 and the LCD displaying part 190, the process goes to the "END" of S3772 to end the "DSC COMMUNICATION" of S3000 of the subroutine.

At the "RECEIVED COMMAND=START CCD OPERATION?" of S3136, whether the received command (COM) is "START CCD OPERATION" is determined. If the command (COM) is the "START CCD OPERATION", the process goes to "TRANSMITTED DATA SET (OK) COM=F5, D1=00, D2=00" of S3138. If the command (COM) is not the "START CCD OPERATION", the process goes to "RECEIVED COMMAND=ERASE IMAGE?" of S3144.

At the "TRANSMITTED DATA SET (OK) COM=F5, D1=00, D2=00" of S3138, the responding command (COM=F5) indicating that the DSCCPU 184 has normally received the transmitted command is set. At "DSC→APS DATA TRANSMITTING (COM & Dn DATA TRANSMITTING)" of S3140, the set data is transmitted to the APSCPU 150.

At "START CCD OPERATION" of S3142, the DSCCPU 184 outputs a command for continuously capturing the animation to the CCD circuit part 188.

After the command is outputted to the CCD circuit part 188, the process goes to the "END" of S3772 to end the "DSC COMMUNICATION" of S3000 of the subroutine.

At the "RECEIVED COMMAND=ERASE IMAGE?" of S3144, whether the received command (COM) is "ERASE IMAGE" is determined. If the command (COM) is the "ERASE IMAGE", the process goes to "TRANSMITTED DATA SET (OK) COM=F5, D1=00, D2=00" of S3146. If the command (COM) is not the "ERASE IMAGE", the process goes to "RECEIVED COMMAND=CANCEL AE LOCK?" of S3152 in FIG. 51.

At the "TRANSMITTED DATA SET (OK) COM=F5, D1=00, D2=00" of S3146, the responding command (COM=F5) indicating that the DSCCPU 184 has normally received the transmitted command is set. At "DSC→APS DATA TRANSMITTING (COM & Dn DATA TRANSMITTING)" of S3148, the set data is transmitted to the APSCPU 150.

At "ERASE IMAGES OBTAINED SIMULTANEOUSLY WITH EXPOSURE" of S3150, the DSCCPU 184 erases only the shot images. Then, the process goes to the "END" of S3772 to end the "DSC COMMUNICATION" of S3000 of the subroutine.

At the "RECEIVED COMMAND=CANCEL AE LOCK?" of S3152, whether the received command (COM) is "CANCEL AE LOCK" is determined. If the command (COM) is the "CANCEL AE LOCK", the process goes to "TRANSMITTED DATA SET (OK) COM=F5, D1=00, D2=00" of S3154. If the command (COM) is not the "CANCEL AE LOCK", the process goes to "RECEIVED COMMAND=POWER SUPPLY OFF?" of S3160 in FIG. 51.

At the "TRANSMITTED DATA SET (OK) COM=F5, D1=00, D2=00" of S3154, the responding command (COM=F5) indicating that the DSCCPU 184 has normally received the transmitted command is set. At "DSC→APS DATA TRANSMITTING (COM & Dn DATA TRANSMITTING)" of S3156, the set data is transmitted to the APSCPU 150.

At "CANCEL CCD APERTURE FIXATION" of S3158, the DSCCPU 184 outputs a command for canceling the aperture fixation set at the "FIX CCD DIAPHRAGM" of S3100 to the CCD circuit part 188.

After the command is outputted to the CCD circuit part 188, the process goes to the "END" of S3772 to end the "DSC COMMUNICATION" of S3000 of the subroutine.

At the "RECEIVED COMMAND=POWER SUPPLY OFF?" of S3160, whether the received command (COM) is "POWER SUPPLY OFF" is determined. If the command (COM) is the "POWER SUPPLY OFF", the process goes to "TRANSMITTED DATA SET (OK) COM=F5, D1=00, D2=00" of S3162. If the command (COM) is not the "POWER SUPPLY OFF", the process goes to "RECEIVED COMMAND=CHECK STATE?" of S3172.

At the "TRANSMITTED DATA SET (OK) COM=F5, D1=00, D2=00" of S3162, the responding command (COM=F5) indicating that the DSCCPU 184 has normally received the transmitted command is set. At "DSC→APS DATA TRANSMITTING (COM & Dn DATA TRANSMITTING)" of S3164, the set data is transmitted to the APSCPU 150.

At "TURN OFF LCD DISPLAY" of S3166, the DSCCPU 184 outputs a command for turning off the backlight of the liquid crystal monitor 40 and a command for stopping the operation of the LCD display to the LCD displaying part 190.

At "CCD OFF" of S3168, a command for stopping the operation of the CCD circuit part 188 is outputted to the CCD circuit part 188.

After the power supply of the DSC is shut off at "DSC POWER SOURCE OFF" of S3170, the process goes to the "END" of S3772 to end the "DSC COMMUNICATION" of S3000 of the subroutine.

At the "RECEIVED COMMAND=CHECK STATE?" of S3172, whether the received command (COM) is "CHECK STATE" is determined. If the command (COM) is the "CHECK STATE", the process goes to "SET DSC STATE IN D1" of S3174. If the command (COM) is not the "CHECK STATE", the process goes to "RECEIVED COMMAND=FEED ONE FRAME?" of S3180.

At the "SET DSC STATE IN D1" of S3174, the present state of the DSC is set in the data (D1).

Then, the process goes to "TRANSMITTED DATA SET (OK) COM=0F, D1=nn, D2=00" of S3176, where the DSCCPU 184 sets responding data to the transmitted command of the state checking in the data (D1=nn).

At "DSC→APS DATA TRANSMITTING (COM & Dn DATA TRANSMITTING)" of S3178, the set data is transmitted to the APSCPU 150. After that, the process goes to the "END" of S3772 to end the "DSC COMMUNICATION" of S3000 of the subroutine.

Figure 52:
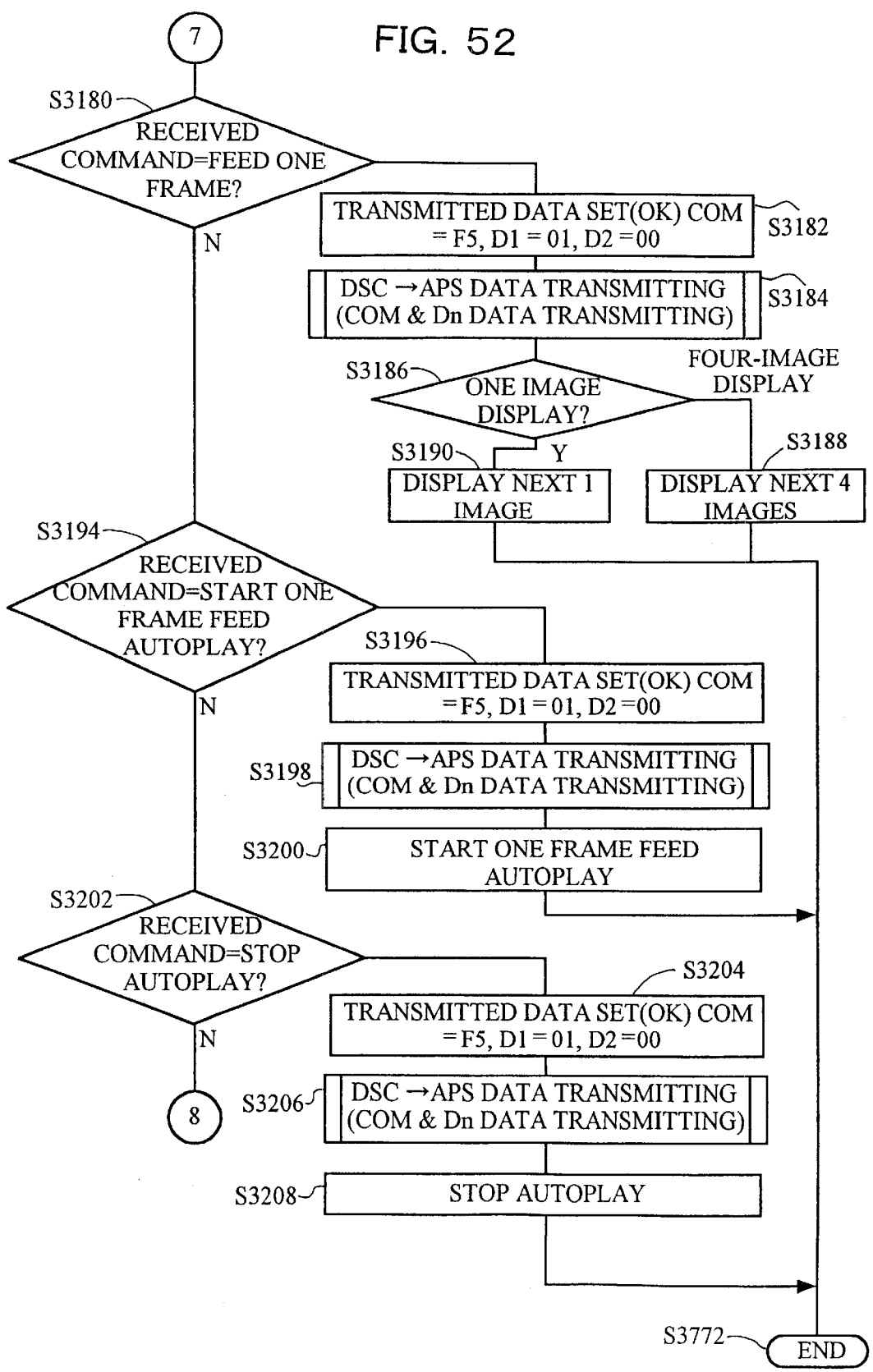
FIG. 52 is a flow chart showing the processing of the DSC by the DSC communication of the hybrid camera in FIG. 1.

At the "RECEIVED COMMAND=FEED ONE FRAME?" of S3180 in FIG. 52, whether the received command (COM) is "FEED ONE FRAME" is determined. If the command (COM) is the "FEED ONE FRAME", the process goes to "TRANSMITTED DATA SET (OK) COM=F5, D1=00, D2=00" of S3182. If the command (COM) is not the "FEED ONE FRAME", the process goes to "RECEIVED COMMAND=START ONE FRAME FEED AUTOPLAY?" of S3194.

Conditions for commanding the "FEED ONE FRAME" are that the setting of the mode switching dial 72 is the "PLAY" and that the lower right switch 56 of the multi-function switches 52 is pressed (the /SUP becomes effective).

At the "TRANSMITTED DATA SET (OK) COM=F5, D1=00, D2=00" of S3182, the responding command (COM=F5) indicating that the DSCCPU 184 has normally received the transmitted command is set. At "DSC→APS DATA TRANSMITTING (COM & Dn DATA TRANSMITTING)" of S3184, the set data is transmitted to the APSCPU 150.

At "ONE IMAGE DISPLAY?" of S3186, whether one image is displayed is determined. If NO, four images are displayed. Thus, the process goes to "DISPLAY NEXT 4 IMAGES" at S3188 to display the next four images.

If one image is displayed, the process goes to "DISPLAY NEXT 1 IMAGE" at S3190 to display the next one image.

After the next four images or one image is displayed, the process goes to the "END" of S3772 to end the "DSC COMMUNICATION" of S3000 of the subroutine.

At the "RECEIVED COMMAND=START ONE FRAME FEED AUTOPLAY?" of S3194, whether the received command (COM) is "START ONE FRAME FEED AUTOPLAY" is determined. If the command (COM) is the "START ONE FRAME FEED AUTOPLAY", the process goes to "TRANSMITTED DATA SET (OK) COM=F5, D1=00, D2=00" of S3196. If the command (COM) is not the "START ONE FRAME FEED AUTOPLAY", the process goes to "RECEIVED COMMAND=STOP AUTOPLAY?" of S3202. Conditions for commanding the "START ONE FRAME FEED AUTOPLAY" are that the setting of the mode switching dial 72 is the "PLAY" and that the lower right switch 56 of the multi-function switches 52 is pressed (the /SUP becomes effective).

At the "TRANSMITTED DATA SET (OK) COM=F5, D1=00, D2=00" of S3196, the responding command (COM=F5) indicating that the DSCCPU 184 has normally received the transmitted command is set. At "DSC→APS DATA TRANSMITTING (COM & Dn DATA TRANSMITTING)" of S3198, the set data is transmitted to the APSCPU 150.

At "START ONE FRAME FEED AUTOPLAY" of S3200, the frames are continuously fed if the setting of the mode switching dial 72 is the "PLAY" and the lower; right switch 56 of the multi-function switches 52 is continuously pressed.

After the frame-feeding is set, the process goes to the "END" of S3772 to end the "DSC COMMUNICATION" of S3000 of the subroutine.

At the "RECEIVED COMMAND=STOP AUTOPLAY?" of S3202, whether the received command (COM) is "STOP AUTOPLAY" is determined. If the command (COM) is the "STOP AUTOPLAY", the process goes to "TRANSMITTED DATA SET (OK) COM=F5, D1=00, D2=00" of S3204. If the command (COM) is not the "STOP AUTOPLAY", the process goes to "RECEIVED COMMAND=BACK ONE FRAME?" of S3210. Conditions for commanding the "STOP AUTOPLAY" are that the setting of the mode switching dial 72 is the "PLAY" and that the lower right switch 56 of the multi-function switches 52 is pressed after the ONE FRAME FEED AUTOPLAY is started or the lower left switch 60 of the multi-function switches 52 is pressed after laterdescribed ONE FRAME BACK AUTOPLAY is started.

At the "TRANSMITTED DATA SET (OK) COM=F5, D1=00, D2=00" of S3204, the responding command (COM=F5) indicating that the DSCCPU 184 has normally received the transmitted command is set. At "DSC→APS DATA TRANSMITTING (COM & Dn DATA TRANSMITTING)" of S3206, the set data is transmitted to the APSCPU 150.

At "STOP AUTOPLAY" of S3208, the frame-feeding or the frame-backing is stopped.

After the frame-feeding or the frame-backing is set, the process goes to the "END" of S3772 to end the "DSC COMMUNICATION" of S3000 of the subroutine.

Figure 53:
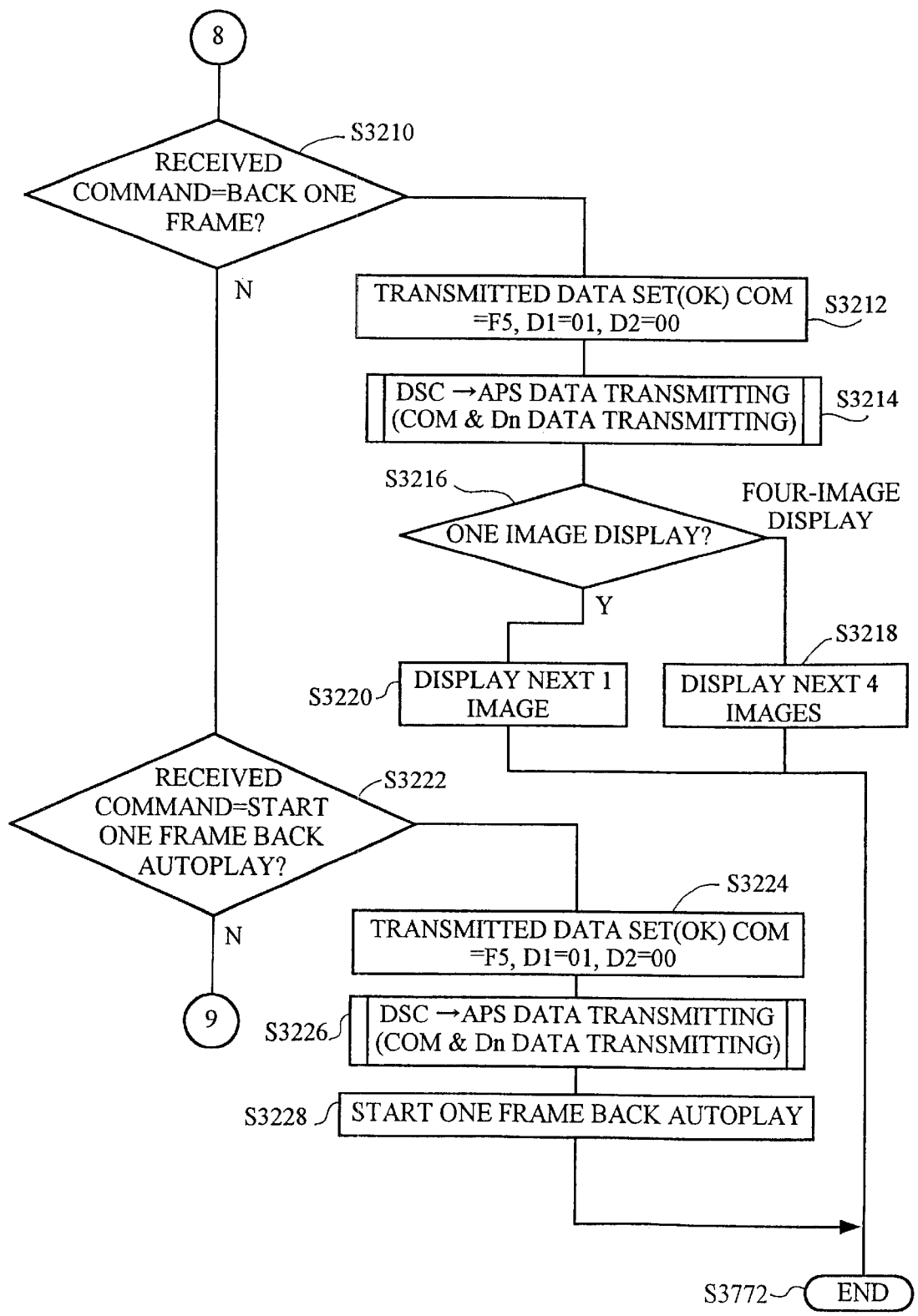
FIG. 53 is a flow chart showing the processing of the DSC by the DSC communication of the hybrid camera in FIG. 1.

At the "RECEIVED COMMAND=BACK ONE FRAME?" of S3210 in FIG. 53, whether the received command (COM) is "BACK ONE FRAME" is determined. If the command (COM) is the "BACK ONE FRAME", the process goes to "TRANSMITTED DATA SET (OK) COM=F5, D1=00, D2=00" of S3212. If the command (COM) is not the "BACK ONE FRAME", the process goes to "RECEIVED COMMAND=START ONE FRAME BACK AUTOPLAY?" of S3222. Conditions for commanding the "BACK ONE FRAME" are that the setting of the mode switching dial 72 is the "PLAY" and that the lower left switch 60 of the multi-function switches 52 is pressed (the /SDOWN becomes effective).

At the "TRANSMITTED DATA SET (OK) COM=F5, D1=00, D2=00" of S3212, the responding command (COM=F5) indicating that the DSCCPU 184 has normally received the transmitted command is set. At "DSC→APS DATA TRANSMITTING (COM & Dn DATA TRANSMITTING)" of S3214, the set data is transmitted to the APSCPU 150.

At "ONE IMAGE DISPLAY?" of S3216, whether one image is displayed is determined. If NO, four images are displayed. Thus, the process goes to "DISPLAY NEXT 4 IMAGES" at S3218 to display the next four images.

If one image is displayed, the process goes to "DISPLAY NEXT 1 IMAGE" at S3220 to display the next one image.

After the next four images or one image is displayed, the process goes to the "END" of S3772 to end the "DSC COMMUNICATION" of S3000 of the subroutine.

At the "RECEIVED COMMAND=START ONE FRAME BACK AUTOPLAY?" of S3194, whether the received command (COM) is "START ONE FRAME BACK AUTOPLAY" is determined. If the command (COM) is the "START ONE FRAME BACK AUTOPLAY", the process goes to "TRANSMITTED DATA SET (OK) COM=F5, D1=00, D2=00" of S3224. If the command (COM) is not the "START ONE FRAME BACK AUTOPLAY", the process goes to "RECEIVED COMMAND=START & STOP IMAGE OUTPUT OPERATION?" of S3230 in FIG. 56. Conditions for commanding the "START ONE FRAME BACK AUTOPLAY" are that the setting of the mode switching dial 72 is the "PLAY" and that the lower left switch 60 of the multi-function switches 52 is pressed (the /SDOWN becomes effective).

At the "TRANSMITTED DATA SET (OK) COM=F5, D1=00, D2=00" of S3224, the responding command (COM=F5) indicating that the DSCCPU 184 has normally received the transmitted command is set. At "DSC→APS DATA TRANSMITTING (COM & Dn DATA TRANSMITTING)" of S3226, the set data is transmitted to the APSCPU 150.

At "START ONE FRAME BACK AUTOPLAY" of S3228, the frames are continuously backed if the setting of the mode switching dial 72 is the "PLAY" and the lower left switch 60 of the multi-function switches 52 is continuously pressed.

After the frame-backing is set, the process goes to the "END" of S3772 to end the "DSC COMMUNICATION" of S3000 of the subroutine.

Figure 54:
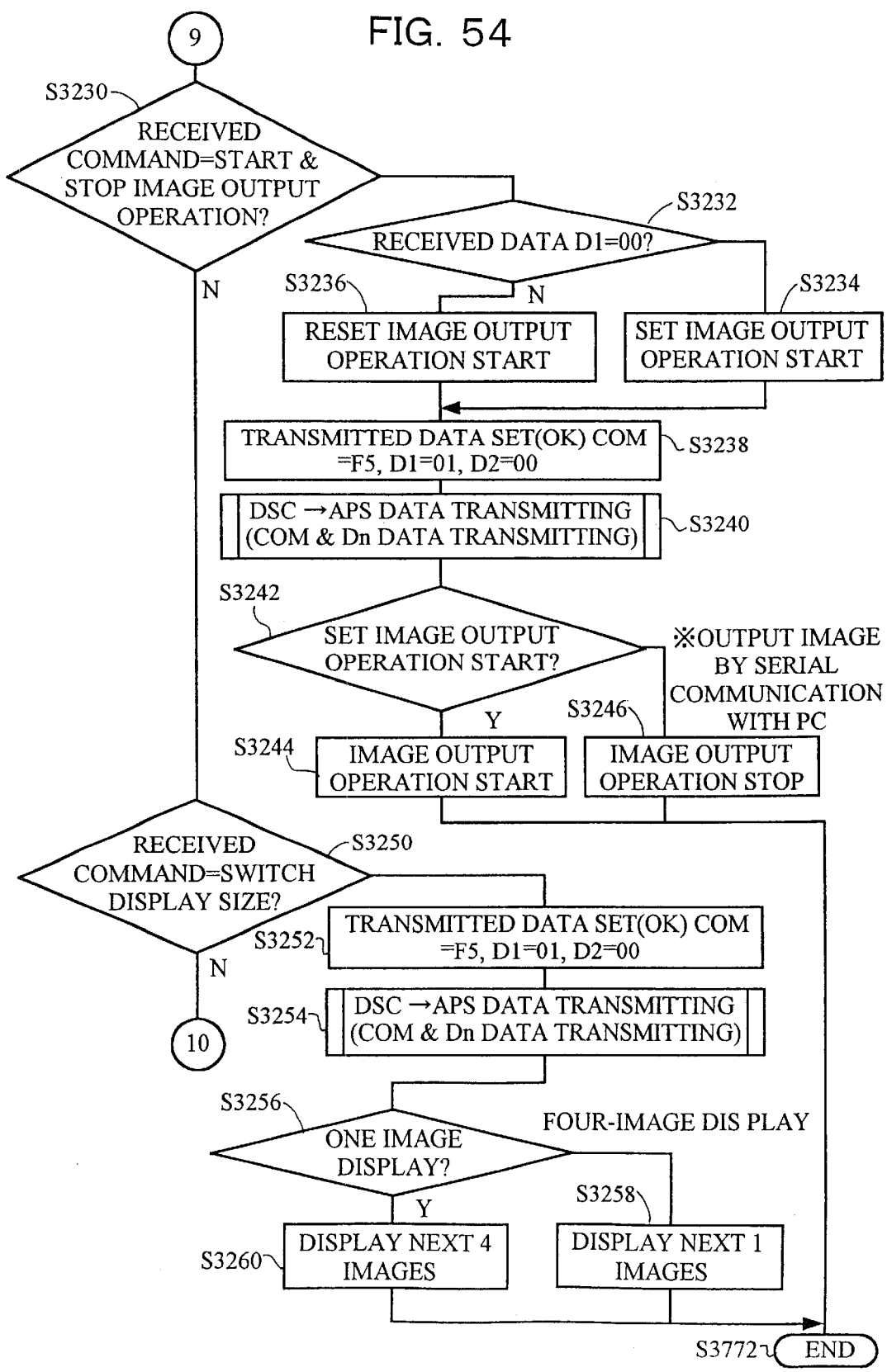
FIG. 54 is a flow chart showing the processing of the DSC by the DSC communication of the hybrid camera in FIG. 1.

At the "RECEIVED COMMAND=START & STOP IMAGE OUTPUT OPERATION?" of S3230 in FIG. 54, whether the received command (COM) is "START & STOP IMAGE OUTPUT OPERATION" is determined. If the command (COM) is the "START & STOP IMAGE OUTPUT OPERATION", the process goes to "RECEIVED DATA D1=00" of S3232. If the command (COM) is not the "START & STOP IMAGE OUTPUT OPERATION", the process goes to "RECEIVED COMMAND=SWITCH DISPLAY SIZE?" of S3250. Conditions for commanding the "START & STOP IMAGE OUTPUT OPERATION" are that the setting of the mode switching dial 72 is the "PLAY" and that the SHIFT switch 48 and the lower left switch 60 of the multi-function switches 52 are pressed (the /SPLAYOUT becomes effective).

At the "RECEIVED DATA D1=00" of S3232, whether the received data is D1=00 is determined. If the received data is D1=00, the process goes to "SET IMAGE OUTPUT OPERATION START" of S3234 to set "SET IMAGE OUTPUT OPERATION START" in the memory.

If the received data is not D1=00, the process goes to "RESET IMAGE OUTPUT OPERATION START" of S3236 to set "RESET IMAGE OUTPUT OPERATION START" in the memory.

At "TRANSMITTED DATA SET (OK) COM=F5, D1=00, D2=00" of S3238, the responding command (COM=F5) indicating that the DSCCPU 184 has normally received the transmitted command is set. At "DSC→APS DATA TRANSMITTING (COM & Dn DATA TRANSMITTING)" of S3240, the set data is transmitted to the APSCPU 150.

At "SET IMAGE OUTPUT OPERATION START?" of S3242, the state of the "IMAGE OUTPUT OPERATION START" set at S3234 or S3236 in the memory, and whether the state is the "SET IMAGE OUTPUT OPERATION START" is determined.

If the state is the "SET IMAGE OUTPUT OPERATION START", the process goes to "IMAGE OUTPUT OPERATION START" at S3244, where image signals are outputted from the video signal output part 92 and the digital signal input/output part 94.

If the state is the "RESET IMAGE OUTPUT OPERATION START", the process goes to "IMAGE OUTPUT OPERATION STOP" at S3246 to stop the image output operation.

After the "IMAGE OUTPUT OPERATION START" or the "IMAGE OUTPUT OPERATION STOP", the process goes to the "END" of S3772 to end the "DSC COMMUNICATION" of S3000 of the subroutine.

At the "RECEIVED COMMAND=SWITCH DISPLAY SIZE?" of S3250, whether the received command (COM) is "SWITCH DISPLAY SIZE" is determined. If the command (COM) is the "SWITCH DISPLAY SIZE", the process goes to "TRANSMITTED DATA SET (OK) COM=F5, D1=00, D2=00" of S3252. If the command (COM) is not the "SWITCH DISPLAY SIZE", the process goes to "RECEIVED COMMAND=SWITCH CHP?" of S3262 in FIG. 55. Conditions for commanding the "SWITCH DISPLAY SIZE" are that the setting of the mode switching dial 72 is the "PLAY" and that the upper left switch 58 of the multi-function switches 52 is pressed (the /SDISPCHG becomes effective).

At "TRANSMITTED DATA SET (OK) COM=F5, D1=00, D2=00" of S3252, the responding command (COM=F5) indicating that the DSCCPU 184 has normally received the transmitted command is set. At "DSC→APS DATA TRANSMITTING (COM & Dn DATA TRANSMITTING)" of S3254, the set data is transmitted to the APSCPU 150.

At "ONE IMAGE DISPLAY?" of S3256, whether one image is displayed is determined. If NO, four images are displayed. Thus, the process goes to "DISPLAY NEXT 4 IMAGES" at S3258 to display the next four images.

If one image is displayed, the process goes to "DISPLAY NEXT 1 IMAGE" at S3260 to display the next one image.

After the image display is switched, the process goes to the "END" of S3772 to end the "DSC COMMUNICATION" of S3000 of the subroutine.

Figure 55:
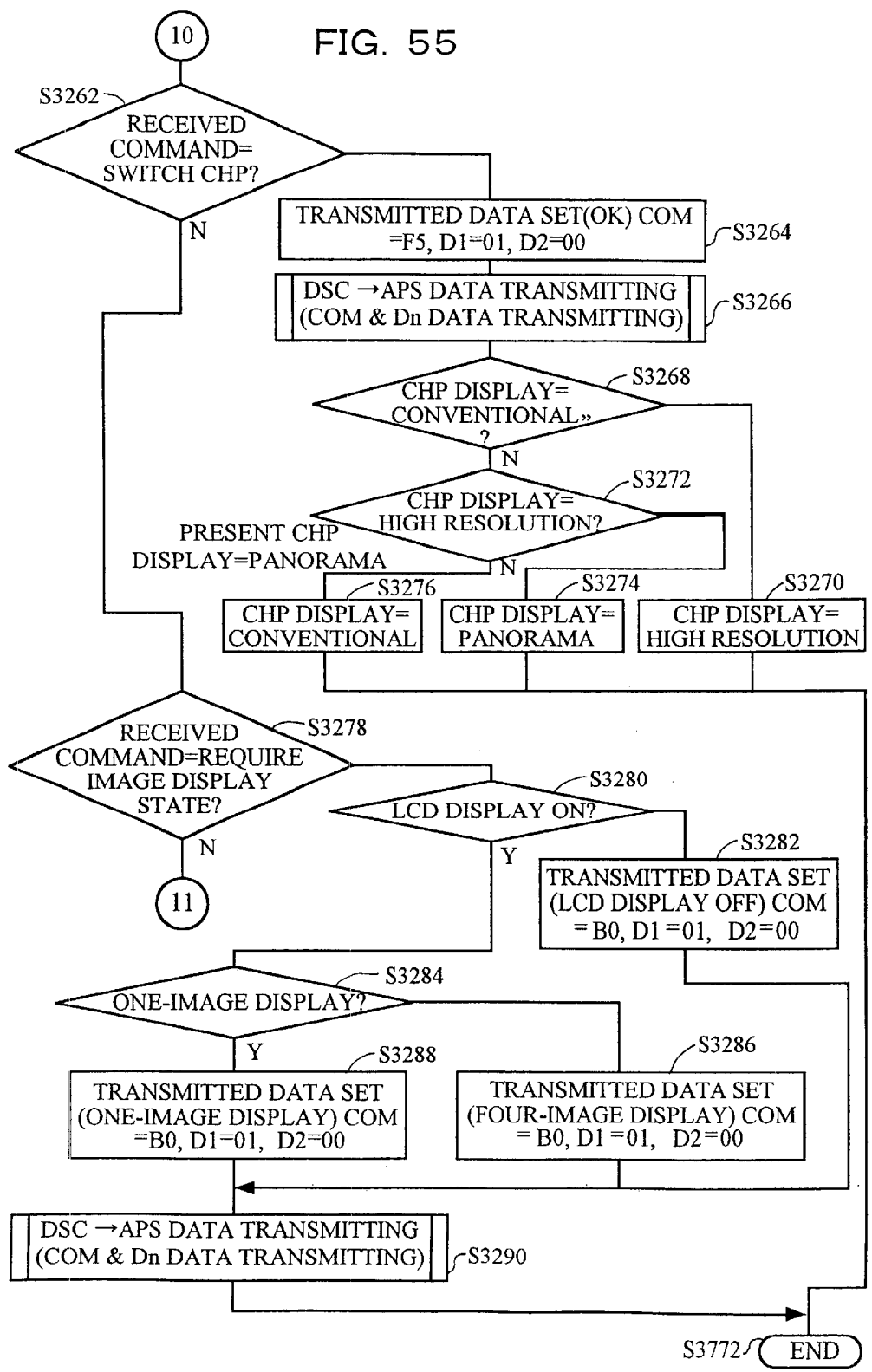
FIG. 55 is a flow chart showing the processing of the DSC by the DSC communication of the hybrid camera in FIG. 1.

At the "RECEIVED COMMAND=SWITCH CHP?" of S3262 in FIG. 55, whether the received command (COM) is "SWITCH CHP" is determined. If the command (COM) is the "SWITCH CHP", the process goes to "TRANSMITTED DATA SET (OK) COM=F5, D1=00, D2=00" of S3264. If the command (COM) is not the "SWITCH CHP", the process goes to "RECEIVED COMMAND=REQUIRE IMAGE DISPLAY STATE?" of S3278. Conditions for commanding the "SWITCH CHP" are that the setting of the mode switching dial 72 is the "PLAY" and that the SHIFT switch 48 and the lower right switch 56 of the multi-function switches 52 are pressed (the /SCHP becomes effective). Each time the /SCHP becomes effective, the CHP switches in order of the "CONVENTIONAL", "HIGH RESOLUTION" and "PANORAMA".

At "TRANSMITTED DATA SET (OK) COM=F5, D1=00, D2=00" of S3264, the responding command (COM=F5) indicating that the DSCCPU 184 has normally received the transmitted command is set. At "DSC→APS DATA TRANSMITTING (COM & Dn DATA TRANSMITTING)" of S3266, the set data is transmitted to the APSCPU 150.

At "CHP DISPLAY=CONVENTIONAL?" of S3268, whether the CHP display is the "CONVENTIONAL" is determined. The CHP display is one of the "CONVENTIONAL", "HIGH RESOLUTION" and "PANORAMA" that are the image sizes of the liquid crystal monitor 40. The "CONVENTIONAL" is formed by masking the left and right parts of the "HIGH RESOLUTION" with half-toned or black frames to change the aspect ratio, and the "PANORAMA" is formed by masking the upper and lower parts of the "HIGH RESOLUTION" with half-toned or black frames to change the aspect ratio. The optical finder 34 forms the CHP display by means of known mechanical masks.

If the CHP display is the "CONVENTIONAL", the process goes to "CHP DISPLAY=HIGH RESOLUTION" of S3270 to switch the CHP display to the "HIGH RESOLUTION". If the CHP display is not the "CONVENTIONAL", the process goes to "CHP DISPLAY=HIGH RESOLUTION?" of S3272 to determine whether the CHP display is the "HIGH RESOLUTION". If the CHP display is the "HIGH RESOLUTION", the process goes to "CHP DISPLAY=PANORAMA" of S3274 to switch the CHP display to the "PANORAMA".

If the CHP display is not the "HIGH RESOLUTION", the CHP display is the "PANORAMA". Thus, the process goes to "CHP DISPLAY=CONVENTIONAL" of S3276 to switch the CHP display to the "CONVENTIONAL".

After the CHP switching, the process goes to the "END" of S3772 to end the "DSC COMMUNICATION" of S3000 of the subroutine.

At the "RECEIVED COMMAND=REQUIRE IMAGE DISPLAY STATE?" of S3278, whether the received command (COM) is "REQUIRE IMAGE DISPLAY STATE" is determined. If the command (COM) is the "REQUIRE IMAGE DISPLAY STATE", the process goes to "LCD DISPLAY ON?" of S3280. If the command (COM) is not the "REQUIRE IMAGE DISPLAY STATE", the process goes to "RECEIVED COMMAND=WHETHER APS SHOOTING HAS BEEN PERFORMED?" of S3292 in FIG. 56.

At the "LCD DISPLAY ON?" of S3280, whether any image is displayed on the liquid crystal monitor 40 is determined. If no image is displayed on the liquid crystal monitor 40, the process goes to "TRANSMITTED DATA SET (LCD DISPLAY OFF) COM=B0, D1=00, D2=00" of S3282 to set a responding command (COM=B0) and a command (D1 =00) indicating that the LCD is OFF.

If any image is displayed on the liquid crystal monitor 40, the process goes to "ONE-IMAGE DISPLAY?" of S3284 to determine whether one image is displayed. If NO, four images are displayed. Thus the process goes to "TRANSMITTED DATA SET (FOUR-IMAGE DISPLAY) COM= B0, D1=02, D2=00" of S3286 to set the responding command (COM=B0) and a command (D1=02) indicating the four-image display.

If one image is displayed, the process goes to "TRANSMITTED DATA SET (ONE-IMAGE DISPLAY) COM=B0, D1=01, D2=00" of S3288 to set the responding command (COM=B0) and a command (D1=01) indicating the one-image display.

After the command and the data are transmitted, the process goes to "DSC→APS DATA TRANSMITTING (COM & Dn DATA TRANSMITTING)" of S3290 to transmit the set data to the APSCPU 150.

After the data is transmitted, the process goes to the "END" of S3772 to end the "DSC COMMUNICATION" of S3000 of the subroutine.

Figure 56:
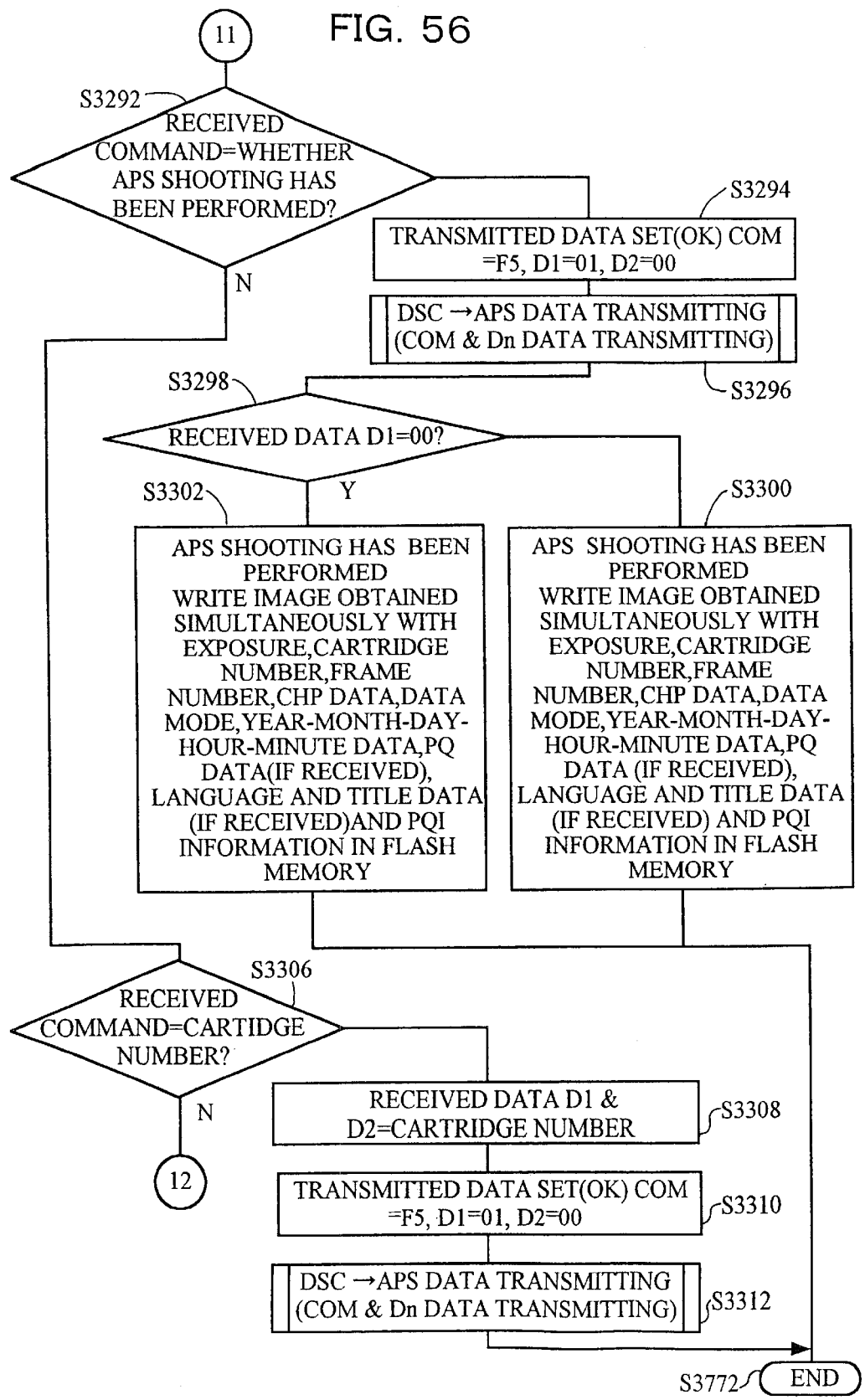
FIG. 56 is a flow chart showing the processing of the DSC by the DSC communication of the hybrid camera in FIG. 1.

At the "RECEIVED COMMAND=WHETHER APS SHOOTING HAS BEEN PERFORMED?" of S3292 in FIG. 56, whether the received command (COM) is "WHETHER APS SHOOTING HAS BEEN PERFORMED" is determined. If the command (COM) is the "WHETHER APS SHOOTING HAS BEEN PERFORMED", the process goes to "TRANSMITTED DATA SET (OK) COM=F5, D1=00, D2=00" of S3294. If the command (COM) is not the "WHETHER APS SHOOTING HAS BEEN PERFORMED", the process goes to "RECEIVED COMMAND=CARTRIDGE NUMBER?" of S3306.

At the "TRANSMITTED DATA SET (OK) COM=F5, D1=00, D2=00" of S3294, the responding command (COM=F5) indicating that the DSCCPU 184 has normally received the transmitted command is set. At "DSC→APS DATA TRANSMITTING (COM & Dn DATA TRANSMITTING)" of S3296, the set data is transmitted to the APSCPU 150.

At "RECEIVED DATA D1=00?" of S3298, whether the received data (D1) is APS shooting state (00) is determined. If the received data is not the "APS SHOOTING STATE", the process goes to "APS SHOOTING HAS NOT BEEN PERFORMED" of the S3300. If the received data is the "APS SHOOTING STATE", the process goes to "APS SHOOTING HAS BEEN PERFORMED" of the S3302.

At the "APS SHOOTING HAS NOT BEEN PERFORMED" of the S3300, the image obtained simultaneously with the exposure, the cartridge number, the frame number, the CHP data, the date mode, the year-month-day-hour-minute data, the PQ data (if received), the language and title data (if received) and the PQI information are written in the flash memory. The data can not be edited at the "APS SHOOTING HAS NOT BEEN PERFORMED".

At the "APS SHOOTING HAS BEEN PERFORMED" of the S3302, the image obtained simultaneously with the exposure, the cartridge number, the frame number, the CHP data, the date mode, the year-month-day-hour-minute data, the PQ data (if received), the language and title data (if received) and the PQI information are written in the flash memory. The data can be edited at the "APS SHOOTING HAS BEEN PERFORMED".

After the data is written, the process goes to the "END" of S3772 to end the "DSC COMMUNICATION" of S3000 of the subroutine.

At the "RECEIVED COMMAND=CARTRIDGE NUMBER?" of S3306, whether the received command (COM) is "CARTRIDGE NUMBER" is determined. If the command (COM) is the "CARTRIDGE NUMBER", the process goes to "RECEIVED DATA D1 & D2=CARTRIDGE NUMBER" of S3308. If the command (COM) is not the "CARTRIDGE NUMBER", the process goes to "RECEIVED COMMAND=CHP?" of S3314 in FIG. 57.

At the "RECEIVED DATA D1 & D2=CARTRIDGE NUMBER" of S3308, the received data D1 and D2 are stored in the memory as cartridge numbers.

At the "TRANSMITTED DATA SET (OK) COM=F5, D1=00, D2=00" of S3310, the responding command (COM=F5) indicating that the DSCCPU 184 has normally received the transmitted command is set. At "DSC→APS DATA TRANSMITTING (COM & Dn DATA TRANSMITTING)" of S3312, the set data is transmitted to the APSCPU 150.

After the transmission, the process goes to the "END" of S3772 to end the "DSC COMMUNICATION" of S3000 of the subroutine.

Figure 57:
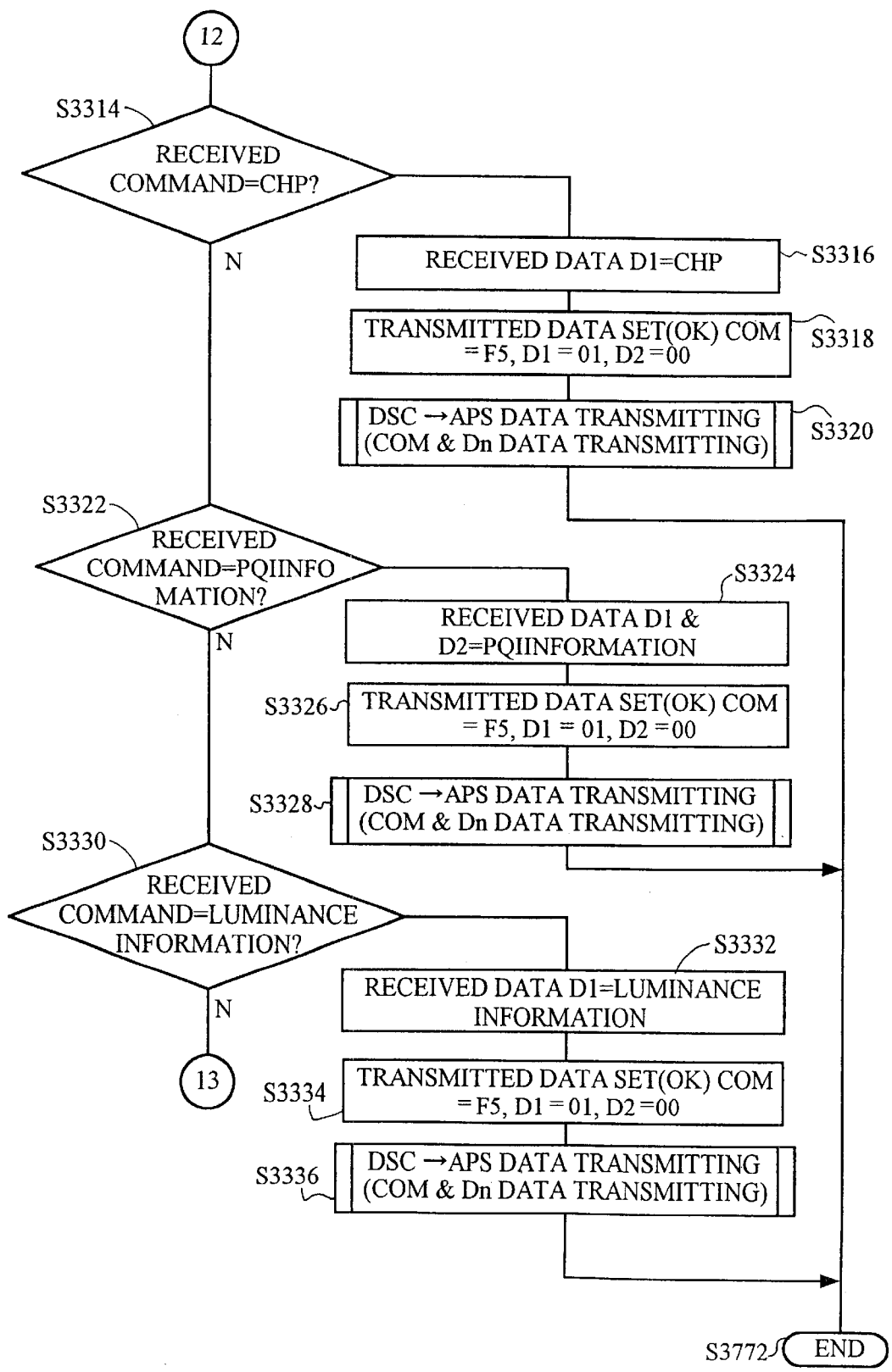
FIG. 57 is a flow chart showing the processing of the DSC by the DSC communication of the hybrid camera in FIG. 1.

At the "RECEIVED COMMAND=CHP?" of S3314 in FIG. 57, whether the received command (COM) is "CHP" is determined. If the command (COM) is the "CHP", the process goes to "RECEIVED DATA D1=CHP" of S3316. If the command (COM) is not the "CHP", the process goes to "RECEIVED COMMAND=PQI INFORMATION?" of S3322.

At the "RECEIVED DATA D1=CHP" of S3316, the received data D1 is stored in the memory as CHP data.

At the "TRANSMITTED DATA SET (OK) COM=F5, D1=00, D2=00" of S3318, the responding command (COM=F5) indicating that the DSCCPU 184 has normally received the transmitted command is set. At "DSCLAPS DATA TRANSMITTING (COM & Dn DATA TRANSMITTING)" of S3320, the set data is transmitted to the APSCPU 150.

After the transmission, the process goes to the "END" of S3772 to end the "DSC COMMUNICATION" of S3000 of the subroutine.

At the "RECEIVED COMMAND=PQI INFORMATION?" of S3322, whether the received command (COM) is "PQI INFORMATION" is determined. If the command (COM) is the "PQI INFORMATION", the process goes to "RECEIVED DATA D1 & D2=PQI INFORMATION" of S3324. If the command (COM) is not the "PQI INFORMATION", the process goes to "RECEIVED COMMAND=LUMINANCE INFORMATION?" of S3330.

At the "RECEIVED DATA D1 & D2=PQI INFORMATION" of S3324, the received data D1 and D2 are stored in the memory as the PQI information.

At the "TRANSMITTED DATA SET (OK) COM=F5, D1=00, D2=00" of S3326, the responding command (COM=F5) indicating that the DSCCPU 184 has normally received the transmitted command is set. At "DSC→APS DATA TRANSMITTING (COM & Dn DATA TRANSMITTING)" of S3328, the set data is transmitted to the APSCPU 150.

After the transmission, the process goes to the "END" of S3772 to end the "DSC COMMUNICATION" of S3000 of the subroutine.

At the "RECEIVED COMMAND=LUMINANCE INFORMATION?" of S3330, whether the received command (COM) is "LUMINANCE INFORMATION" is determined. If the command (COM) is the "LUMINANCE INFORMATION", the process goes to "RECEIVED DATA D1=LUMINANCE INFORMATION" of S3332. If the command (COM) is not the "LUMINANCE INFORMATION", the process goes to "RECEIVED COMMAND=WHETHER ELECTRONIC FLASH WAS USED & LIGHT AMOUNT?" of S3338 in FIG. 58.

At the "RECEIVED DATA D1=LUMINANCE INFORMATION" of S3332, the received data D1 is stored in the memory as the luminance information.

At "TRANSMITTED DATA SET (OK) COM=F5, D1=00, D2=00" of S3334, the responding command (COM=F5) indicating that the DSCCPU 184 has normally received the transmitted command is set. At "DSC→APS DATA TRANSMITTING (COM & Dn DATA TRANSMITTING)" of S3336, the set data is transmitted to the APSCPU 150.

After the transmission, the process goes to the "END" of S3772 to end the "DSC COMMUNICATION" of S3000 of the subroutine.

Figure 58:
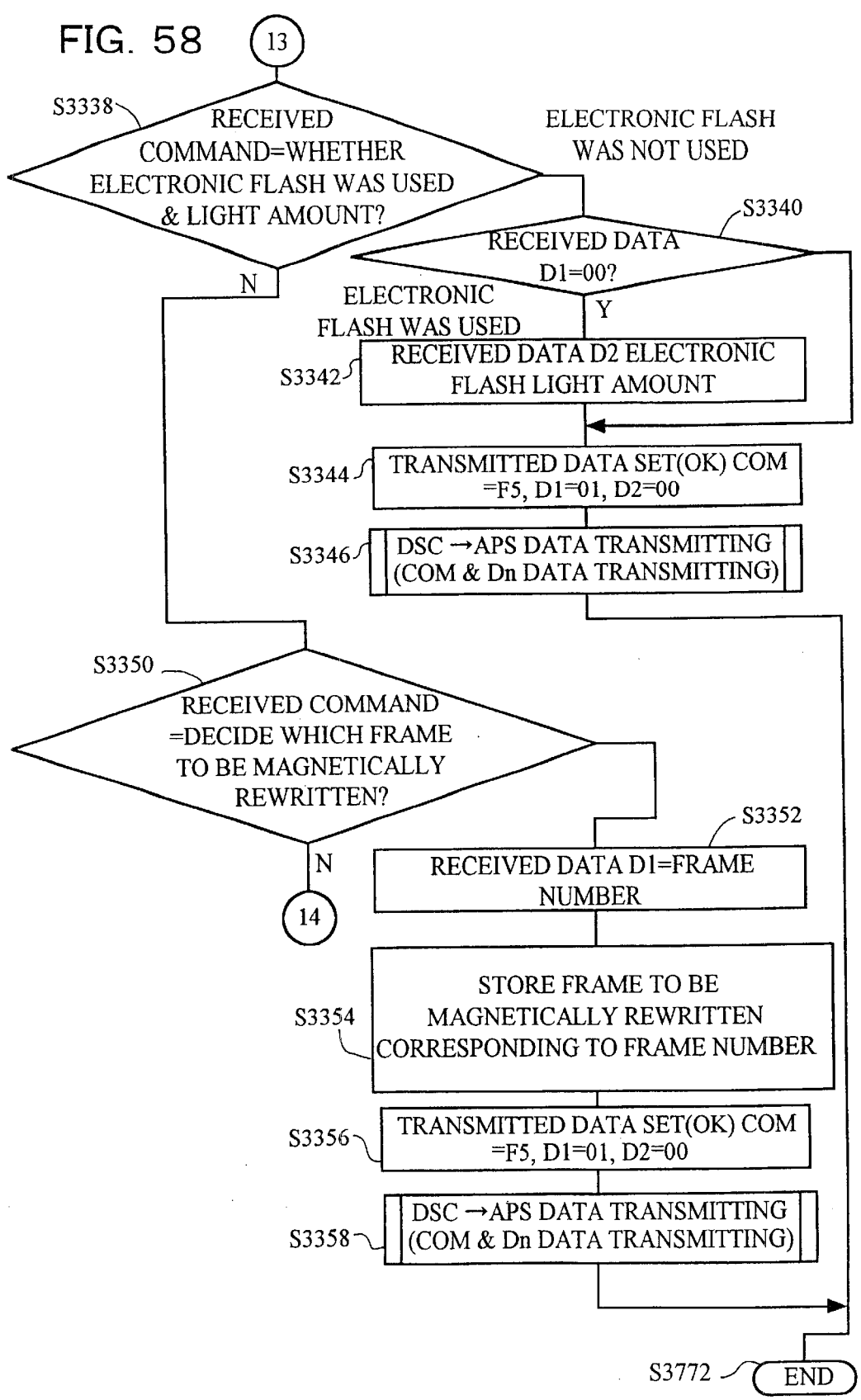
FIG. 58 is a flow chart showing the processing of the DSC by the DSC communication of the hybrid camera in FIG. 1.

At the "RECEIVED COMMAND=WHETHER ELECTRONIC FLASH WAS USED & LIGHT AMOUNT?" of S3338 in FIG. 58, whether the received command (COM) is "WHETHER ELECTRONIC FLASH WAS USED & LIGHT AMOUNT" is determined. If the command (COM) is the "WHETHER ELECTRONIC FLASH WAS USED & LIGHT AMOUNT", the process goes to "RECEIVED DATA D1=00?" of S3340. If the command (COM) is not the "WHETHER ELECTRONIC FLASH WAS USED & LIGHT AMOUNT", the process goes to "RECEIVED COMMAND=DECIDE WHICH FRAME TO BE MAGNETICALLY REWRITTEN?" of S3350.

At the "RECEIVED DATA D1=00" of S3340, whether the received data (D1) is "WITH ELECTRONIC FLASH" (00) is determined. If the received data is the "WITH ELECTRONIC FLASH", the process goes to "RECEIVED DATA D2=ELECTRONIC FLASH LIGHT AMOUNT" of S3342. If the received data is the "WITHOUT ELECTRONIC FLASH", the process goes to "TRANSMITTED DATA SET (OK) COM=F5, D1=00, D2=00" of S3344.

At the "RECEIVED DATA D2=ELECTRONIC FLASH LIGHT AMOUNT" of S3342, the received data D2 is stored in the memory as the electronic flash light amount information.

At the "TRANSMITTED DATA SET (OK) COM=F5, D1=00, D2=00" of S3344, the responding command (COM=F5) indicating that the DSCCPU 184 has normally received the transmitted command is set. At "DSC→APS DATA TRANSMITTING (COM & Dn DATA TRANSMITTING)" of S3346, the set data is transmitted to the APSCPU 150.

After the transmission, the process goes to the "END" of S3772 to end the "DSC COMMUNICATION" of S3000 of the subroutine.

At the "RECEIVED COMMAND=DECIDE WHICH FRAME TO BE MAGNETICALLY REWRITTEN?" of S3350, whether the received command (COM) is "DECIDE WHICH FRAME TO BE MAGNETICALLY REWRITTEN" is determined. If the command (COM) is the "DECIDE WHICH FRAME TO BE MAGNETICALLY REWRITTEN", the process goes to "RECEIVED DATA D1=FRAME NUMBER" of S3352. If the command (COM) is not the "DECIDE WHICH FRAME TO BE MAGNETICALLY REWRITTEN", the process goes to "RECEIVED COMMAND=APS SHOOTING FINISHED?" of S3360 in FIG. 59.

At the "RECEIVED DATA D1=FRAME NUMBER" of S3352, the received data D1 is stored in the memory as the frame number information. At "STORE FRAME TO BE MAGNETICALLY REWRITTEN CORRESPONDING TO FRAME NUMBER" of S3354, that the rewriting of the magnetic information about the frame has been finished is stored.

At the "TRANSMITTED DATA SET (OK) COM=F5, D1=00, D2=00" of S3356, the responding command (COM=F5) indicating that the DSCCPU 184 has normally received the transmitted command is set. At "DSC→APS DATA TRANSMITTING (COM & Dn DATA TRANSMITTING)" of S3358, the set data is transmitted to the APSCPU 150.

After the transmission, the process goes to the "END" of S3772 to end the "DSC COMMUNICATION" of S3000 of the subroutine.

Figure 59:
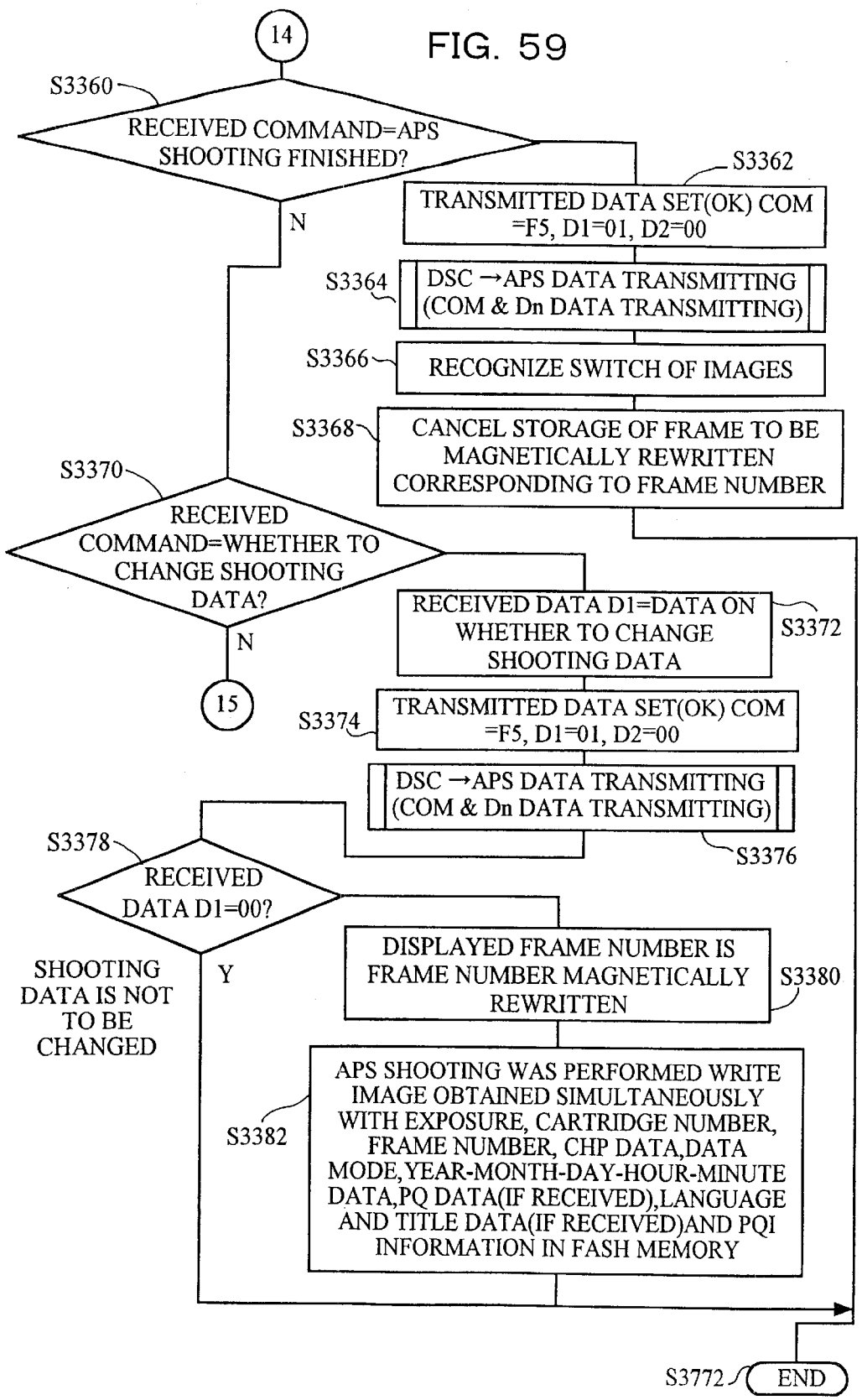
FIG. 59 is a flow chart showing the processing of the DSC by the DSC communication of the hybrid camera in FIG. 1.

At the "RECEIVED COMMAND=APS SHOOTING FINISHED?" of S3360 in FIG. 59, whether the received command (COM) is "APS SHOOTING FINISHED" is determined. If the command (COM) is the "APS SHOOTING FINISHED", the process goes to "TRANSMITTED DATA SET (OK) COM=F5, D1=00, D2=00" of S3362. If the command (COM) is not the "APS SHOOTING FINISHED", the process goes to "RECEIVED COMMAND=WHETHER TO CHANGE SHOOTING DATA?" of S3370.

At the "TRANSMITTED DATA SET (OK) COM=F5, D1=00, D2=00" of S3362, the responding command (COM=F5) indicating that the DSCCPU 184 has normally received the transmitted command is set. At "DSC→APS DATA TRANSMITTING (COM & Dn DATA TRANSMITTING)" of S3364, the set data is transmitted to the APSCPU 150.

At "RECOGNIZE SWITCH OF IMAGES" of S3366, switch information of the shot images is stored in the memory. At "CANCEL STORAGE OF FRAME TO BE MAGNETICALLY REWRITTEN CORRESPONDING TO FRAME NUMBER" of S3368, the storage of the frame to be magnetically rewritten corresponding to the frame number is canceled on the finish of the APS shooting.

After the above processing, the process goes to the "END" of S3772 to end the "DSC COMMUNICATION" of S3000 of the subroutine.

At the "RECEIVED COMMAND=WHETHER TO CHANGE SHOOTING DATA?" of S3370, whether the received command (COM) is "WHETHER TO CHANGE SHOOTING DATA" is determined. If the command (COM) is the "WHETHER TO CHANGE SHOOTING DATA", the process goes to "RECEIVED DATA D1=DATA ON WHETHER TO CHANGE SHOOTING DATA" of S3372. If the command (COM) is not the "WHETHER TO CHANGE SHOOTING DATA", the process goes to "RECEIVED COMMAND=WHETHER ELECTRONIC FLASH SYNCHRONIZED?" of S3384 in FIG. 60.

At the "RECEIVED DATA D1=DATA ON WHETHER TO CHANGE SHOOTING DATA" of S3372, the received data D1 is stored in the memory as "DATA INFORMATION ON WHETHER TO CHANGE SHOOTING DATA".

At the "TRANSMITTED DATA SET (OK) COM=F5, D1=00, D2=00" of S3374, the responding command (COM=F5) indicating that the DSCCPU 184 has normally received the transmitted command is set. At "DSC→APS DATA TRANSMITTING (COM & Dn DATA TRANSMITTING)" of S3376, the set data is transmitted to the APSCPU 150.

At "RECEIVED DATA D1=00?" of S3378, whether the received data (D1) is "SHOOTING DATA IS NOT TO BE CHANGED" (00) is determined.

If the received command is not the "SHOOTING DATA IS NOT TO BE CHANGED", the process goes to "DISPLAYED FRAME NUMBER IS FRAME NUMBER MAGNETICALLY REWRITTEN" of S3380 to store the displayed frame number as a frame number magnetically rewritten, and the process goes to "APS SHOOTING WAS PERFORMED" of S3382. At the S3382, the image obtained simultaneously with the exposure, the cartridge number, the frame number, the CHP data, the date mode, the year-month-day-hour-minute data, the PQ data (if received), the language and title data (if received) and the PQI information are written in the flash memory.

If the writing processing ends or if the received command is the "SHOOTING DATA NOT TO BE CHANGED" at S3378, the process goes to the "END" of S3772 to end the "DSC COMMUNICATION" of S3000 of the subroutine.

Figure 60:
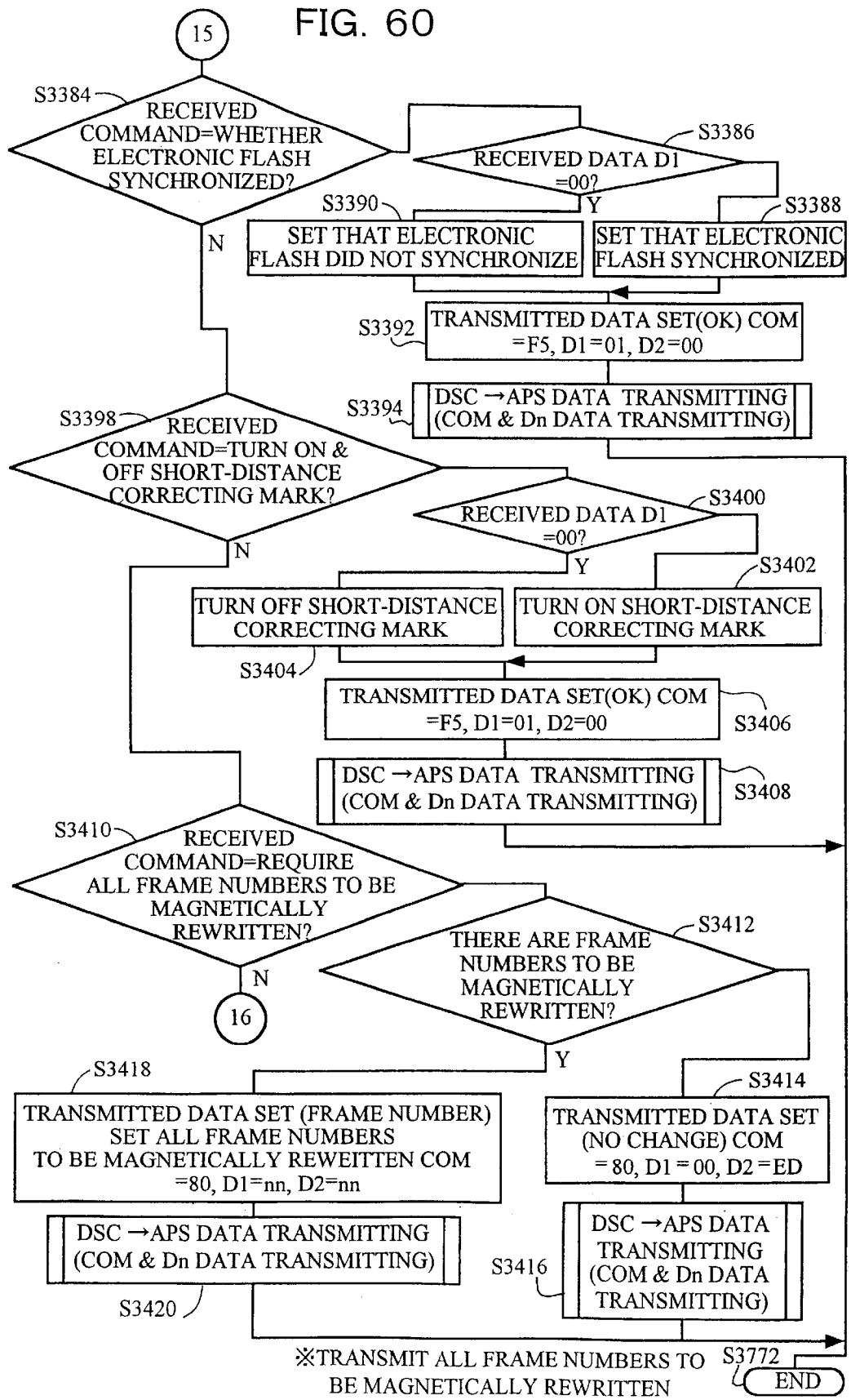
FIG. 60 is a flow chart showing the processing of the DSC by the DSC communication of the hybrid camera in FIG. 1.

At the "RECEIVED COMMAND=WHETHER ELECTRONIC FLASH SYNCHRONIZED?" of S3384 in FIG. 60, whether the received command (COM) is "WHETHER ELECTRONIC FLASH SYNCHRONIZED" is determined. If the command is the "WHETHER ELECTRONIC FLASH SYNCHRONIZED", the process goes to "RECEIVED DATA D1=00?" of S3386. If the command (COM) is not the "WHETHER ELECTRONIC FLASH SYNCHRONIZED", the process goes to "RECEIVED COMMAND=TURN ON & OFF SHORT-DISTANCE CORRECTING MARK?" of S3398.

At "RECEIVED DATA D1=00?" of S3386, whether the received data (D1) is "ELECTRONIC FLASH DID NOT SYNCHRONIZE" (00) is determined. If the received data is not the "ELECTRONIC FLASH DID NOT SYNCHRONIZE", the process goes to "SET THAT ELECTRONIC FLASH SYNCHRONIZED" of S3388 to store "ELECTRONIC FLASH SYNCHRONIZED" in the memory.

If the data is the "ELECTRONIC FLASH DID NOT SYNCHRONIZE" at S3386, the process goes to "SET THAT ELECTRONIC FLASH DID NOT SYNCHRONIZE" of S3390 to store that "ELECTRONIC FLASH DID NOT SYNCHRONIZE" in the memory.

After setting in the memory, at the "TRANSMITTED DATA SET (OK) COM=F5, D1=00, D2=00" of S3392, the responding command (COM=F5) indicating that the DSCCPU 184 has normally received the transmitted command is set. At "DSC→APS DATA TRANSMITTING (COM & Dn DATA TRANSMITTING)" of S3394, the set data is transmitted to the APSCPU 150.

After the transmission, the process goes to the "END" of S3772 to end the "DSC COMMUNICATION" of S3000 of the subroutine.

At the "RECEIVED COMMAND=TURN ON & OFF SHORT-DISTANCE CORRECTING MARK?" of S3398, whether the received command (COM) is "TURN ON & OFF SHORT-DISTANCE CORRECTING MARK" is determined. If the command is the "TURN ON & OFF SHORT-DISTANCE CORRECTING MARK", the process goes to "RECEIVED DATA D1=00?" of S3400. If the command (COM) is not the "TURN ON & OFF SHORT-DISTANCE CORRECTING MARK", the process goes to "RECEIVED COMMAND=REQUIRE ALL FRAME NUMBERS TO BE MAGNETICALLY REWRITTEN?" of S3410.

At "RECEIVED DATA D1=00?" of S3400, whether the received data (D1) is "TURN ON SHORT-DISTANCE CORRECTING MARK" (00) is determined. If the received data is not the "TURN ON SHORT-DISTANCE CORRECTING MARK", the process goes to "TURN OFF SHORT-DISTANCE CORRECTING MARK" of S3402 to turn off the short-distance correcting mark on the liquid crystal monitor 40 and set the "TURN OFF SHORT-DISTANCE CORRECTING MARK" in the memory.

If the data is the "TURN ON SHORT-DISTANCE CORRECTING MARK" at S3400, the process goes to "TURN ON SHORT-DISTANCE CORRECTING MARK" of S3404 to turn on the short-distance correcting mark on the liquid crystal monitor 40 and set the "TURN ON SHORT-DISTANCE CORRECTING MARK" in the memory.

After setting in the memory (S3404 and S3402), at the "TRANSMITTED DATA SET (OK) COM=F5, D1=00, D2=00" of S3406, the responding command (COM=F5)

indicating that the DSCCPU 184 has normally received the transmitted command is set. At "DSC→APS DATA TRANSMITTING (COM & Dn DATA TRANSMITTING)" of S3408, the set data is transmitted to the APSCPU 150.

After the transmission, the process goes to the "END" of S3772 to end the "DSC COMMUNICATION" of S3000 of the subroutine.

At the "RECEIVED COMMAND=REQUIRE ALL FRAME NUMBERS TO BE MAGNETICALLY REWRITTEN?" of S3410, whether the received command (COM) is "REQUIRE ALL FRAME NUMBERS TO BE MAGNETICALLY REWRITTEN" is determined. If the command is the "REQUIRE ALL FRAME NUMBERS TO BE MAGNETICALLY REWRITTEN", the process goes to "THERE ARE FRAME NUMBERS TO BE MAGNETICALLY REWRITTEN?" of S3412. If the command is not the "REQUIRE ALL FRAME NUMBERS TO BE MAGNETICALLY REWRITTEN", the process goes to "RECEIVED COMMAND=CCD EXPOSURE CONTROLLING INFORMATION?" of S3762 in FIG. 61.

At the "THERE ARE FRAME NUMBERS TO BE MAGNETICALLY REWRITTEN?" of S3412, whether the received data is "THERE ARE FRAME NUMBERS TO BE MAGNETICALLY REWRITTEN". If the received data is not the "THERE ARE FRAME NUMBERS TO BE MAGNETICALLY REWRITTEN", the process goes to "TRANSMITTED DATA SET (NO CHANGE) COM=80, D1=00, D2=ED" of S3414. At "DSC→APS DATA TRANSMITTING (COM & Dn DATA TRANSMITTING)" of S3416, the command (COM=80) and "NO CHANGE" data (D1=00, D2=ED) of "TRANSMITTED DATA SET" are transmitted to the APSCPU 150.

If the data is the "THERE ARE FRAME NUMBERS TO BE MAGNETICALLY REWRITTEN" at S3412, the process goes to "TRANSMITTED DATA SET (FRAME NUMBER) SET ALL FRAME NUMBERS TO BE MAGNETICALLY REWRITTEN COM=80, Dn=nn, Dn+1=nn, . . . " of S3418. At "DSC→APS DATA TRANSMITTING (COM & Dn DATA TRANSMITTING)" of S3420, the command (COM=80) and all the "FRAME NUMBERS TO BE MAGNETICALLY REWRITTEN" (Dn=nn, Dn+1=nn, Dn+2=nn, . . . ) are transmitted to the APSCPU 150.

After the transmission, the process goes to the "END" of S3772 to end the "DSC COMMUNICATION" of S3000 of the subroutine.

Figure 61:
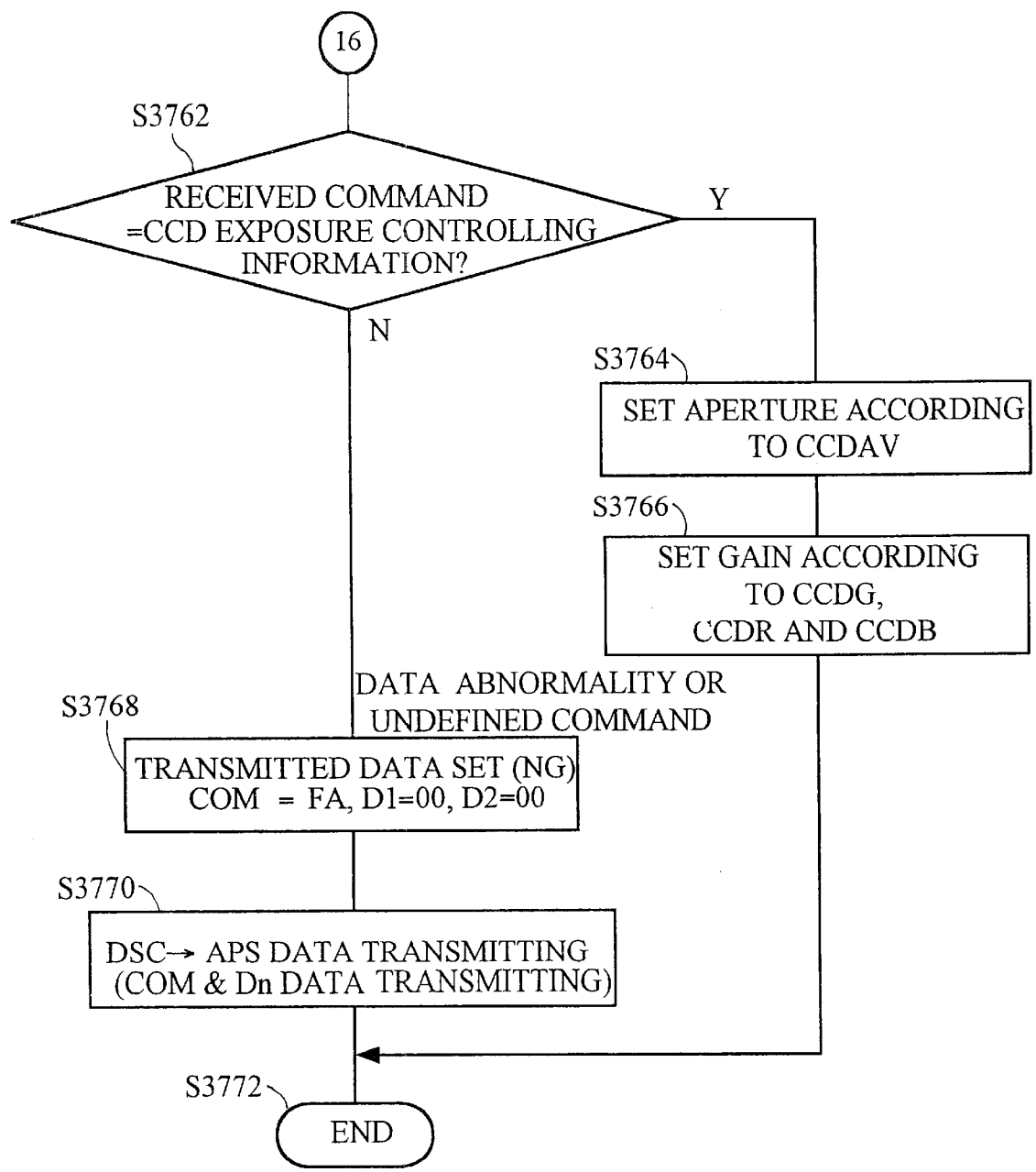
FIG. 61 is a flow chart showing the processing of the DSC by the DSC communication of the hybrid camera in FIG. 1.

If the received command in not the "REQUIRE ALL FRAME NUMBERS TO BE MAGNETICALLY REWRITTEN" at S3410, the process goes to S3762 in FIG. 61.

At the "RECEIVED COMMAND=CCD EXPOSURE CONTROLLING INFORMATION?" of S3762 in FIG. 61, whether the received command (COM) is "CCD EXPOSURE CONTROLLING INFORMATION" is determined. The CCD exposure controlling information includes the data (CCDAV) representing whether or not the CCD aperture is closed (the full aperture or the smaller aperture) and the data (CCDG, CCDR and CCDB) representing the CCD gain. If the command is the "CCD EXPOSURE CONTROLLING INFORMATION", the aperture is set according to the data CCDAV (S3764) and the gain of the CCD is set according to the data CCDG, CCDR and CCDB (S3766). The image is captured under the setting. Then, the process goes to the "END" of S3772 to end the "DSC COMMUNICATION" of S3000 of the subroutine.

If the command is not the "CCD EXPOSURE CONTROLLING INFORMATION" at S3762, the process goes to another command determination (not shown) to perform a processing according to the received command in order to finish the subroutine. In the command determination, when an undefined command or a data abnormality or the like is received, the process goes to S3768.

"TRANSMITTED DATA SET (NG) COM=FA, D1=00, D2=00" of S3768 is a processing that is performed if the command transmitted from the APSCPU 150 has not been normally received. The DSCCPU 184 sets an undefined responding command (COM=FA) indicating that the reception has not normally been finished, and transmits the set data to the APSCPU 150 at "DSC→APS DATA TRANSMITTING (COM & Dn DATA TRANSMITTING)" of S3770.

After the transmission, the process goes to the "END" of S3772 to end the "DSC COMMUNICATION" of S3000 of the subroutine.

In the embodiment, the camera has the modes "SHOOTING 1", "SHOOTING 2" and "PLAY", but it may further have a mode for performing only the DSC shooting.

The mode for performing only the DSC shooting is "SHOOTING 3". In the mode "SHOOTING 3", the electronic flash is controlled according to the setting of the DSC so that the DSC can obtain the appropriate exposure. In the mode "SHOOTING 3", the CCD aperture and the CCD gain are set at predetermined values and the electronic flash is controlled so that the appropriate amount of light can be given to the subject according the setting and the subject distance.

If the APSCPU 150 controls the whole camera as the main controlling CPU as explained in FIG. 9, the APSCPU 150 controls the electronic flash in the mode "SHOOTING 3". If the DSCCPU 184 can operate independently from the APSCPU 150 or the DSCCPU 184 controls the whole camera as the main controlling CPU, the DSCCPU 184 controls the electronic flash in the mode "SHOOTING 3".

In the embodiment, the APSCPU 150 calculate DSCGV, CCDAV, CCDG, CCDR, CCDB and so on according to the distance information, the ISO sensitivity, the zoom position and the guide number, and communicates CCDAV, CCDG, CCDR and CCDB to the DSC. But the data about the distance information, the ISO sensitivity, the zoom position, the guide number and so on may be sent from the APS to the DSC, and the DSC may calculate DSCGV, CCDAV, CCDG, CCDR, CCDB and so on according to the data.

In the embodiment, the reverse-counting film counter is adopted, but a forward-counting film counter may be adopted. The APS shooting lens 12 and the DSC shooting lens 14 are provided independently from each other, but the APS shooting optical system and the DSC shooting optical system may partly share a part of their optical paths.

In addition, the APS battery 84 and the DSC battery 86 are provided independently from each other, but the APS and the DSC may share a battery, which supplies power to the APS and the DSC.

In the embodiment, the diaphragm that switches the aperture between the two levels is adopted, but a diaphragm that switches the aperture between three levels may be adopted.

In the embodiment, the hybrid camera using the APS film is explained, but the film is not limited to the APS film. The present invention may be applied to hybrid cameras using other types of films, such as a 35 mm film.

As set forth hereinabove, according to the hybrid camera of the present invention, if the film recording system (first recording device) and the electronic image recording system (second recording system) record the images at one time, the flashing device is controlled according to the set values of the photo film recording conditions and the second recording device adjusts the amplification or the like according to the information about the subject distance and so on, sent from the film recording device. Therefore, both of the first and second recording devices can easily obtain the fine images.

It should be understood, however, that there is no intention to limit the invention to the specific forms disclosed, but on the contrary, the invention is to cover all modifications, alternate constructions and equivalents falling within the spirit and scope of the invention as expressed in the appended claims.

What is claimed is:

1. A hybrid camera comprising:
   an optical image recording device that records an optical image on a photographic film;
   an imaging device that converts an optical image into electric signals;
   an electronic image recording device that records image data, obtained by processing said electric signals outputted from said imaging device, in a recording medium;
   an exposure controlling device that controls exposure conditions of said photographic film so that said photographic film obtains an appropriate exposure when said optical image recording device and said electronic image recording device record images at one time, the exposure controlling device comprising
   a first controlling device that controls image-recording of said optical image recording device and outputs exposure controlling information needed for image-recording of said electronic image recording device; and
   a second controlling device that controls the image-recording of said electronic image recording device according to the exposure controlling information inputted from said first controlling device.

2. The hybrid camera of claim 1, wherein,
   the first controlling device comprises a first controller powered by a first power source; and
   the second controlling device comprises a second controller powered by a second power source,
   the first controller being connected in two-way communication with the second controller, and
   the first controller arranged to turn on the second power source to activate the second controller.

3. The hybrid camera of claim 2, wherein the electric signals outputted from said imaging device are routed to said recording medium via said second controller.

4. The hybrid camera of claim 1, wherein said recording medium is an extractable memory card.

5. The hybrid camera of claim 6, wherein,
   the first controlling device comprises a first controller powered by a first power source; and
   the second controlling device comprises a second controller powered by a second power source,
   the first controller being connected in two-way communication with the second controller, and
   the first controller arranged to turn on the second power source to activate the second controller.

6. A hybrid camera comprising:
   an optical image recording device that records an optical image on a photographic film;
   an imaging device that converts an optical image into electric signals;
   an electronic image recording device that records image data, obtained by processing said electric signals outputted from said imaging device, in a recording medium;
   a flashing device that radiate auxiliary light to a subject;
   a flash controlling device that controls said flashing device, said flash controlling device controlling at least one of the light-emission timing and an amount of said auxiliary light according to setting of said optical image recording device so that said photographic film of said optical image recording device obtains an appropriate exposure when said optical image recording device and said electronic image recording device record images at one time;
   a first controlling device that controls image-recording of said optical image recording device and outputs exposure controlling information needed for image-recording of said electronic image recording device; and
   a second controlling device that controls the image-recording of said electronic image recording device according to the exposure controlling information inputted from said first controlling device.

7. The hybrid camera as defined in claim 6, further comprising:
   an electronic flash mode setting device that sets an operation mode of said flashing device;
   wherein said flash controlling device controls light-emission of said flashing device according to the setting of said electronic flash mode setting device.

8. The hybrid camera as defined in any claim 6, further comprising a displaying device that displays a subject image according to image signals indicating a subject image photoelectrically converted by said imaging device.

9. A hybrid camera comprising:
   a first recording device that has an optical system that records a subject image on a photographic film;
   a second recording device that has an imaging device converting an optical image into electric signals and an optical system forming a subject image on a light-receiving surface of said imaging device, said second recording device recording image data, obtained by processing said electric signals outputted from said imaging device, in a recording medium;
   a flashing device that emits light to a subject;
   a flash controlling device that controls said flashing device, said flash controlling device controlling at least one of the light-emission timing and an amount of said auxiliary light according to setting of said first recording device so that said photographic film of said first recording device obtains an appropriate exposure when said first recording device and said second recording device record images at one time;
   a first controlling device that controls image-recording of said first recording device and outputs exposure controlling information needed for image-recording of said second recording device; and
   a second controlling device that controls the image-recording of said second recording device according to the exposure controlling information inputted from said first controlling device.

10. The hybrid camera as defined in claim 9, further comprising a focusing device that determines a subject distance;
    wherein the subject distance determined by said focusing device is reflected on the exposure controlling information and an exposure of said second recording device is controlled according to the subject distance when said flashing device is used.

11. The hybrid camera as defined in claim 9, wherein said first controlling device also works as said flash controlling device.

12. The hybrid camera as defined in claim 9, further comprising a displaying device that displays a subject image according to image signals indicating a subject image photoelectrically converted by said imaging device.

13. A hybrid camera comprising:

a first recording device that has an optical system that records a subject image on a photographic film;

a second recording device that has an imaging device converting an optical image into electric signals and an optical system forming a subject image on a light-receiving surface of said imaging device, said second recording device recording image data, obtained by processing said electric signals outputted from said imaging device, in a recording medium;

a flashing device that emits light to a subject;

a mode selecting device that selects an operation mode of said hybrid camera, said mode selecting device selectively setting one of a first mode for recording an image by only said first recording device, a second mode for recording images by said first recording device and said second recording device and a third mode for recording an image by only said second recording device; and a flash controlling device that controls at least one of the light-emission timing and an amount of the light according to setting of said first recording device so that said photographic film of said first recording device obtains an appropriate exposure when one of the first mode or the second mode is set by said mode selecting device, and controls at least one of the light-emission timing and an amount of the light according to setting of said second recording device so that said imaging device of said second recording device obtains an appropriate exposure when the third mode is set by said mode selecting device, the flash controlling device comprising a first controller controlling the first recording device for exposure of said photographic film and a second controller controlling the second recording device, the first controller being powered by a first power source and a second controller being powered by a second power source, the first controller being connected in two-way communication with the second controller, and the first controller being arranged to turn on the second power source to activate the second controller.

14. The hybrid camera as defined in claim 13, further comprising a displaying device that displays a subject image according to imagesignals indicating a subject image photoelectrically converted by said imaging device.

15. The hybrid camera of claim 13, wherein said flash controlling device includes a fill-in flash mode where the second controller determines an automatic exposure of the second recording device independently from an automatic exposure of the photographic film.

16. The hybrid camera of claim 15, wherein said automatic exposure of the second recording device and said automatic exposure of the photographic film includes a time lag between image-capturing of the second recording device and exposure of the photographic film.

17. A hybrid camera comprising:

a first recording device that has an optical system that records a subject image on a photographic film;

a second recording device that has an imaging device converting an optical image into electric signals and an optical system forming a subject image on a light-receiving surface of said imaging device, said second recording device recording image data, obtained by processing said electric signals outputted from said imaging device, in a recording medium;

a flashing device that emits light to a subject;

a mode selecting device that selects an operation mode of said hybrid camera, said mode selecting device selectively setting one of a double recording mode for recording images by said first recording device and said second recording device and an electronic image recording mode for recording an image by only said second recording device; and a flash controlling device that controls at least one of the light-emission timing and an amount of the light according to setting of said first recording device so that said photographic film of said first recording device obtains an appropriate exposure when the double recording mode is set by said mode selecting device, and controls at least one of the light-emission timing and an amount of the light according to setting of said second recording device so that said imaging device of said second recording device obtains an appropriate exposure when the electronic image recording mode is set by said mode selecting device, the flash controlling device comprising a first controller controlling the first recording device for exposure of said photographic film and a second controller controlling the second recording device, the first controller being powered by a first power source and a second controller being powered by a second power source, the first controller being connected in two-way communication with the second controller, and the first controller being arranged to turn on the second power source to activate the second controller.

18. The hybrid camera as defined in claim 17, further comprising a displaying device that displays a subject image according to image signals indicating a subject image photoelectrically converted by said imaging device.

* * * * *